US004001593B2

United States Statutory Invention Registration [19]

[11] Reg. Number: H1593

[45] Published: Sep. 3, 1996

Haraga et al.

[54] SILVER HALIDE COLOR LIGHT-SENSITIVE MATERIAL AND PHOTOGRAPHING UNIT PACKAGE

[76] Inventors: Hideaki Haraga; Masaru Iwagaki, both of 1 Sakura-machi, Hino-shi, Tokyo, Japan

[21] Appl. No.: 199,675

[22] Filed: Feb. 22, 1994

[30] Foreign Application Priority Data

Feb. 26, 1993 [JP] Japan ..... 5-038674

[51] Int. Cl.[6] ..... G03C 1/46

[52] U.S. Cl. ..... 430/496; 430/507; 430/517; 430/519; 430/522

[58] Field of Search ..... 430/507, 530, 430/523, 524, 517, 510

[56] References Cited

U.S. PATENT DOCUMENTS

| | | | |
|---|---|---|---|
| 4,678,741 | 7/1987 | Yamada et al. | 430/507 |
| 4,827,298 | 5/1989 | Sasaki et al. | 430/502 |
| 4,923,788 | 5/1990 | Shuttleworth et al. . | |
| 4,948,717 | 8/1990 | Diehl et al. | 430/507 |
| 4,950,586 | 8/1990 | Diehl et al. | 430/517 |
| 4,952,495 | 8/1990 | Shibahara et al. | 430/502 |
| 4,956,269 | 9/1990 | Ikeda et al. | 430/507 |
| 4,994,356 | 2/1991 | Diehl et al. | 430/507 |
| 5,096,804 | 3/1992 | Ikenoue et al. | 430/503 |
| 5,098,820 | 3/1992 | McManus et al. | 430/517 |
| 5,229,259 | 7/1993 | Yokota | 430/523 |
| 5,290,669 | 3/1994 | Hirabayashi et al. | 430/507 |

FOREIGN PATENT DOCUMENTS

| | | |
|---|---|---|
| 0423693 | 4/1991 | European Pat. Off. . |
| 0521711 | 1/1993 | European Pat. Off. . |
| 0521664 | 1/1993 | European Pat. Off. . |
| WO88/04794 | 6/1988 | WIPO . |

OTHER PUBLICATIONS

Patents Abstracts Of Japan vol. 13, No. 40 (P–820) (3388) 30 Jan. 1989 & J–A–63 236 035 (Fuji Photo Film Co. Ltd.) 30 Sep. 1988 *abstract*.

*Primary Examiner*—Charles T. Jordan
*Assistant Examiner*—J. R. Hardee

[57] ABSTRACT

A silver halide color photographic light-sensitive material is provided, comprising photographic component layers comprising a red-sensitive layer, a green-sensitive layer, a blue-sensitive layer and a nonlight-sensitive layer, and having an ISO speed of 320 to 800, wherein the total coating weight of silver in the component layers is within a range of 3.0 to 8.0 g/m$^2$; a dry coating thickness is 22 μm or less; and at least one of the component layers contains a dye in the form of a dispersion of solid particles dispersed in a binder.

2 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

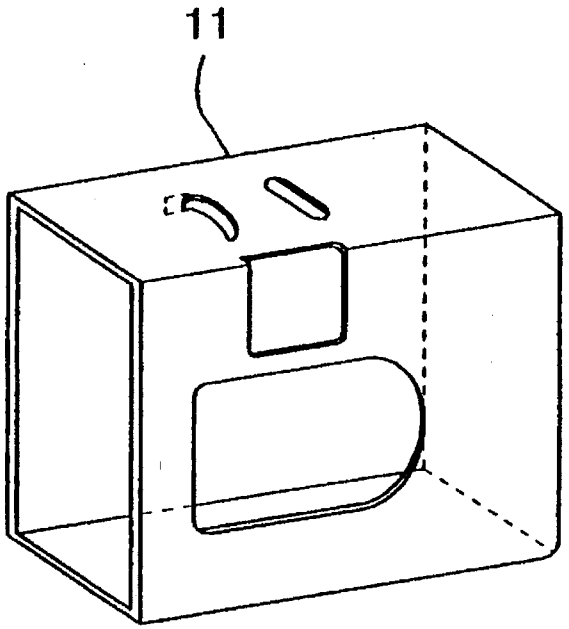
11
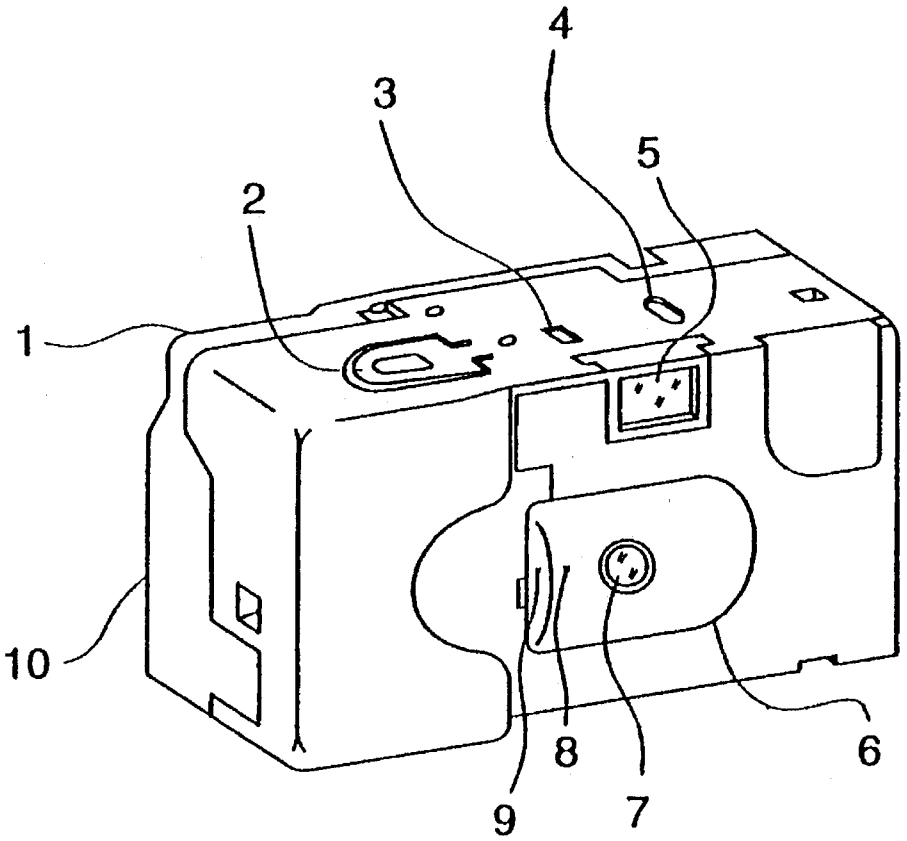
1
2
3
4
5
6
7
8
9
10

SILVER HALIDE COLOR LIGHT-SENSITIVE MATERIAL AND PHOTOGRAPHING UNIT PACKAGE

FIELD OF THE INVENTION

The present invention relates to a silver halide color light-sensitive material, particularly to a high-sensitive silver halide color light-sensitive material improved in storage stability and a photographing unit package thereof.

BACKGROUND OF THE INVENTION

ISO-100 films, which have been dominant in the market of silver halide color light-sensitive materials for popular uses, are being replaced in recent years by high-sensitive films of ISO-320 or more which have advantages of causing fewer photographing failures and providing high image qualities. Being highly sensitive, these films not only make it possible to use a high-speed shutter which can minimize the influence of movement of the hands in taking a picture and catch a subject moving quickly, but also make it possible to take a picture even in a dimly-lit place and further make it easy to adjust the focus by allowing an iris diaphragm to be considerably stopped down; as a result, failure in taking a picture can be prevented. Moreover, the image quality of these high-sensitive films is improved to the level as high as that of conventional ISO-100 films. These are the reasons why a simple photographing system like a photographing unit (or a film with lens) has been realized and accepted widely.

However, films having an ISO speed of 320 or more are high in coating weight of silver and thereby impose a heavy load on processing laboratories which are making endeavors to shorten the processing time and improve the efficiency of development; therefore, improvement of the situation is demanded. In addition, a large coating weight of silver inevitably increases the thickness of a light-sensitive material and eventually places a limit in improvement of image quality, such as sharpness, and storage stability.

Since high-sensitive films of ISO-320 or more use a high-sensitive silver halide emulsion, these films have a drawback of allowing colloidal silver particles used in a light-absorbing layer or an antihalation layer to cause undesirable contact fogs and, moreover, such colloidal silver brings about another drawback of lowering the desilverizing speed in the desilverizing process during development treatment. Though use of an organic dye is proposed as a substitute for the colloidal silver, this method is not effective and liable to produce undesirable results such as unnecessary residual absorptions due to poor decoloring property as well as lowering of filtering effect due to diffusion of the dye to other layers. Further, use of a bleaching-accelerator-releasing coupler or the like is proposed as a means to raise the desilverizing speed, but this method is not sufficient yet for practical use.

Recently, active studies are carried on to provide, in a light-sensitive material, a magnetic-substance-containing layer which acts as a magnetic recording layer for storing and supplying information, with the objects of reflecting photographer's intention, improving quality of finished photographs, preventing workers' mistakes at processing laboratories and improving efficiency in processing. However, it has been found that a silver halide color light-sensitive material sealed by a magnetic recording layer provided thereon is liable to deteriorate in the course of storage before development, in which improvement is desired. Further, it has also been found that when a photographing unit loaded with a silver halide color light-sensitive material ready for photographing is hermetically packed and stored, fluctuations in sensitivity and fogs are liable to occur.

Japanese Pat. O.P.I. Pub. No. 123348/1991 discloses a silver halide color light-sensitive material containing a fine crystal dispersion of a dye and having a total thickness of coating layers less than 10 μm, Japanese Pat. O.P.I. Pub. No. 130760/1991 discloses a silver halide color light-sensitive material containing a fine crystal dispersion of a dye and having a silver content of 12 g/m$^2$ or less, and Japanese Pat. O.P.I. Pub. No. 172342/1992 discloses a silver halide color light-sensitive material having a specific photographic sensitivity of 320 or more and a coating thickness of 22 μm or less, but none of them are sufficient in solving the above problems.

SUMMARY OF THE INVENTION

Accordingly, the object of the present invention is to provide a high-sensitive silver halide color light-sensitive material and a photographing unit excellent in storage stability without lowering image quality and increasing working loads in processing.

The object of the invention is attained by the following constituents: a silver halide color light-sensitive material having, on one side of a transparent support, photographic component layers comprising at least one layer each of red-sensitive layer, green-sensitive layer, blue-sensitive layer and nonlight-sensitive layer and having a specific photographic sensitivity ranging from 320 to 800, which is characterized in that the total coating weight of silver is in the range of 3.0 to 8.0 g/m$^2$ in amount of equivalent metallic silver, that the dry coating thickness is 22 μm or less, and that a layer containing a fine crystal dispersion of a dye is provided therein; preferably a silver halide color light-sensitive material in which the fine crystal dispersion of a dye is at least one compound selected from those respectively having the following formulas (I) to (VI); preferably a silver halide color light-sensitive material in which the fine crystal dispersion of a dye is a silver salt of the dye; a silver halide color light-sensitive material having a magnetic recording layer on the other side of the transparent support; and a hermetically packed photographing unit package loaded with the above silver halide color light-sensitive material in a condition ready for photographing.

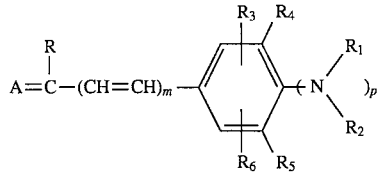

Formula (I)

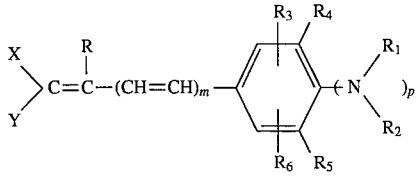

Formula (II)

$$A=L_1-(L_2=L_3)_n-A'$$ Formula (III)

$$A=(L_2=L_3)_{2-q}=B$$ Formula (IV)

-continued

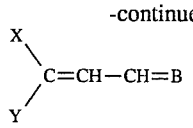

Formula (V)

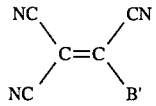

Formula (VI)

In the formulas, A and A', which may be the same or different, independently represent an acidic nucleus; B represents a basic nucleus; X and Y, which may be the same or different, independently represent an electron withdrawing group; R represents a hydrogen atom or an alkyl group; $R_1$ and $R_2$ independently represent an alkyl, aryl, acyl or sulfonyl group and may form a 5- or 6-membered ring by linking with each other; $R_3$ and $R_6$ independently represent a hydrogen or halogen atom or a hydroxyl, carboxyl, alkyl or alkoxy group; $R_4$ and $R_5$ independently represent a hydrogen atom or a group of non-metallic atoms necessary to form a 5- or 6-membered ring by linking of $R_4$ with $R_1$, or $R_5$ with $R_2$; $L_1$, $L_2$ and $L_3$ independently represent a methine group; m represents 0 or 1; n and q each represent 0, 1 or 2; p represents 0 or 1, and when p is 0, $R_3$ is a hydroxyl or carboxyl group and $R_4$ and $R_5$ are hydrogen atoms; B represents a heterocyclic group having a carboxyl, sulfamoyl or sulfonamido group; and each molecule of the compounds represented by formulas (I) to (VI) has at least one dissociative group whose pKa is within the rang of 4 to 11 in a 1:1 volume mixture of water and ethanol.

BRIEF DESCRIPTION OF THE DRAWING

The FIGURE shows an exploded perspective of the photographing unit package according to the invention. 1 Film Winding Knob 2 Release Head 3 Film Counter Window 4 Pilot Lamp for Stroboscope Charge 5 Finder 6 Lens Mount 7 Photographing Lens 8 Center Position 9 Center of Gravity 10 Back Lid 11 Carton

DETAILED DESCRIPTION OF THE INVENTION

In the embodiment of the invention, the specific photographic sensitivity is in the range of 320 to 800, preferably 400 to 600.

The specific photographic sensitivity of a light-sensitive material used in the invention is determined by the following test method which corresponds to the test method of ISO speed. (corresponding to JIS K 7614-1981)

(1) Testing Conditions

Tests are carried out in a room conditioned at 20±5° C. and 0±10% relative humidity. Prior to testing, a test sample of a light-sensitive material is allowed to stand for at least 1 hour.

(2) Exposing

1) The relative spectral energy distribution of the standard light at the exposed surface is as follows:

TABLE 1

| Wavelength (nm) | Relative Spectral Energy (1) |
|---|---|
| 360 | 2 |
| 370 | 8 |
| 380 | 14 |
| 390 | 23 |
| 400 | 45 |

TABLE 1-continued

| Wavelength (nm) | Relative Spectral Energy (1) |
|---|---|
| 410 | 57 |
| 420 | 63 |
| 430 | 62 |
| 440 | 81 |
| 450 | 93 |
| 460 | 97 |
| 470 | 98 |
| 480 | 101 |
| 490 | 97 |
| 500 | 100 |
| 540 | 102 |
| 550 | 103 |
| 560 | 100 |
| 570 | 97 |
| 580 | 98 |
| 590 | 90 |
| 600 | 93 |
| 610 | 94 |
| 620 | 92 |
| 630 | 88 |
| 640 | 89 |
| 650 | 86 |
| 660 | 86 |
| 670 | 89 |
| 680 | 85 |
| 690 | 75 |
| 700 | 77 |

Notes (1):
shown in values relative to the value at 560 nm which is set at 100.

2) The illumination intensity at the exposed surface is varied using an optical wedge, whose fluctuation in spectral transmission density in the wavelength range of 360 to 700 nm should be, at its every portion, less than 10% for the light below 400 nm and less than 5% for the light above 400 nm.

3) The exposing time is 1/100 second.

(3) Processing

1) Exposed light-sensitive material samples are kept at 20±5° C. and 60±10% relative humidity till these are subjected to processing.

2) Processing is completed within the period ranging from 30 minutes to 6 hours after exposing.

3) Processing is carried out in accordance with Eastman Kodak Company's Processing C-41 described in British Journal of Photography Annual 1988, pp. 196–198.

(4) Densitometry

Densities are expressed in $\log_{10}(\Phi_0/\Phi)$, where $\Phi_0$ is an illuminating light flux for densitometry and $\Phi$ is a transmitted light flux at a measured portion. The geometrical requirement in densitometry is that the illuminating light flux is a parallel light flux in normal direction, and the whole light flux transmitted and diffused to a semi-sphere is taken as the transmitted light flux. When measurements are made otherwise, correction must be made by use of a standard density specimen. At a measurement, the emulsion layer side is faced with the light-receiving apparatus side. In carrying out the densitometry, status M densities of blue, green and red are used, and their spectral characteristics are controlled so as to give the values shown in Tables 1 and 2 as the overall characteristics of a light source used for thermometer, an optical system, an optical filter and a light-receiving apparatus.

TABLE 2

| Status M Density Spectral Characteristics (in logarithms, the peak value is standardized to 5.00) | | | |
|---|---|---|---|
| Wavelength nm | Blue | Green | Red |
| 400 | −0.40 | −6.29 | −55.1 |
| 410 | 2.10 | −5.23 | −52.5 |
| 420 | 4.11 | −4.17 | −49.9 |
| 430 | 4.63 | −3.11 | −47.3 |
| 440 | 4.37 | −2.05 | −44.7 |
| 450 | 5.00 | −0.99 | −42.1 |
| 460 | 4.95 | 0.07 | −39.5 |
| 470 | 4.74 | 1.13 | −36.9 |
| 480 | 4.34 | 2.19 | −34.3 |
| 490 | 3.74 | 3.14 | −31.7 |
| 500 | 2.99 | 3.79 | −29.1 |
| 510 | 1.35 | 4.25 | −26.5 |
| 520 | −0.85 | 4.61 | −23.9 |
| 530 | −3.05 | 4.85 | −21.3 |
| 540 | −5.25 | 4.98 | −18.7 |
| 550 | −7.45 | 4.98 | −16.1 |
| 560 | −9.65 | 4.80 | −13.5 |
| 570 | −11.9 | 4.44 | −10.9 |
| 580 | −14.1 | 3.90 | −8.29 |
| 590 | −16.3 | 3.15 | −5.69 |
| 600 | −18.5 | 2.22 | −3.09 |
| 610 | −20.7 | 1.05 | −0.49 |
| 620 | −22.9 | −0.15 | 2.11 |
| 630 | −25.1 | −1.35 | 4.48 |
| 640 | −27.3 | −2.55 | 5.00 |
| 650 | −2.95 | −3.75 | 4.90 |
| 660 | −31.7 | −4.95 | 4.58 |
| 670 | −33.9 | −6.15 | 4.25 |
| 680 | −36.1 | −7.35 | 3.88 |
| 690 | −38.3 | −8.55 | 3.49 |
| 700 | −4.05 | −9.75 | 3.10 |
| 710 | −42.7 | −10.9 | 2.69 |
| 720 | −44.9 | −12.2 | 2.27 |
| 730 | −47.1 | −13.4 | 1.86 |
| 740 | −49.3 | −14.6 | 1.45 |
| 750 | −51.5 | −15.8 | 1.05 |

(5) Determination of Specific Photographic Sensitivity

Using values measured under the conditions shown in paragraphs (1) to (4), the specific photographic sensitivity is determined by the following procedure:

1) Exposures corresponding to the densities higher than respective minimum densities of blue, green and red by 0.15, which are expressed in lux·sec, are referred to as $H_B$, $H_G$ and $H_R$, respectively.

2) Of $H_B$ and $H_R$, the larger one (one lower in sensitivity) is referred to as $H_s$.

3) The photographic sensitivity S is calculated using the following equation:

$$S=\sqrt{\frac{2}{H_G \times H_S}}$$

In the embodiment of the invention, the total coating weight of silver in the photographic component layers is preferably in the range of 3.0 to 8.0 g/m$^2$, preferably 3.0 to 7.0 g/m$^2$ and more preferably 3.5 to 6.5 g/m$^2$ in amount of equivalent metallic silver. Too large a coating weight of silver, though effective in improving image quality of a light-sensitive material, not only imposes a heavy load upon processing but also spoils the effect of the invention. Too small a coating weight Of silver cannot provide an optical density necessary for a silver halide color light-sensitive material and, moreover, the graininess of images is substantially deteriorated. In the invention, the term coating weight of silver means the amount of metallic silver equivalent to the total amount of silver compounds, such as silver halides and silver colloids, contained in the photographic component layers. The silver coating weight can be typically determined by atomic-absorption analysis using silver cyanide or fluorescent X-ray analysis. In the embodiment of the invention, means to achieve such a low coating weight of silver include (1) adoption of internally high iodide content type silver halide grains, (2) combination of twin crystal grains with regular crystal grains, (3) use of rapid reacting couplers, (4) allocation of developing-inhibitor-releasing couplers to layers, (5) allocation of silver halides to a plurality of layers different in sensitivity and the same in spectral sensitivity, and (6) reduction in polyvalent metallic ion content to 500 ppm or less in the photographic component layers.

The thickness of all hydrophilic colloidal layers, including a protective layer and layers provided thereunder toward a support, can be easily determined by the steps of conditioning a coated sample for 2 days at 25° C. and 55% RH, measuring the total thickness of the sample with a commercial thickness meter (e.g., Anritsu-K402B or -K351C) and subtracting the support's thickness.

The support thickness can be obtained by removing the hydrophilic colloidal layers formed on the support using a solution containing a gelatin decomposing enzyme.

The thickness of the hydrophilic colloidal layers is 22 Bm or less, preferably 20 μm or less and more preferably in the range of 14 to 18 μm.

Preferably, the swelling rate $T_{1/2}$ is 30 sec or less. The swelling rate can be measured by methods known in the art. For example, it can be determined by use of the swellometer described in A. Green, Photographic Science and Engineering, Vol. 19, No. 2, pp. 124–129. In this case, 90% of the maximum swelling thickness obtained in processing at 30° C. for 3 minutes with a color developer is regarded to be saturation thickness, and the swelling rate $T_{1/2}$ is defined as the time required of a sample to reach the saturation thickness.

The swelling rate ($T_{1/2}$) can be adjusted by adding a hardener for gelatin used as a binder or by varying aging conditions after coating. Further, the degree of swell is preferably in the range of 150 to 400%. The value of this degree of swell can be calculated from the above maximum swelling thickness according to the equation: (Maximum Swelling Thickness—Thickness Before Swelling)/Thickness Before Swelling.

The compounds (dyes) of formulas (I) to (VI) according to the invention are the same as those defined in the specification of Japanese Pat. O.P.I. Pub. No. 130760/1991; the substituents and partial structures they may have are described from the upper left of page 596 to the upper left of page 598 in the same secification. The representative examples of the compounds are given below.

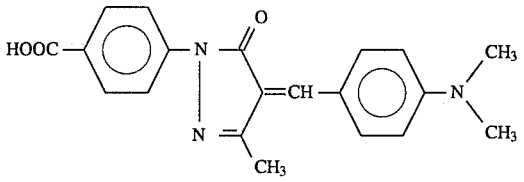
I-1
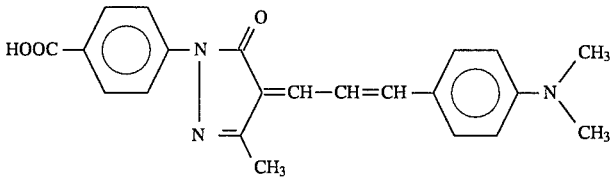
I-2
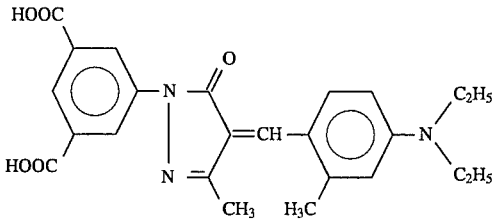
I-3
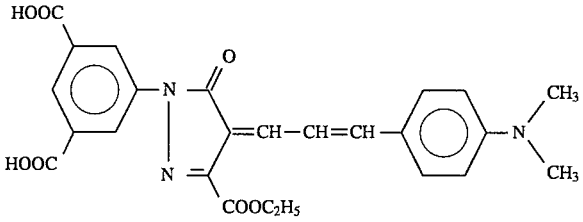
I-4
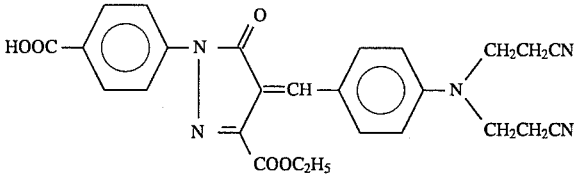
I-5
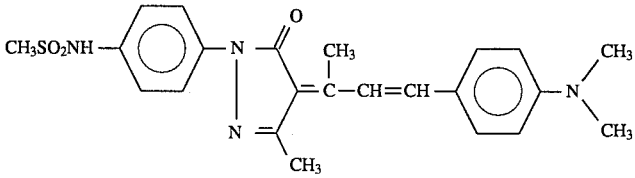
I-6
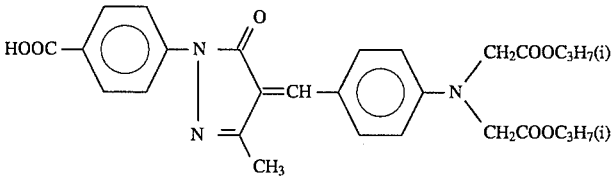
I-7
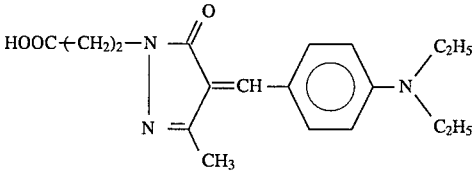
I-8

-continued
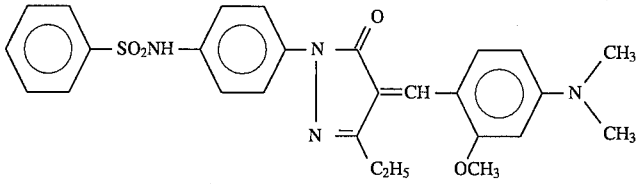
I-9
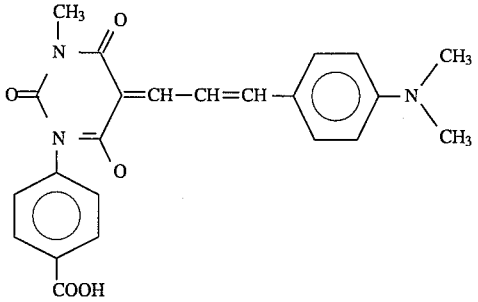
I-10
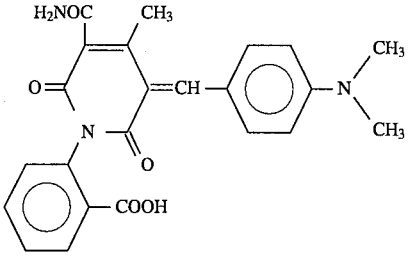
I-11
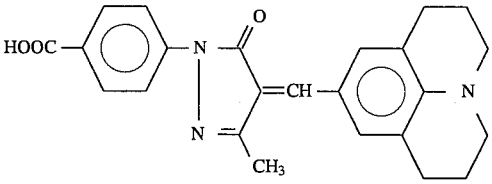
I-12
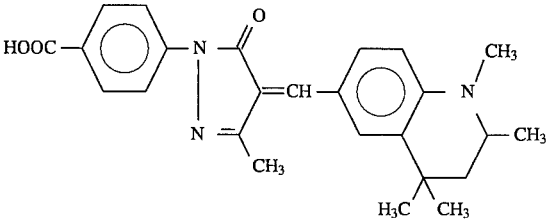
I-13
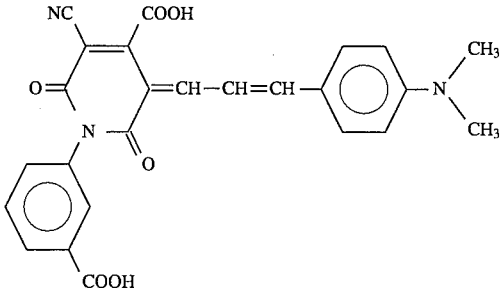
I-14

-continued
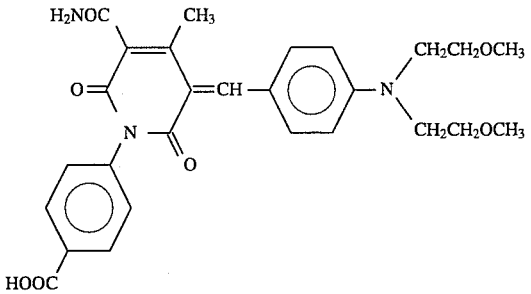
I-15
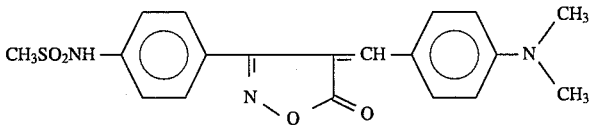
I-16
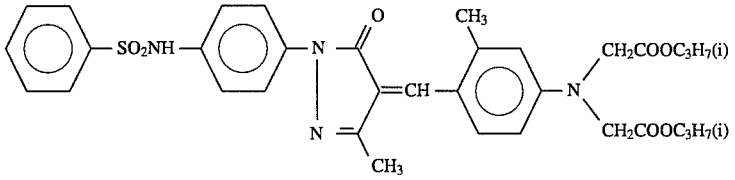
I-17
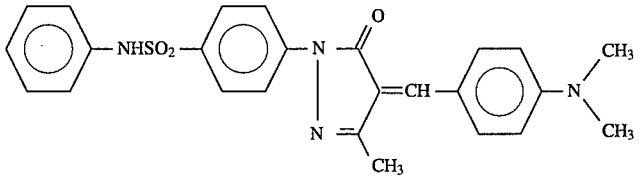
I-18
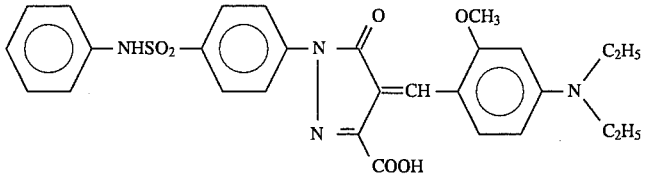
I-19
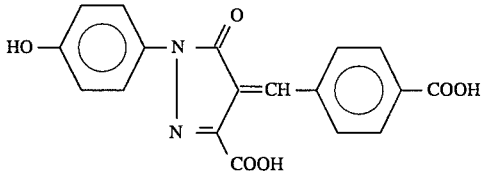
I-20
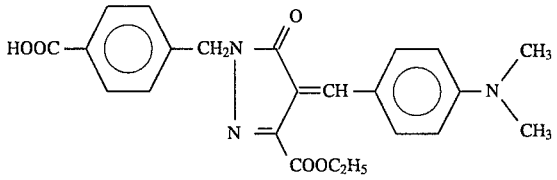
I-21
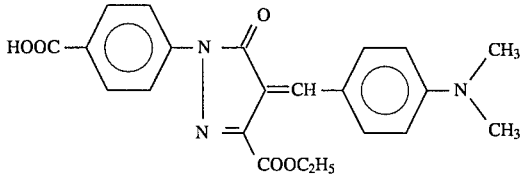
I-22

-continued
I-25
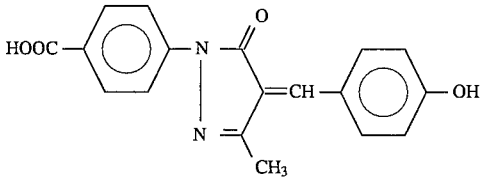
I-26
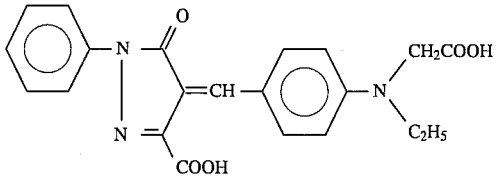
I-27
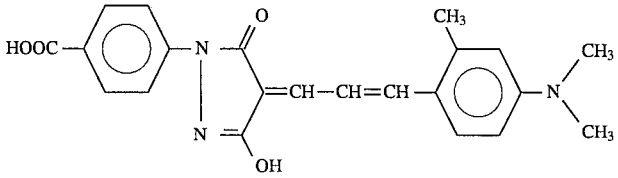
I-28
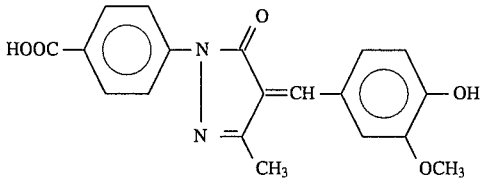
II-1
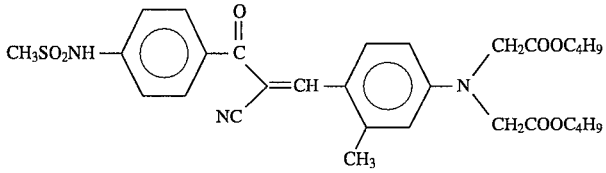
II-2
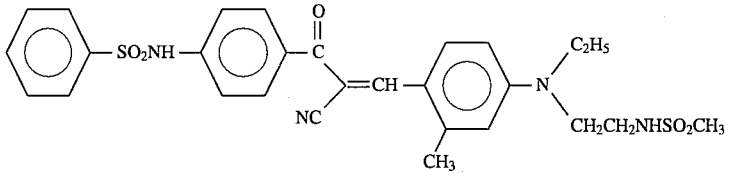
II-3
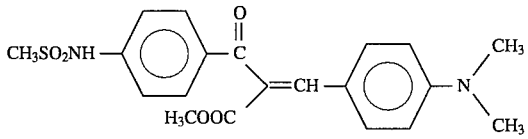
II-4
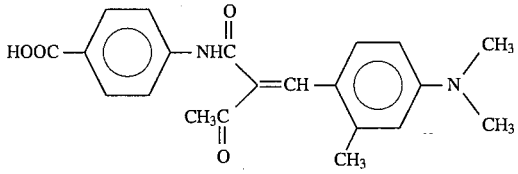
II-5
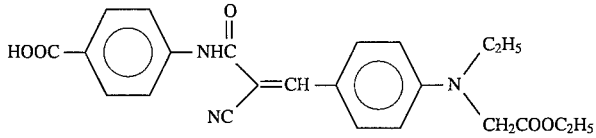

-continued
II-6
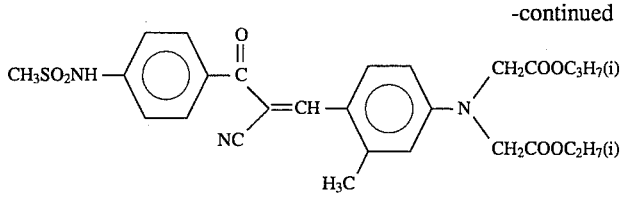
III-1
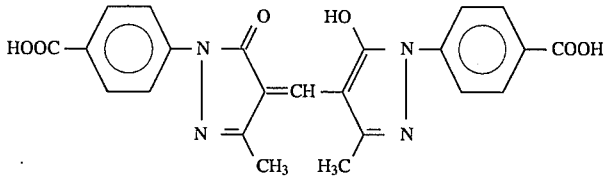
III-2
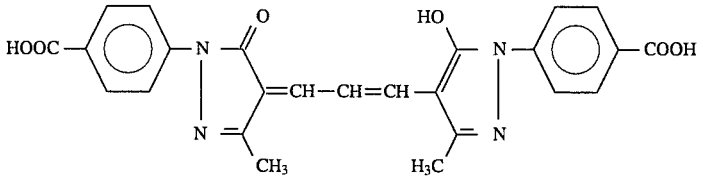
III-3
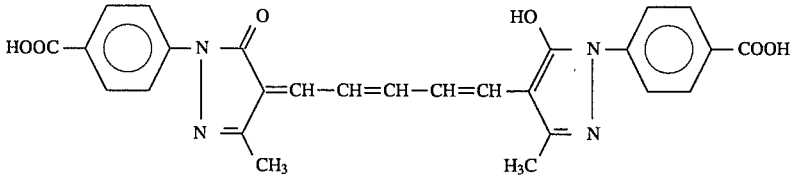
III-4
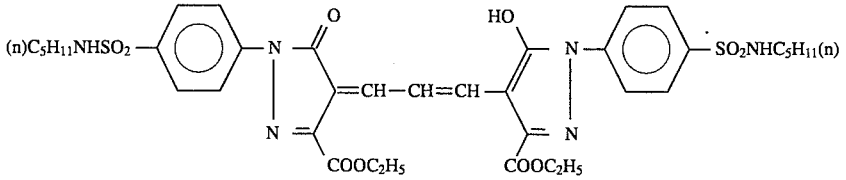
III-5
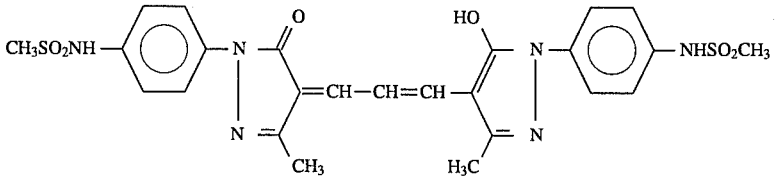
III-6
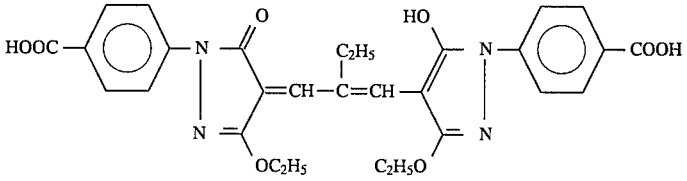
III-7
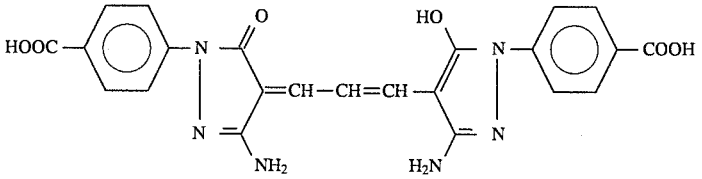

-continued
III-8
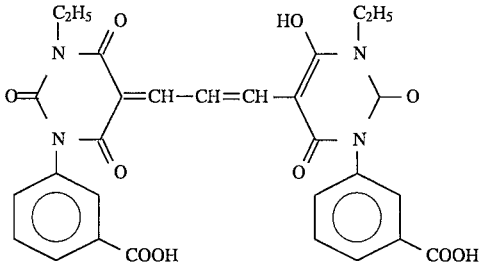
III-9
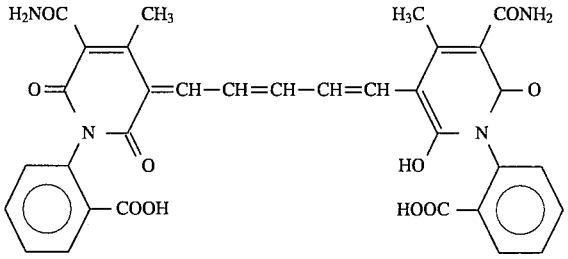
III-10
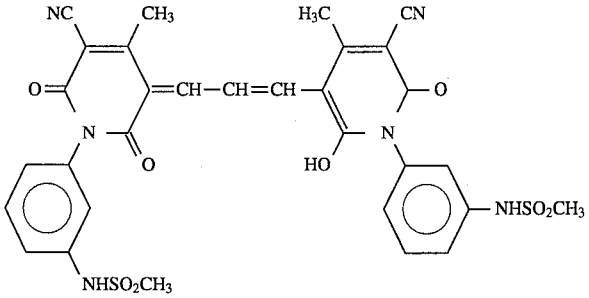
III-11
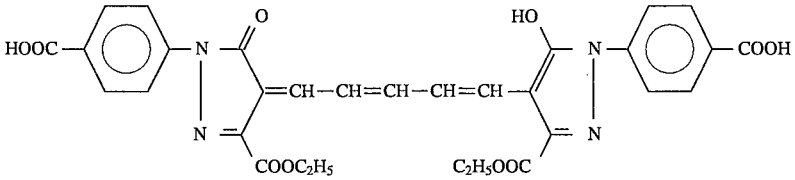
III-12
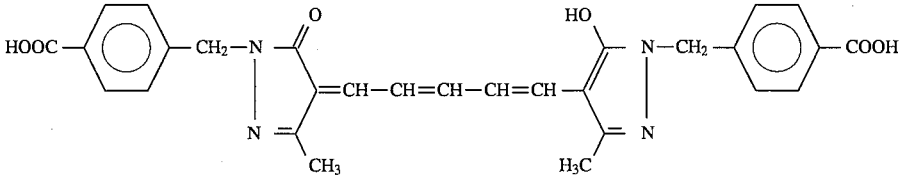
III-13
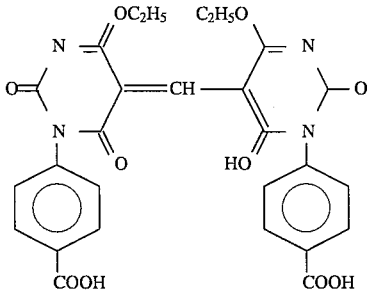
III-14
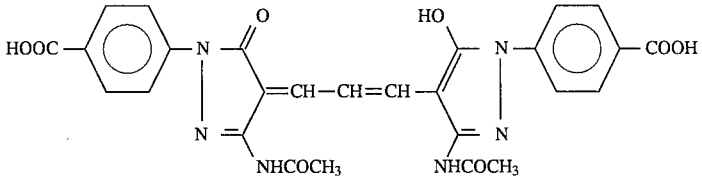

-continued
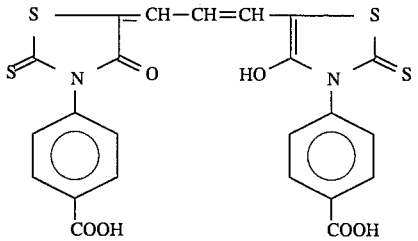
III-15
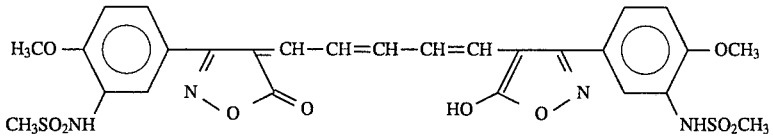
III-16
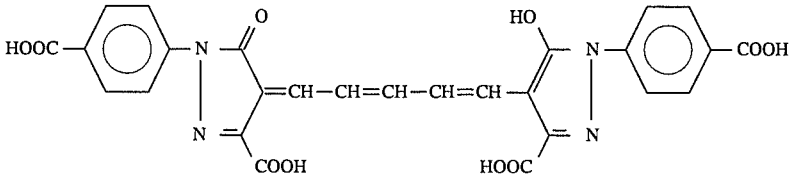
III-17
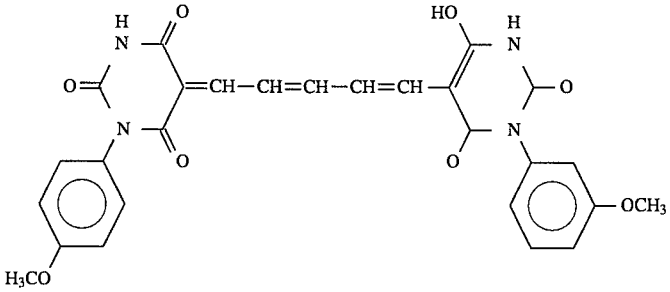
III-18
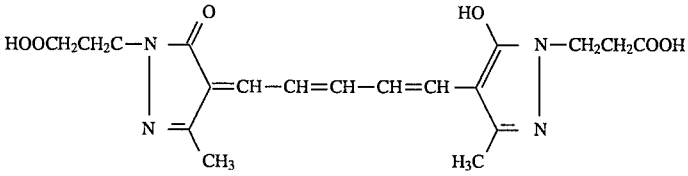
III-19
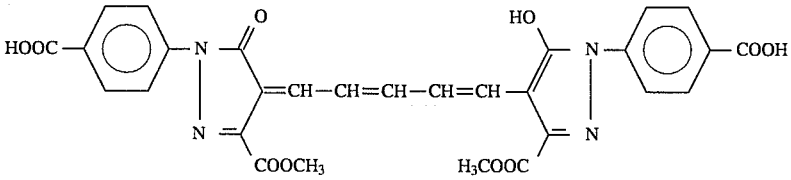
III-20
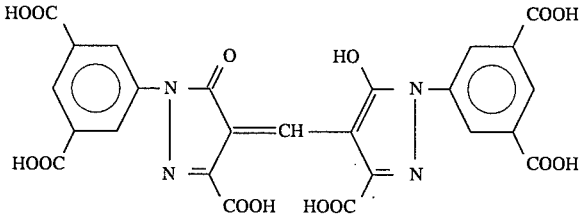
III-21
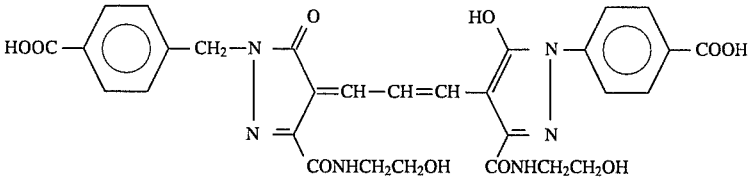
III-22

-continued
III-23
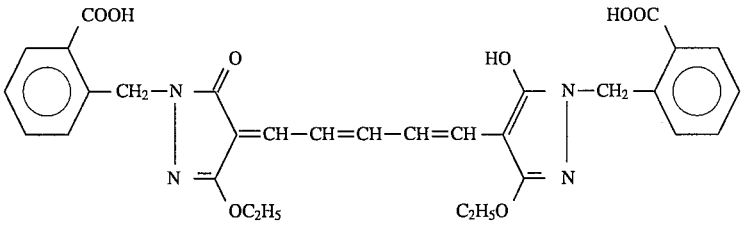
III-24
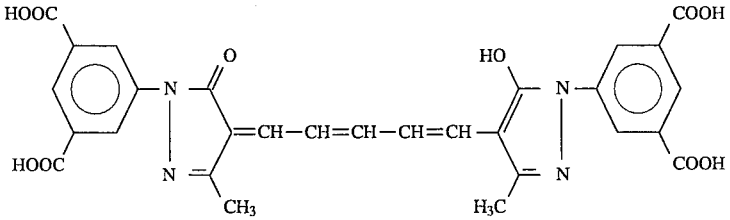
III-25
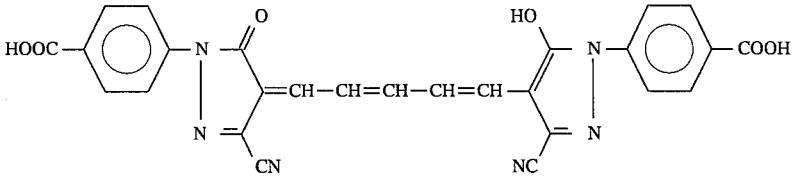
III-26
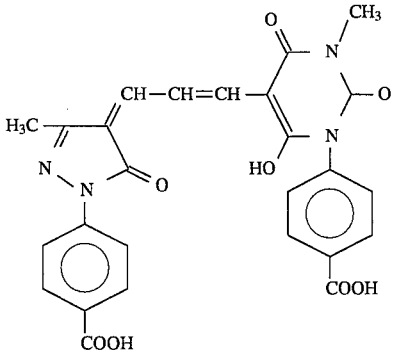
III-27
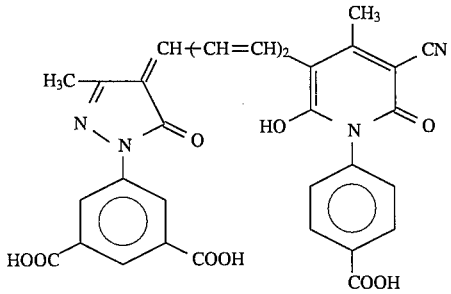
III-28
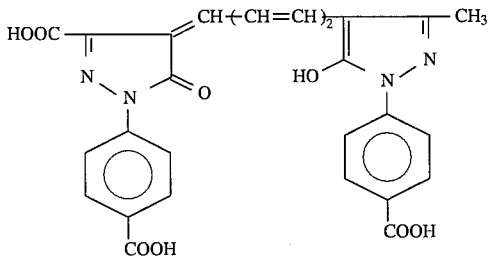

-continued
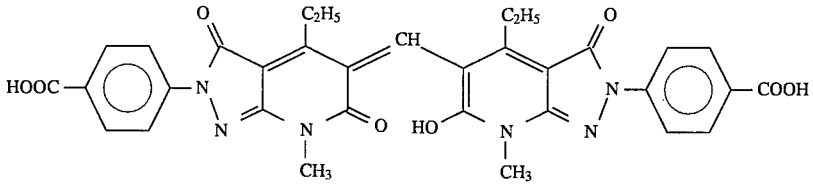
III-29
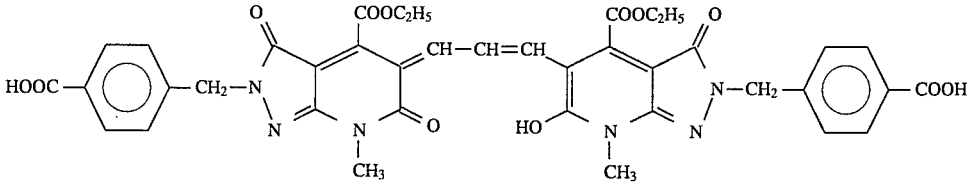
III-30
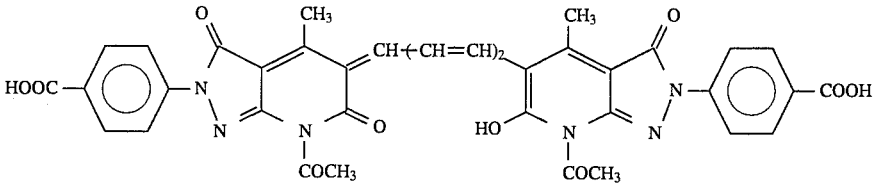
III-31
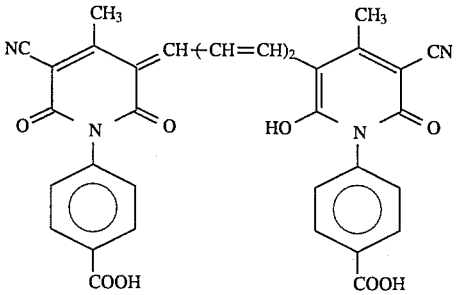
III-32
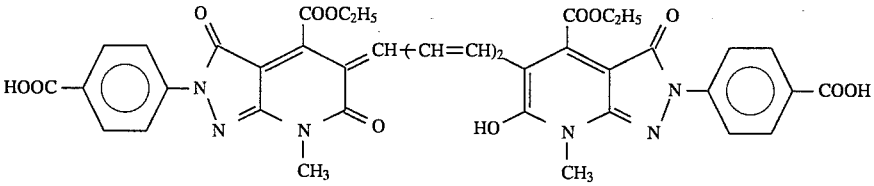
III-33
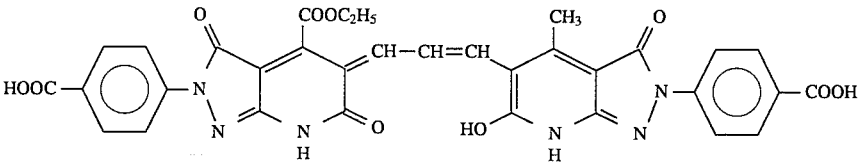
III-34
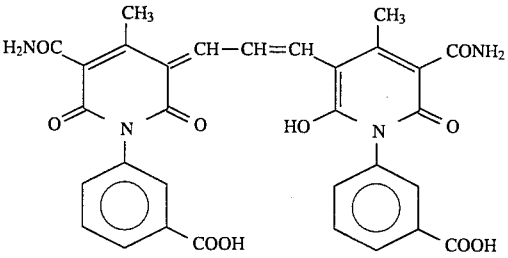
III-35
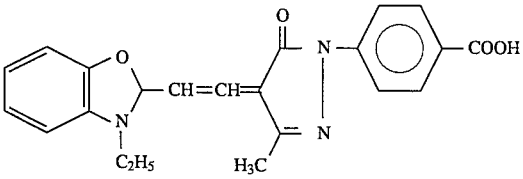
IV-1

-continued
IV-2
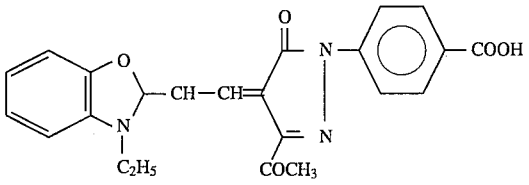
IV-3
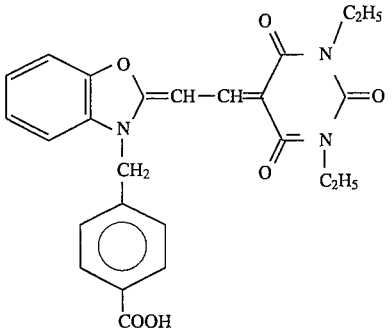
IV-4
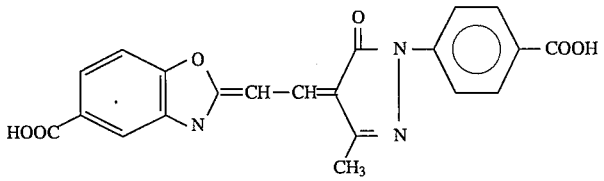
IV-5
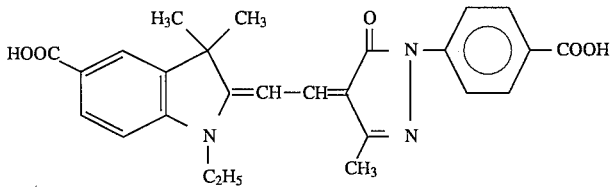
IV-6
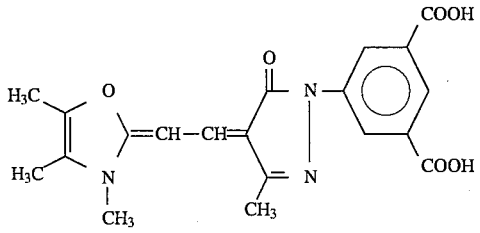
IV-7
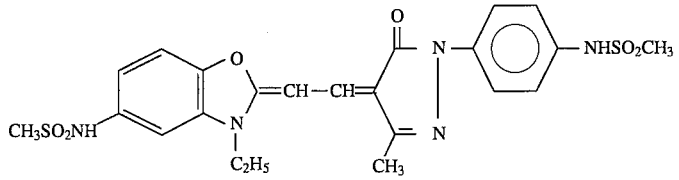
IV-8
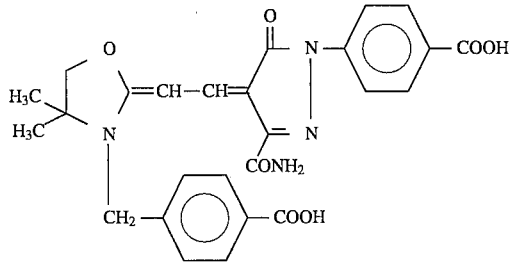

-continued
IV-9
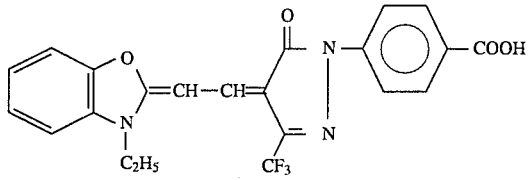
IV-10
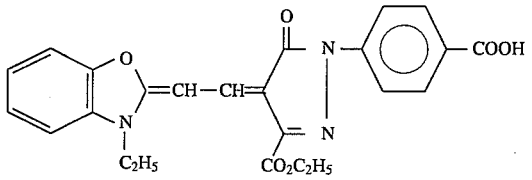
IV-11
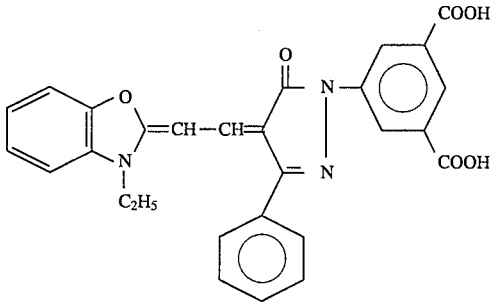
IV-12
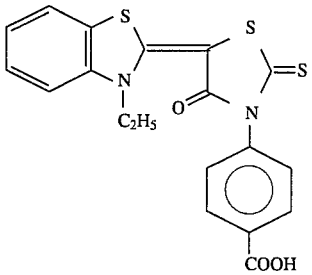
IV-13
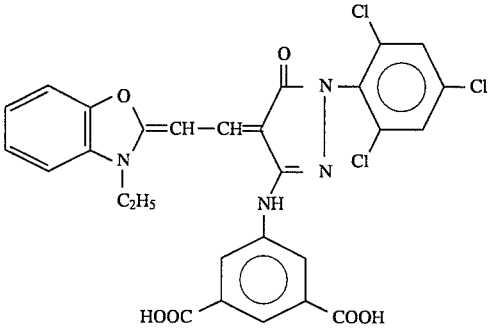
IV-14
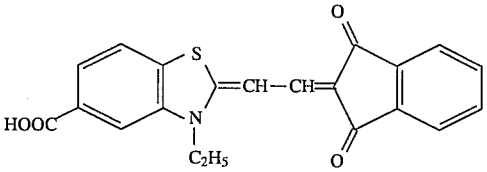
IV-15
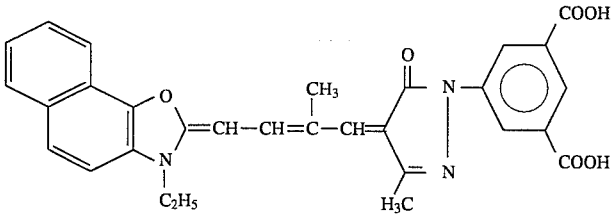

-continued
IV-16
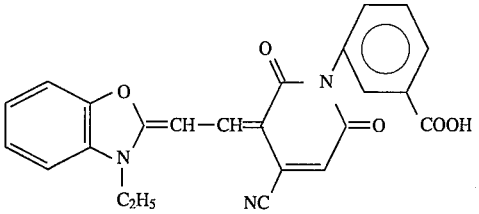
V-1
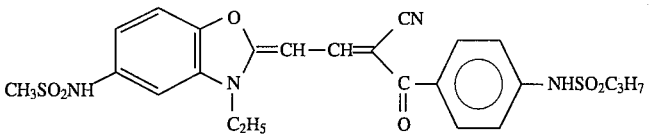
V-2
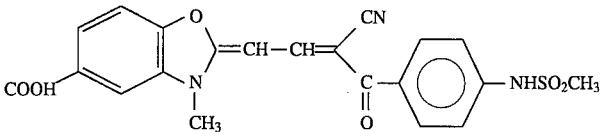
V-3
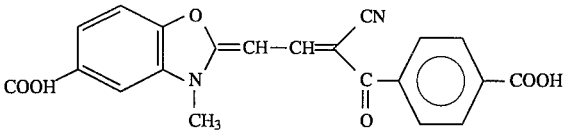
V-4
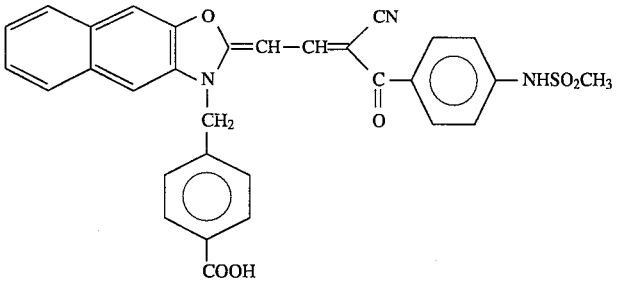
V-5
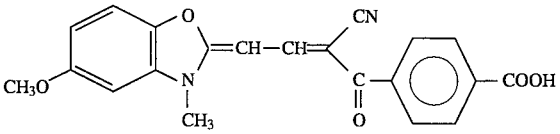
V-6
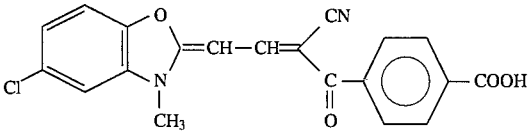
V-7
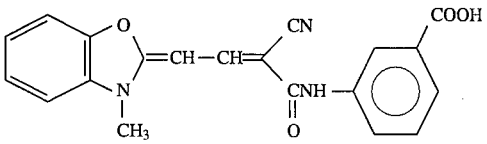
VI-1
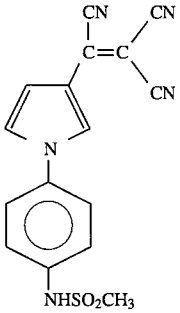

-continued
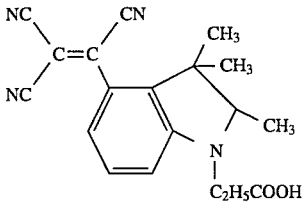
VI-2
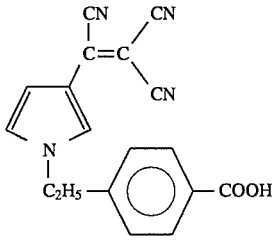
VI-3
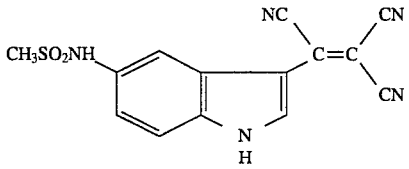
VI-4
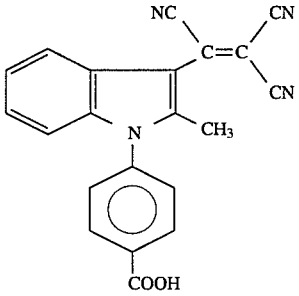
VI-5
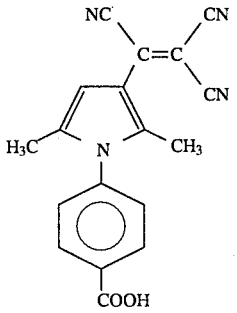
VI-6
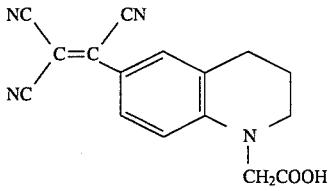
VI-7
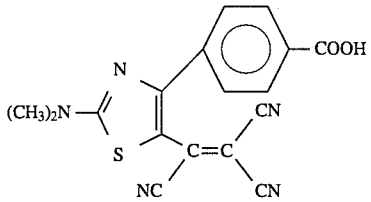
VI-8

-continued

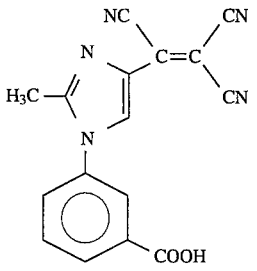

VI-9

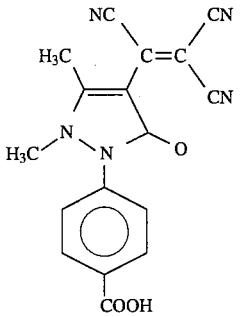

VI-10

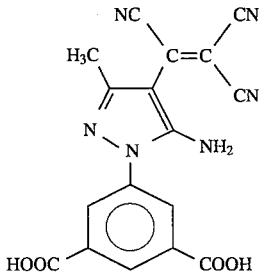

VI-11

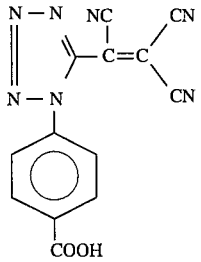

VI-12

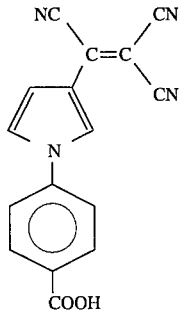

VI-13

The dyes used in the invention can be synthesized with ease by, or in accordance with, the methods described in International Pat. No. WO88/04794, European Pat. Nos. 0274723A1, 276,566, 299,435, Japanese Pat. O.P.I. Pub. Nos. 92716/1977, 155350/1980, 155351/1980, 205934/1985, 68623/1973, U.S. Pat. Nos. 2,527,583, 3,486,897, 3,746,539, 3,933,798, 4,130,429, 4,040,841.

Preferred silver salts of dyes in the invention are compounds in the specification of Japanese Pat. Appl. No. 283588/1992.

Thus, in the present invention, a silver salt of dye represents a silver salt and a silver complex formed by the reaction between a dye and a silver ion. A dye represents an organic compound having absorption in a visible spectral (380–700 rim).

As the above-mentioned dyes, dyes represented by the following formulas XI to XXI can be cited.

Formula XI

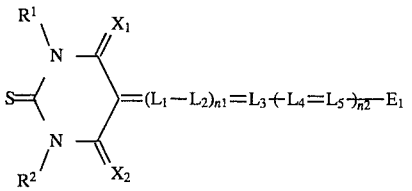

wherein $R^1$ and $R^2$ each represents a hydrogen atom, an alkyl group, an alkenyl group, an aryl group or a heterocyclic group; $X_1$ and $X_2$ each represents an oxygen atom or a sulfur atom; $L_1$ to $L_5$ represent methine groups; $n_1$ and $n_2$ each represents 0 to 2 integers; $E_1$ represents a group having an acid nucleus.)

Formula XII

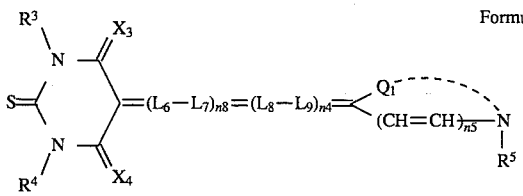

wherein $R^3$ and $R^4$ are the same as $R^1$ and $R^2$ in Formula XI; $X_3$ and $X_4$ are the same as $X_1$ and $X_2$ in Formula XI; $L_6$ to $L_9$ represent methine group; $n_3$ to $n_5$ represent 0 to 2 integers; $R^5$ represents an alkyl group or an alkenyl group; $Q_1$ represents a non-metallic atom group necessary for forming 5-membered or 6- membered heterocyclic group.)

Formula XIII

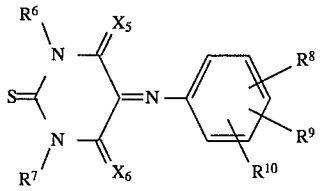

(wherein $R^6$ and $R^7$ represent $R^1$ and $R^2$ in Formula XI; $X_5$ and $X_6$ represent $X_1$ and $X_2$ in Formula XI; $R^8$ to $R^{10}$ represent a hydrogen atom, an alkyl group, an alkenyl group, an aryl group, a heterocyclic group, a halogen atom, a cyano group, a sulfo group, $—COR^{11}$, $—CON(R^{11})(R^{12})$, $—N(R^{11})(R^{12})$, $—OR^{11}$, $—SOR^{11}$, $—SO_2N(R^{12}$, $—N(R^{11})COR^{12}$, $—N(R^{11})SO_2R^{12}$, $—N(R^{11})CON(R^{12})(R^{13})$, $—SR^{11}$ or $—COOR^{11}$; $R^{11}$ to $R^{13}$ represent a hydrogen atom, an alkyl group, an alkenyl group, an aryl group or a heterocyclic group.

Formula XIV

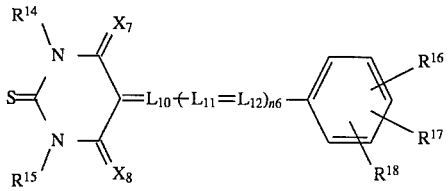

(wherein $R^{14}$ and $R^{15}$ are the same as $R^1$ and $R^2$ in Formula XI; $X_7$ and $X_8$ are the same as $X_1$ and $X_2$ in Formula XI. $L_{10}$ to $L_{12}$ represent methine groups; $n_6$ represents 0 to 2 integers; $R^{16}$ to $R^{18}$ are the same as $R^8$ to $R^{10}$ in Formula XIII.

Formula XV

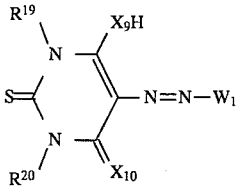

(wherein $R^{19}$ and $R^{20}$ are the same as $R^1$ and $R^2$ in Formula XI; $X_9$ and $X_{10}$ are the same as $X_1$ and $X_2$; $W_1$ represents an aryl group or a heterocyclic group.)

In the above-mentioned formulas, as alkyl groups represented by $R^1$ and $R^2$, for example, a methyl group, an ethyl group, a propyl group, an isopropyl group, an n-butyl group, a tert-butyl group, a cyclopentyl group and a cyclohexyl group are cited. The above-mentioned alkyl group may be substituted by a hydroxy group, a cyano group, a sulfo group, a carboxyl group, a halogen atom (for example, a fluorine atom, a chlorine atom and a bromine atom), an alkoxy group (for example, a methoxy group and an ethoxy group), an aryloxy group (for example, a phenoxy group, a 4-sulfophenoxy group, a 2,4-disulfophenoxy group), an aryl group (for example, a phenoxy group, a 4-sulfophenyl group and a 2,5-disulfophenyl group), an alkoxycarbonyl group (for example, a methoxycarbonyl group and an ethoxycarbonyl group) and an aryloxycarbonyl group (for example, a phenoxycarbonyl group).

As aryl groups represented by $R^1$, $R^2$ and $W_1$, for example, a phenyl group and a naphthyl group are cited. These groups can be substituted by an alkyl group represented by $R^1$ and $R^2$ and the same group as a substituent represented by the substituent for an alkyl group.

As heterocyclic group represented by $R^1$, $R^2$ and $W_1$, for example, a pyridyl group, a thiazolyl group, an oxazolyl group, an imidazolyl group, a furyl group, a pyrrolyl group, a pyrazinyl group, a pyrimidinyl group, a pyridazinyl group, a purinyl group, a selenazolyl group, a sulforanyl group, a piperidinyl group, a pyrazolyl group and a tetrazolyl group are cited. These groups can be substituted by an alkyl group represented by $R^1$ and $R^2$ and the same group as a substituent represented by the substituent for an alkyl group.

As alkenyl groups represented by $R^1$ and $R^2$, for example, a vinyl group and an aryl group are cited. These groups can be substituted by an alkyl group represented by $R^1$ and $R^2$ and the same group as a substituent represented by the substituent for an alkyl group.

As groups having an acid nucleus represented by $E_1$ in Formula I, for example, a group having a skeleton described in the 20th line of page 11 to 15th line of page 14 of Japanese Patent O.P.I. Publication No. 61-281235/1986 and groups illustrated by the following formulas 1 to 4:

Formula 1

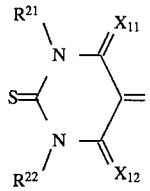

(wherein $R^{21}$ and $R^{22}$ are the same as $R^1$ and $R^2$ in the above-mentioned formula XI. In addition, $X_{11}$ and $X_{12}$ are the same as $X_1$ and $X_2$ in Formula XI.)

Formula 2

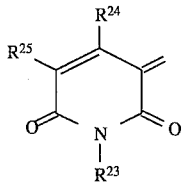

(wherein $R^{23}$ is the same as $R^1$ and $R^2$ in the above-mentioned formula XI; $R^{24}$ and $R^{25}$ are the same as $R^8$ to $R^{10}$ in the above-mentioned formula XIII.)

Formula 3

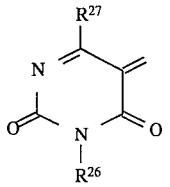

(wherein $R^{26}$ is the same as $R^1$ and $R^2$ in the above-mentioned formula XI; $R^{27}$ is the same as $R^8$ to $R^{10}$ in the above-mentioned formula XIII.)

Formula 4

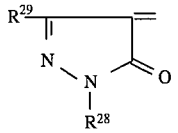

(wherein $R^{28}$ is the same as $R^1$ and $R^2$ in the above-mentioned formula XI; $R^{29}$ represents an alkyl group, an aryl group, an alkenyl group, a heterocyclic group, a cyano group, $—COR^{30}$, $—CON(R^{30})(R^{31})$, $—OR^{30}$, $—SOR^{30}$, $—SO_2N(R^{30})(R^{31})$, $—N(R^{30})COR^{31}$, $—N(R^{30})SO_2R^{31}$—$N(R^{30})CON(R^{31})(R^{32})$, $—SR^{30}$ and $—COOR^{30}$; $R^{30}$ to $R^{32}$ are the same as $R^{11}$ to $R^{13}$ in the above-mentioned formula XIII.)

As above-mentioned alkyl group, alkenyl group, aryl group and heterocyclic group, the same group as those illustrated in $R^1$ and $R^2$ are cited.

In the above-mentioned explanation, the groups having an acid nucleus represented by $E_1$ was illustrated in the form of keto type. However, it is chemically apparent that they can take form of enol by means of tautomerism.

As 5- membered or 6- membered heterocycles formed in $Q_1$ in Formula II, heterocycles described in pp.23 to 26 in Japanese Patent O.P.I. Publication No. 282832/1986 and heterocycles represented by Formula 5

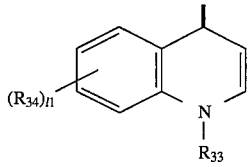

(wherein $R^{33}$ represents the same as $R^1$ and $R^2$ in the above-mentioned Formula I; $R^{34}$ are the same as $R^8$ to $R^{10}$ in the above-mentioned Formula III; $l_1$ represents 0 to 3 integers.)

The following are practical examples of compounds illustrated by Formulas XI to XV.

XI-1

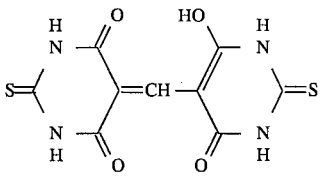

XI-2

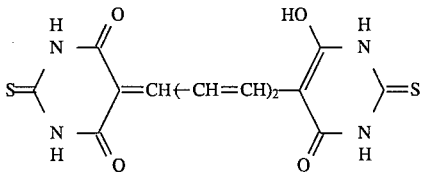

XI-3

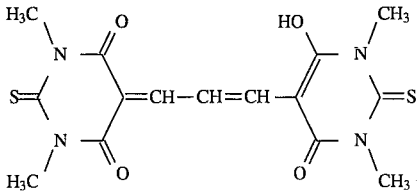

XI-4

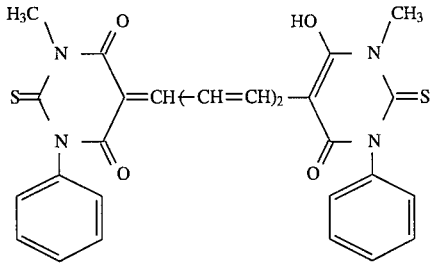

-continued
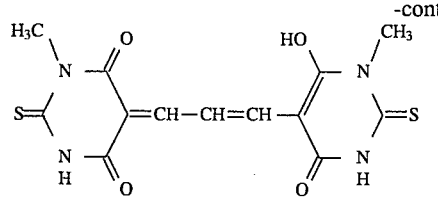
XI-5
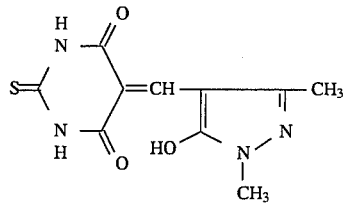
XI-6
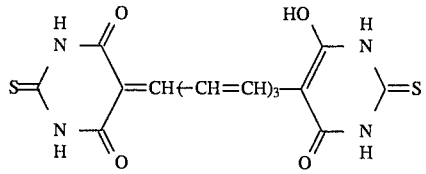
XI-7
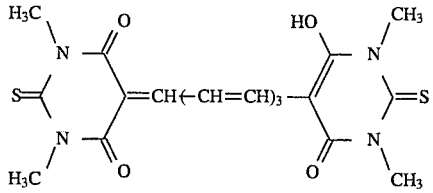
XI-8
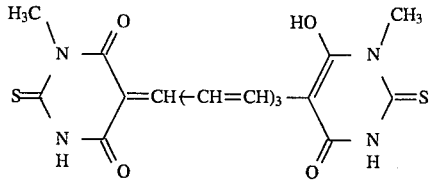
XI-9
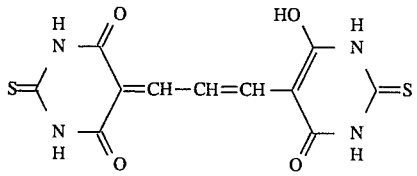
XI-10
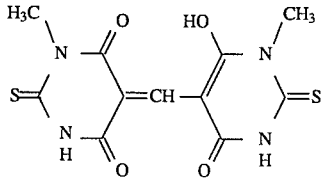
XI-11
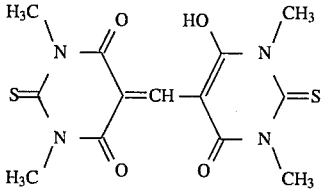
XI-12

-continued
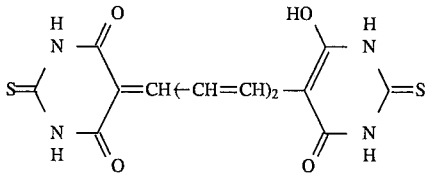
XI-13
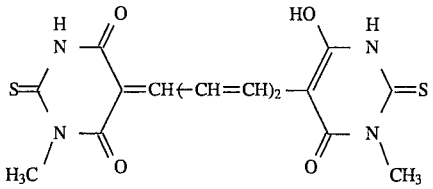
XI-14
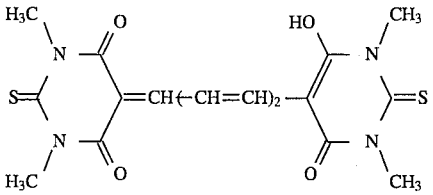
XI-15
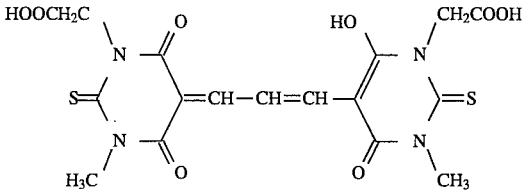
XI-16
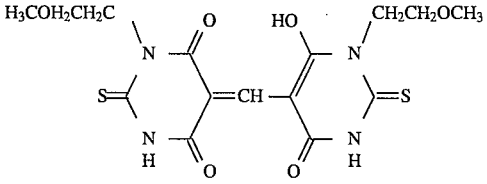
XI-17
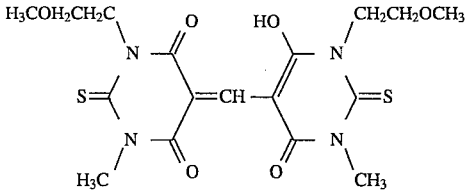
XI-18
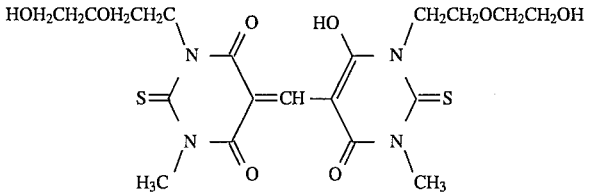
XI-19
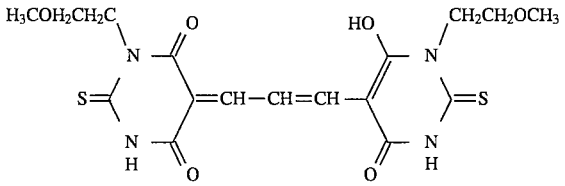
XI-20

-continued
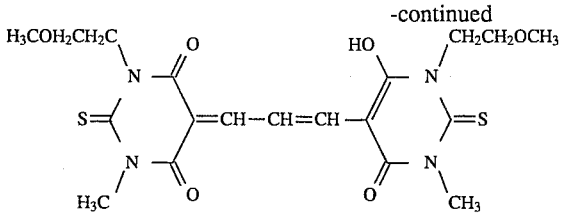
XI-21
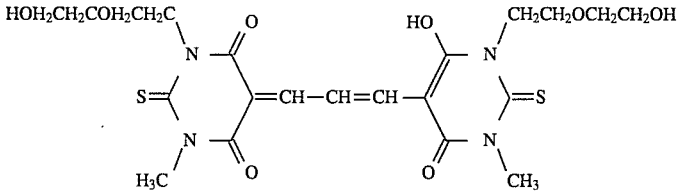
XI-22
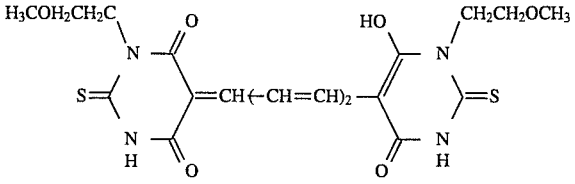
XI-23
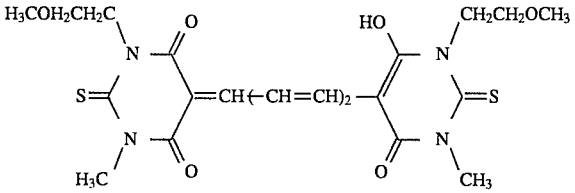
XI-24
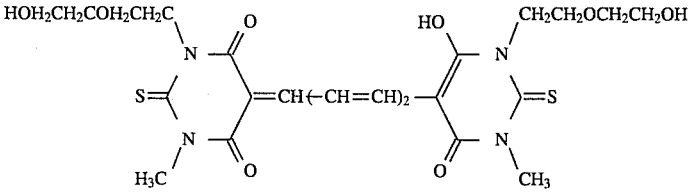
XI-25
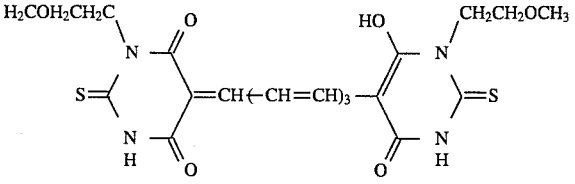
XI-26
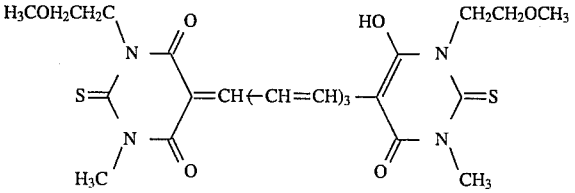
XI-27
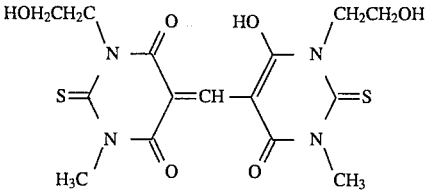
XI-28

-continued
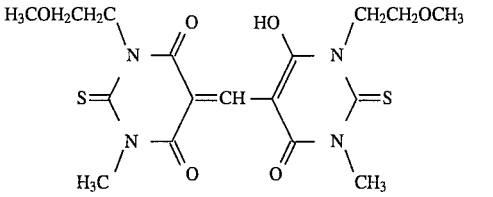
XI-29
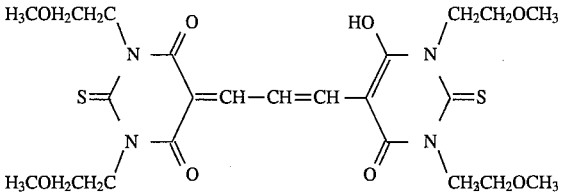
XI-30
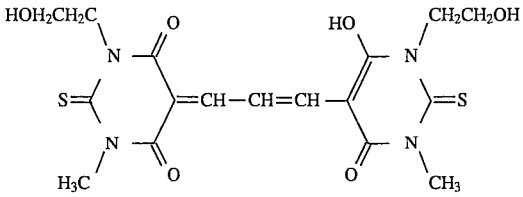
XI-31
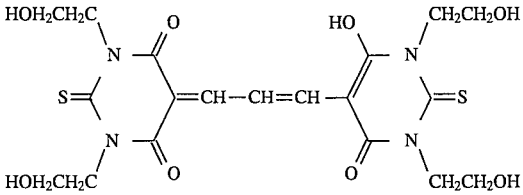
XI-32
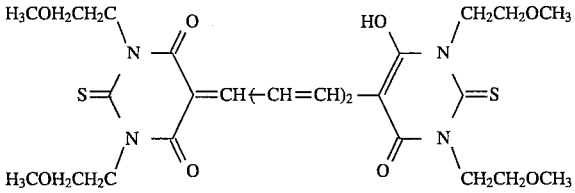
XI-33
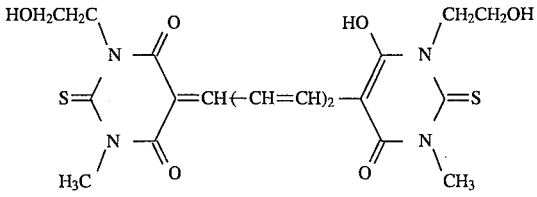
XI-34
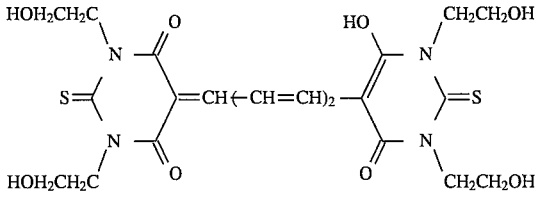
XI-35
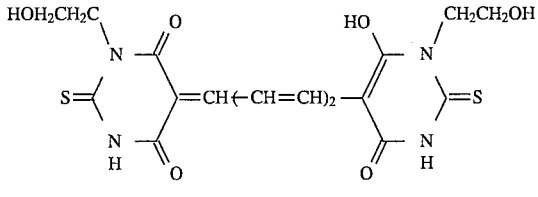
XI-36

-continued
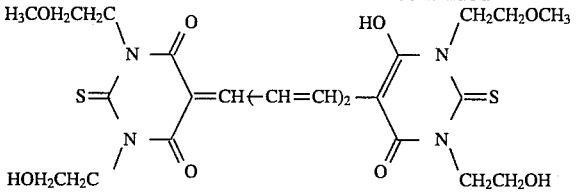
XI-37
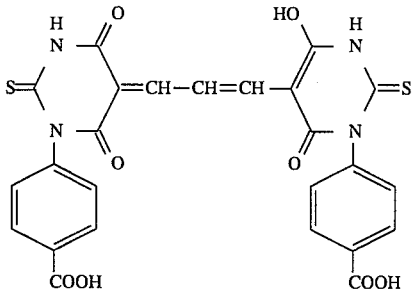
XI-38
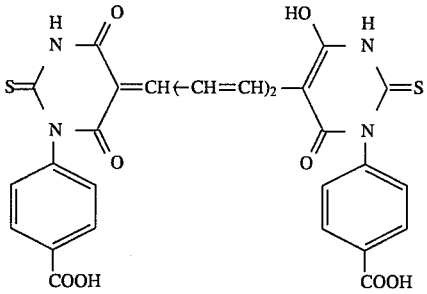
XI-39
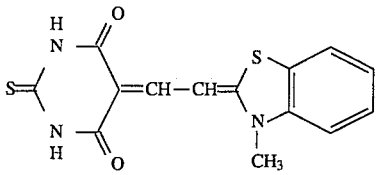
XII-1
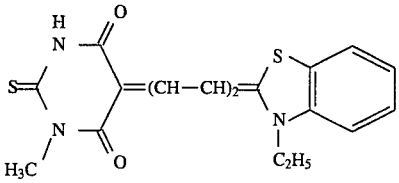
XII-1
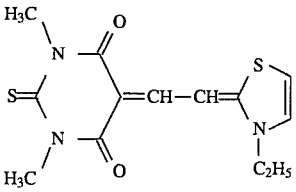
XII-3
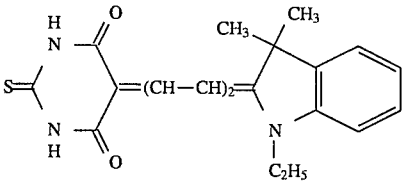
XII-4

-continued
XII-5
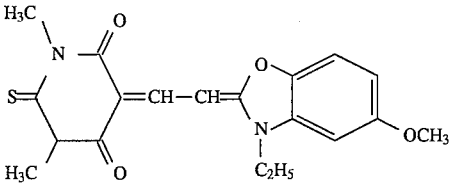
XIII-1
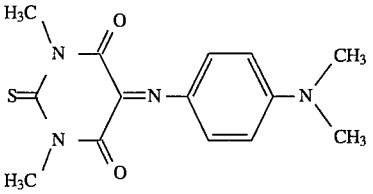
XIII-2
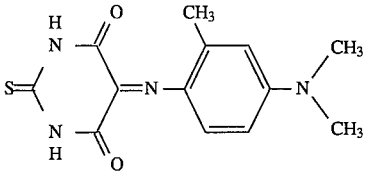
XIII-3
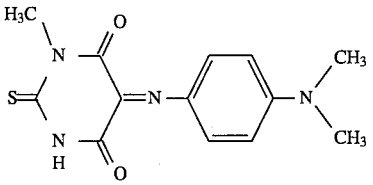
XIII-4
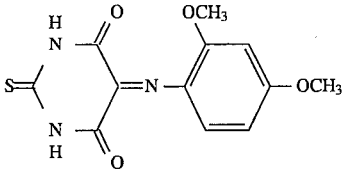
XIII-5
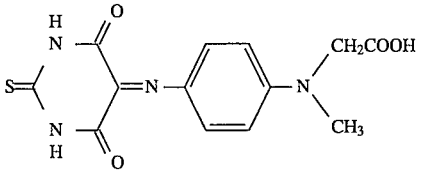
XIII-6
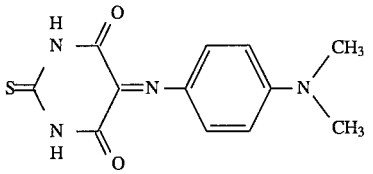
XIII-7
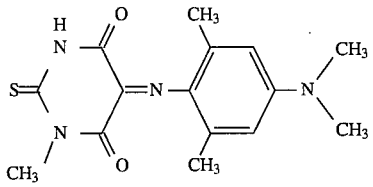
XIV-1
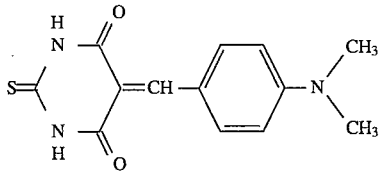

-continued
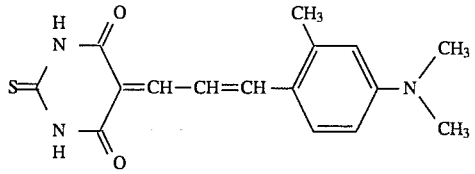
XIV-2
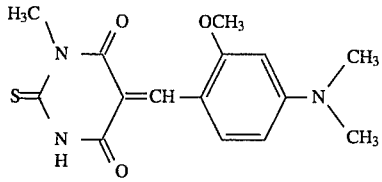
XIV-3
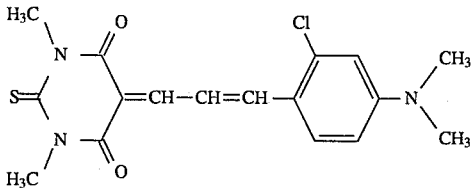
XIV-4
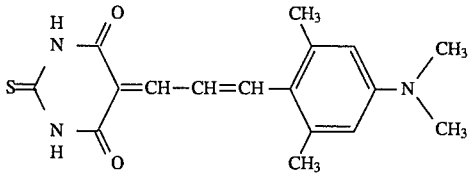
XIV-5
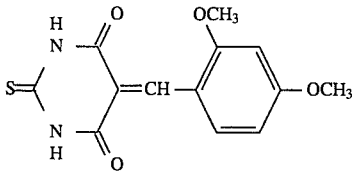
XIV-6
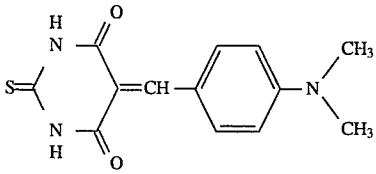
XIV-1
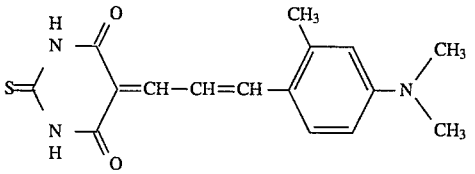
XIV-2
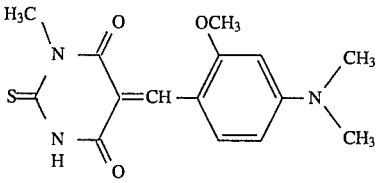
XIV-3
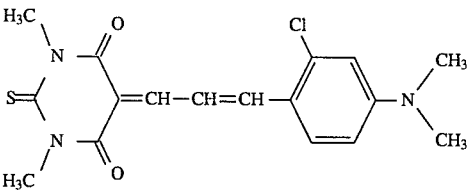
XIV-4

-continued

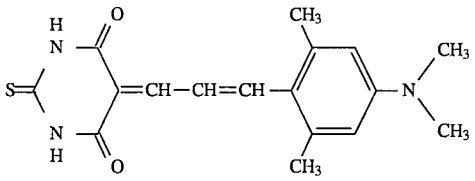

XIV-5

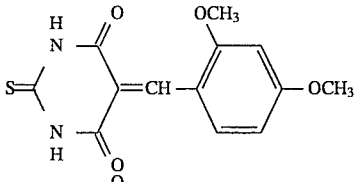

XIV-6

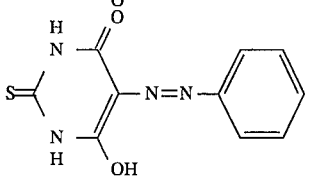

XV-1

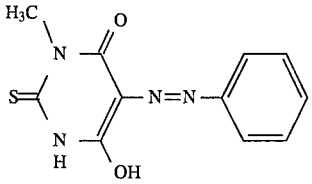

XV-2

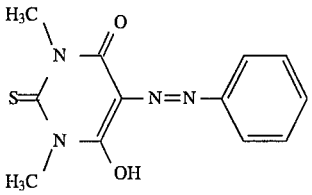

XV-3

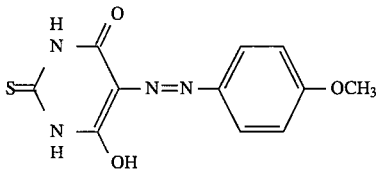

XV-4

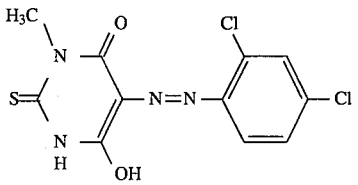

XV-5

Next, as a silver salt of dye used in the present invention, dyes illustrated in the following formulas XVI to XX are preferable.

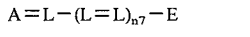

Formula XVI

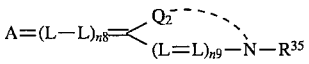

Formula XVII

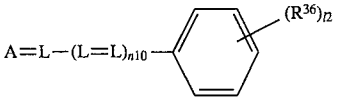

Formula XVIII

-continued

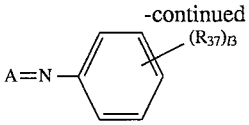

Formula XIX

Formula XX (In Formulas XVI to XX, $R^{35}$ represents an alkyl group and an alkenyl group; $R^{36}$ and $R^{37}$ represent an alkyl group, an alkenyl group, an aryl group, a heterocyclic group, a halogen atom, a cyano group, a sulfo group, $—COR^{38}$, $—CON(R^{38})(R^{39})$, $—N(R^{38})(R^{39})$, $—OR^{38}$, $—SOR^{38}$, $—SO_2R^{38}$, $SO_2N(R^{38})(R^{39})$, $—N(R^{38})COR^{39}$, $—N(R^{38})SO_2R^{39}$, $—N(R^{38})CON(R^{39})(R^{40})$ , $—SR^{38}$ and $—COOR^{38}$; $R^{38}$ to $R^{40}$ represent a hydrogen atom, an alkyl group, an alkenyl group, an aryl group and a heterocyclic group.

A represents a group represented by the following formulas $A_1$ to $A_4$; A' represents a group represented by the following formulas $A'_1$ to $A'_4$.

Formula $A_1$

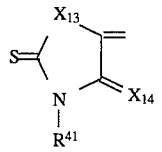

Formula $A_2$

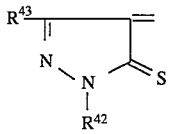

Formula $A_3$

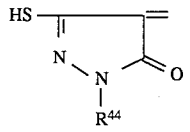

Formula $A_4$

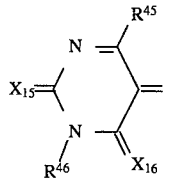

Formula $A'_1$

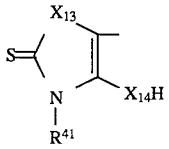

Formula $A'_2$

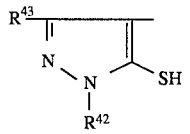

Formula $A'_3$

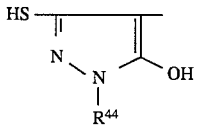

Formula $A'_4$

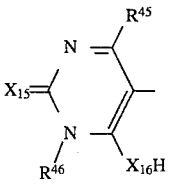

(In Formulas $A_1$ to $A_4$ and $A'_1$ to $A'_4$, $R^{41}$, $R^{42}$, $R^{44}$ and $R^{46}$ represent a hydrogen atom, an alkyl group, an alkenyl group, an aryl group and a heterocyclic group; $R^{43}$ represents an alkyl group, an alkenyl group, an aryl group, a heterocyclic group, a cyano group, —$COR^{47}$, —$CON(R^{47})(R^{48})$, —$N(R^{47})(R^{48})$, —$OR^{47}$, —$SOR^{47}$, —$SO_2R^{47}$, —$SO_2N(R^{47})(R^{48})$ , —$N(R^{47})COR^{48}$, —$N(R^{47})SO_2R^{48}$, —$N(R^{47})CON(R^{48})(R^{49})$ , —$SR^{47}$ and —$COOR^{47}$; to $R^{49}$ represent a hydrogen atom, an alkyl group, an alkenyl group, an aryl group and a heterocyclic group; $R^{45}$ is the same as $R^{36}$ and $R^{37}$; $X_{13}$ represents an oxygen atom, a sulfur atom, a selenium atom and =N—$R^{50}$. $R^{50}$ is the same as $R^{41}$. $X_{14}$, $X_{15}$ and $X_{16}$ represents an oxygen atom and a sulfur atom.)

L represents a methine group, and E represents a group having an acid nucleus. Q represents an non-metallic atoms necessary for forming a heterocycle. $W_2$ represents an aryl group and a heterocyclic group. $n_7$ and $n_8$ represent 0 to 3 integers. $n_9$ and $n_{10}$ represent 0 to 2 integers. $l_2$ and $l_3$ represents 0 to 3 integers.

As alkyl groups represented by the above-mentioned $R^{35}$ to $R^{50}$, for example, a methyl group, an ethyl group, a propyl group, an isopropyl group, an n-butyl group, a tert-butyl group, a cyclopentyl group and a cyclohexyl group are cited. The above-mentioned alkyl group may be substituted by a hydroxy group, a cyano group, a sulfo group, a carboxy group, a halogen atom (for example, a fluorine atom, a chlorine atom and a bromine atom), an alkoxy group (for example, a methoxy group and an ethoxy group), an aryloxy group (for example, a phenoxy group, a 4-sulfophenoxy group, a 2,4-disulfophenoxy group), an aryl group (for example, a phenyl group, a 4-sulfophenyl group, a 2,5-disulfophenyl group) and an alkoxycarbonyl group (for example, a methoxycarbonyl group).

As aryl group represented by $R^{36}$ to $R^{50}$ and $W_2$, for example, a phenyl group and a naphthyl group are cited. These groups can be can be substituted by alkyl groups represented by $R^{35}$ to $R^{50}$ and the same group as substituents represented by the substituents of alkyl groups.

As heterocyclic group represented by $R^{36}$ to $R^{50}$ and $W_2$, for example, a pyridyl group, a-thiazolyl group, an oxazolyl group, an imidazolyl group, a furyl group, a pyrrolyl group, a pyrazinyl group, a pyrimidyl group, a pyridazinyl group, a purynyl group, a selenazolyl group, a sulforanyl group, a piperidinyl group, a pyrazolyl group and a tetrazolyl group are cited. These groups can be substituted by alkyl groups represented by $R^{35}$ to $R^{50}$ and the same groups as substituents represented by substituents of alkyl groups.

As alkenyl group represented by $R^{35}$ to $R^{50}$, for example, a vinyl group and an aryl group can be cited. These groups can be substituted by alkyl groups represented by $R^{35}$ to $R^{50}$ and the same groups as substituents represented by substituents of alkyl groups.

As groups having an acid nucleus illustrated by E in Formula I', for example, groups having skeleton described in 20th line on page 11 to 15th line on page 14 of Japanese Patent O.P.I. Publication No. 281235/1986, groups having nucleus illustrated in Formulas $A'_1$ to $A'_4$ and groups represented by the following formulas Nos. 6 to 8.

Formula 6

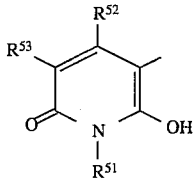

(wherein $R^{51}$ and $R^{41}$ are the same; $R^{52}$ and $R^{53}$ represent a hydrogen atom and a group illustrated by $R^{36}$ precedingly.)

Formula 7

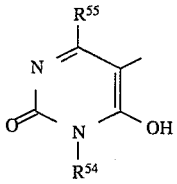

(wherein $R^{54}$ is the same as $R^{41}$; $R^{55}$ represents a hydrogen atom and a group illustrated by $R^{36}$.)

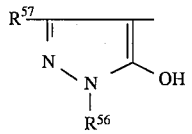

Formula 8

(wherein $R^{56}$ is the same as $R^{42}$; $R^{57}$ is the same as $R^{43}$.)

As heterocycles formed by $Q_2$ in Formula II', for example, heterocycles described in pp. 23 to 26 of Japanese Patent O.P.I. Publication No. 282832/1986 and a heterocycle represented by

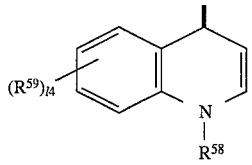

Formula 9

(wherein $R^{58}$ is the same as $R^{41}$; $R^{59}$ is the same as $R^{36}$; $l_4$ is an integer of 0 to 3.).

Hereunder, compounds represented by Formulas XVI to XX are exemplified as below.

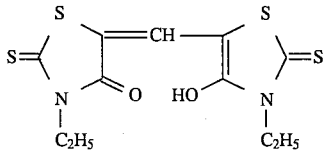

XVI-1

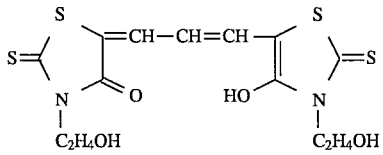

XVI-2

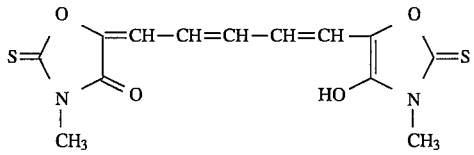

XVI-3

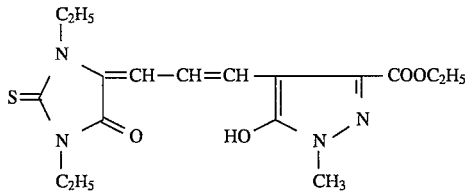

XVI-4

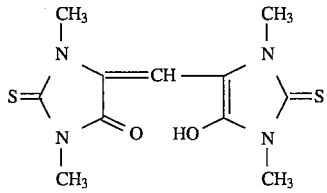

XVI-5

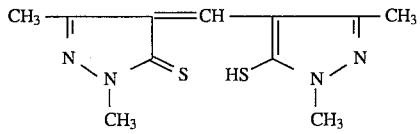

XVI-6

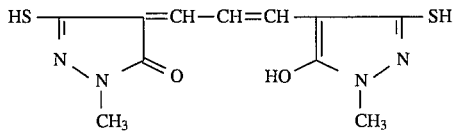

XVI-7

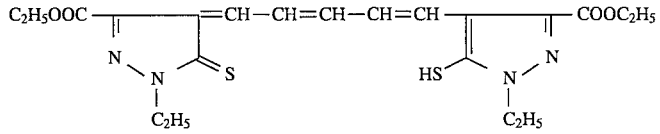

XVI-8

-continued
XVI-9
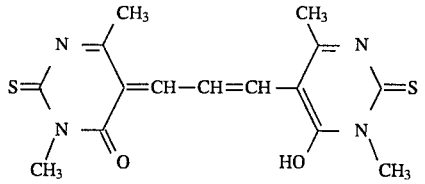
XVI-10
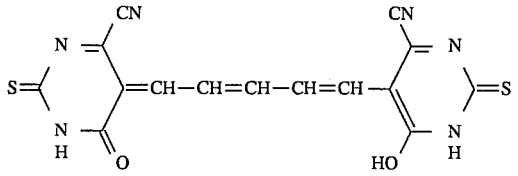
XVI-11
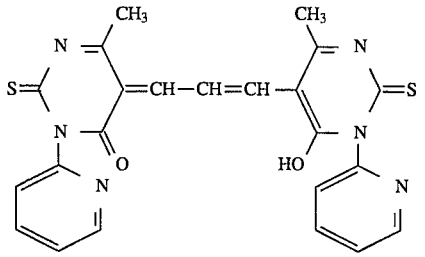
XVI-12
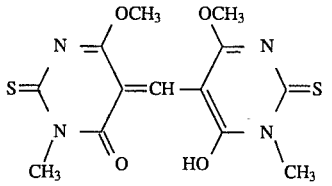
XVII-1
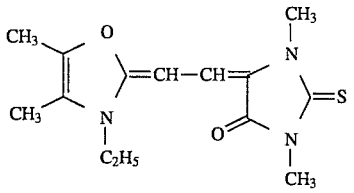
XVII-2
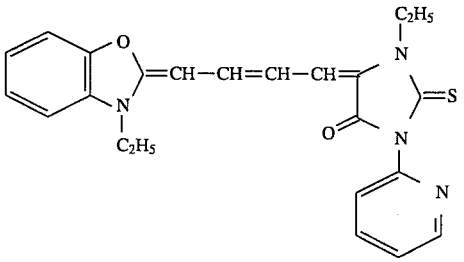
XVII-3
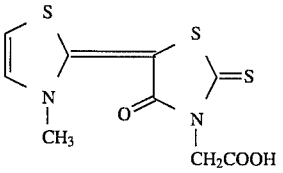
XVII-4
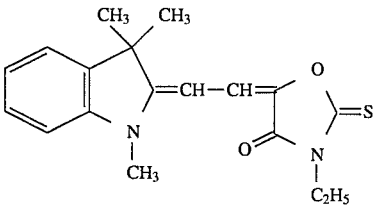

-continued
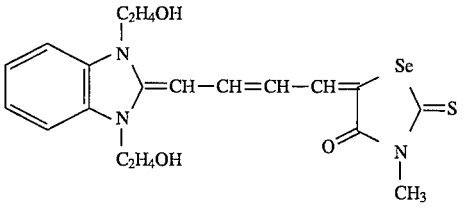
XVII-5
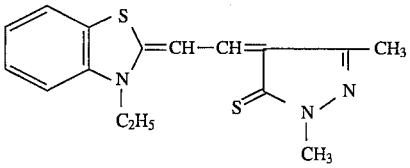
XVII-6
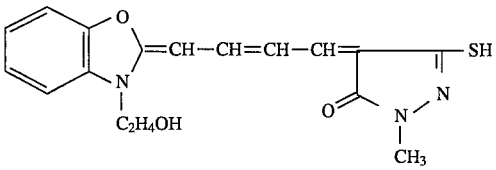
XVII-7
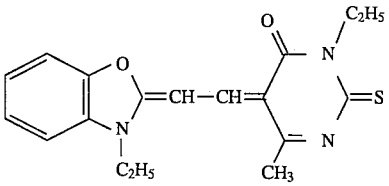
XVII-8
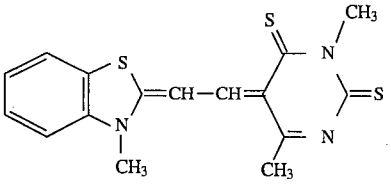
XVII-9
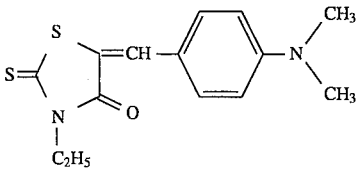
XVIII-1
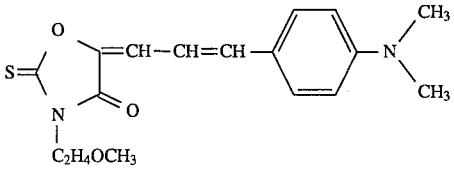
XVII-2
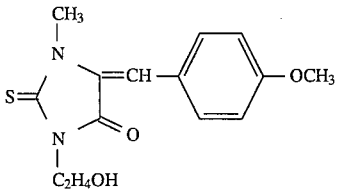
XVIII-3
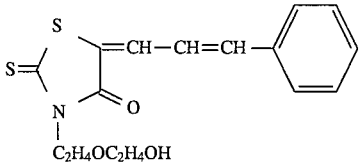
XVIII-4

-continued
XVIII-5
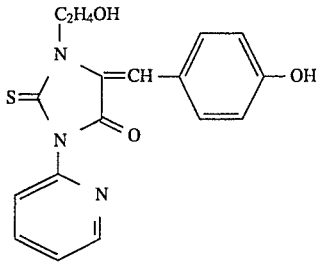
XVIII-6
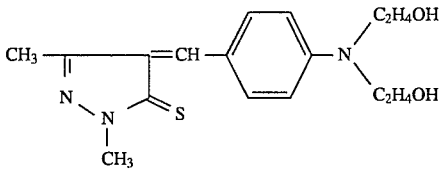
XVIII-7
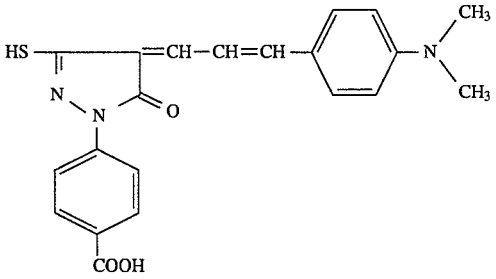
XVIII-8
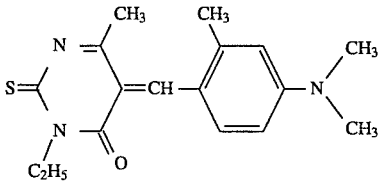
XVIII-9
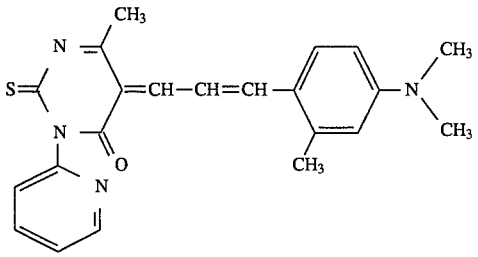
XIX-1
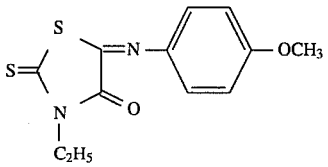
XIX-2
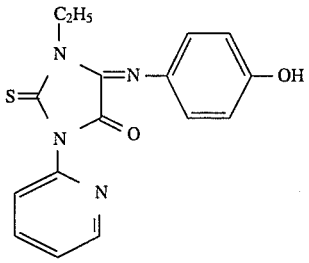

-continued
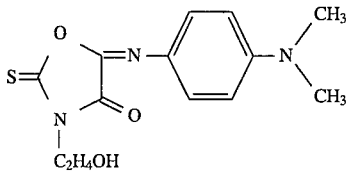
XIX-3
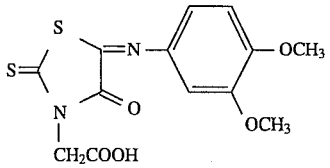
XIX-4
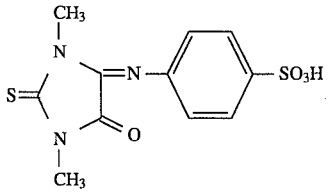
XIX-5
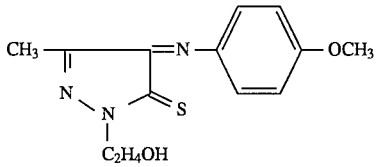
XIX-6
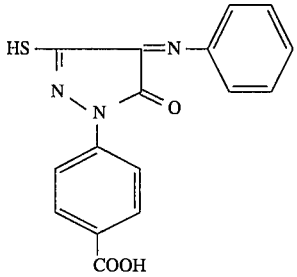
XIX-7
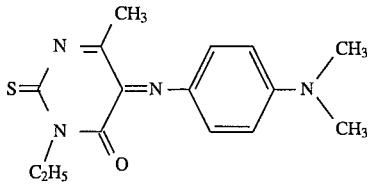
XIX-8
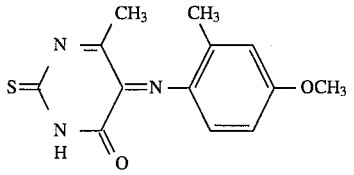
XIX-9
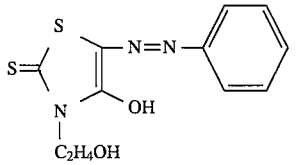
XX-1

-continued

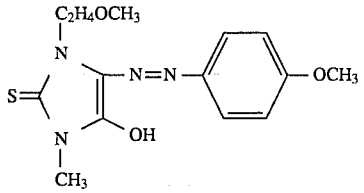

XX-2

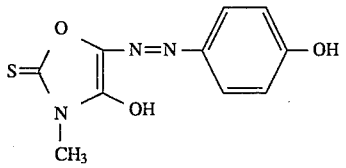

XX-3

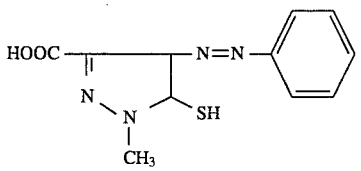

XX-4

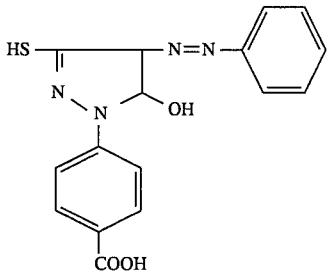

XX-5

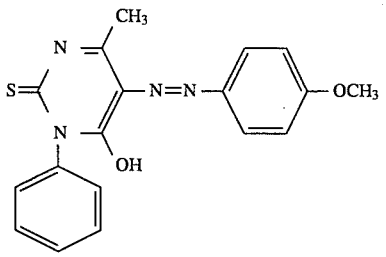

XX-6

In addition, as a silver salt of dye used in the present invention, a dye represented by the following formula XXI (hereunder, referred to as methine compound) are cited;

Formula XXI $$(\text{Dye})_{l5}[\text{-}(\text{J})_{m1}\text{-Sal}]_{n11}$$

(wherein Dye represents atom group having a methine dye structure; J represents a divalent combination group with an atom or atoms selected from a carbon atom, a nitrogen atom, an oxygen atom and a sulfur atom as a structure; Sal represents a group forming a sparingly soluble salt with a silver ion; $l_5$ represents 1 or 2; $m_1$ represents 0 or 1; $n_{11}$ represents 1, 2, 3 or 4.)

In Formula XXI, groups illustrated by Dye represents atom group having a methine dye structure. They are, for example, group having a dye structure wherein a methine chain such as a cyanine chain, a merocyanine chain, a merostyryl chain, a stylyl chain, an oxonol chain and a triarylmethane chain are subjected to conjugate double bond. As practical examples of the above-mentioned dyes, cyanine dyes described in Japanese Patent O.P.I. Publication No. 202665/1988 and Russian Patent No. 653,257, merocyanine dyes described in Japanese Patent O.P.I. Publication Nos. 29727/1977, 60825/1977, 135335/1977, 27146/1981, 29226/1981, 10944/1984, 15934/1984, 111847/1984 and 34539/1988 and U.S. Pat. Nos. 2,944,896 and 3,148,187, merostyl dyes described in Japanese Patent O.P.I. Publication Nos. 211041/1984, 211042/1984, 135936/1985, 135937/1985, 204630/1986, 205934/1986, 56958/1987, 70830/1987, 92949/1987 and 185758/1987, oxonol dyes described in Japanese Patent O.P.I. Publication Nos. 145125/1975, 33103/1980, 120660/1980, 161233/1980, 185755/1987, 139949/1988, 231445/1988 and 264745/1988, U.S. Pat. No. 4,187,275, British Patent No. 1,521,083 and Belgium Patent No. 869,677 and triarylmethane dyes described in Japanese Patent O.P.I. Publication Nos. 55437/1984 and 228250/1984, U.S. Pat. Nos. 4,115,126 and 4,359,574 are cited. In addition, dyes are selected from publications such as *Theory of Photographic Process* published by MaCmillan Co., Ltd. in 1977 edited by T. H. James, *Heterocyclic compounds Cyanine dyes and related compounds* published by John Wiley & Sons (New York London) in 1964 written by F. M. Harmer, *The Chemistry of Heterocyclic Compounds* published in 1977 written by D. M. Sturmer and edited by A. Weissberger and E. C. Taylor and *The Chemistry of Synthetic Dyes* Vol. II published in 1952 and Vol. IV published in 1971 by Academic Press (New York London).

J represents a divalent combination group with an atom or atoms selected from a carbon atom, a nitrogen atom, an oxygen atom and a sulfur atom as a skeleton. The preferable groups are divalent combination groups having 20 or less carbons composed of one of or in combination of an alkylene group (for example, a methylene group, an ethylene group, a propyrene group and a pentylene group), an allylene group (for example, a phenylene group), an alkenylene group (for example, an ethylene group and a propenylene group), a sulfonyl group, a sulfinyl group, an ether group, a thioether group, a carbonyl group and —N($R^{60}$)-group ($R^{60}$ represents a hydrogen atom, a substituted or unsubstituted alkyl group and a substituted or unsubstituted aryl group). They may have a substituent. As substituents, conventional ones are cited including a halogen atom (for example, a fluorine atom, a chlorine atom and a bromine atom), an alkyl group (for example, a methyl group, an ethyl group, an isopropyl group and a butyl group), an aralkyl group (for example, a benzyl group and a phenethyl group), an alkoxy group (for example, a methoxy group and an ethoxy group), an alkoxycarbonyl group (for example, an ethoxycarbonyl group), an alkylthio group, a hydroxy group, a carboxy group, a sulfo group, a sulfonyl group (for example, a methanesulfonyl group and p-toluenesulfonyl group), a carbamoyl group (for example, N-methylcarbamoyl group and a monopholynocarbonylamino group), an acyl group (for example, an acetyl group and a benzoyl group), an acylamide group (for example, an acetoamide group), a sulfonamido group (for example, a methanesulfonamide group and a butanesulfonamide group), a cyano group, an amino group (for example, an ethylamino group and a dimethylamino group) and an ureido group.

$l_5$ represents 1 or 2; $m_1$ represents 0 or 1; $n_{11}$ represents 1, 2, 3 or 4. Sal represents a group forming sparingly soluble salt with a silver ion including a mercapto group, an acetylene group, a thiocarbonyl group, a thioamide group, a thiourethane group, a thioureido group (for example, a 3-ethylthioureido group and a 3-phenylthioureido group) and saturated or unsaturated 5- membered to 7- membered heterocyclic residues containing at least 1 nitrogen atom inside the ring. As preferable group, groups illustrated by Formulas VIII and IX described in Japanese Patent O.P.I. Publication No. 97937/1990 and groups illustrated by Formulas II to VI described in Japanese Patent O.P.I. Publication No. 225476/1990 are cited.

Next, practical examples of methine compounds in the present invention are shown.

XXI-1
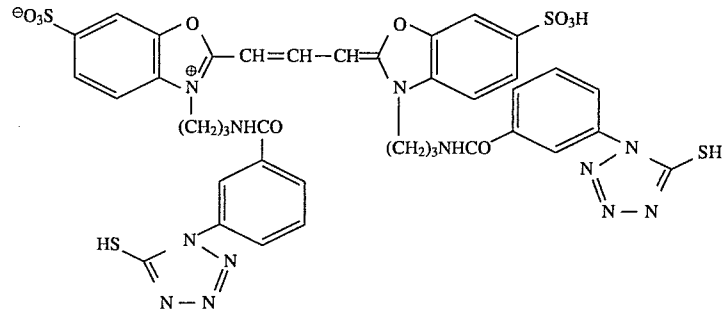
XXI-2
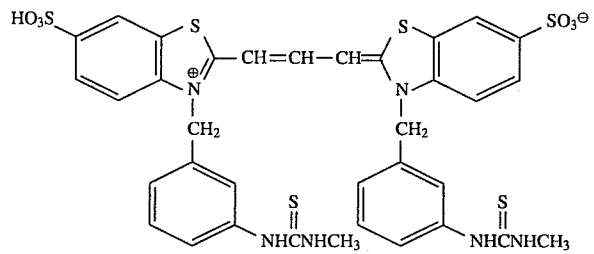
XXI-3
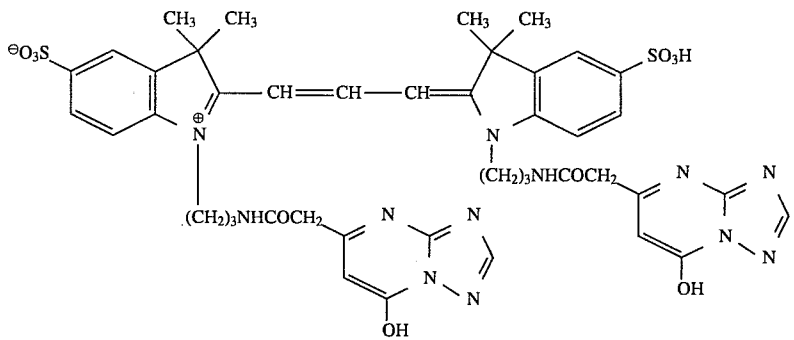

-continued
XXI-4
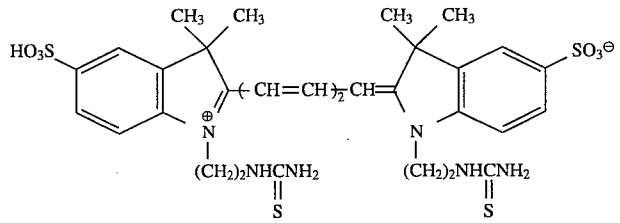
XXI-5
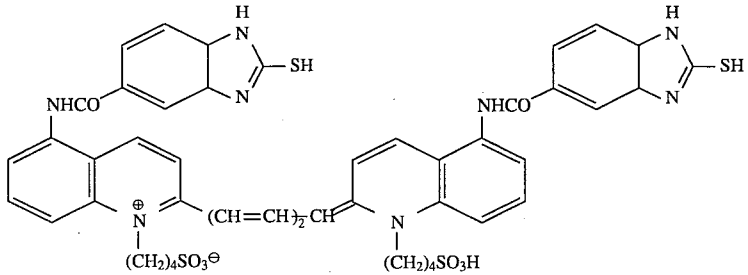
XXI-6
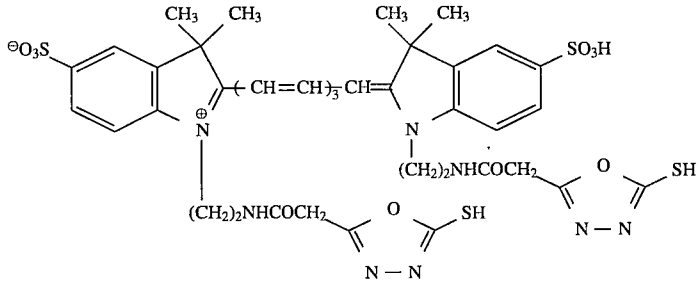
XXI-7
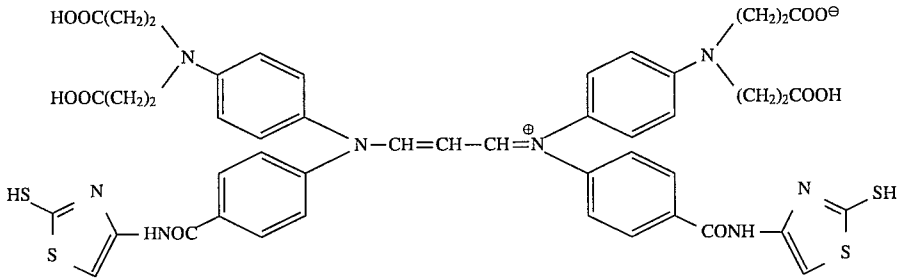

-continued
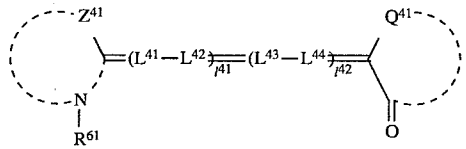
| No. | 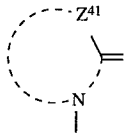 | $R^{61}$ | $(L^{41}-L^{42})_{j41}(L^{43}-L^{44})_{j42}$ | | 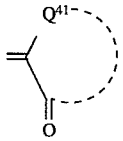 |
|---|---|---|---|---|---|
| XXI-8 | 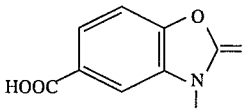 | 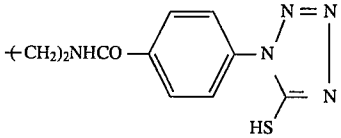 | =CH−CH= | — | 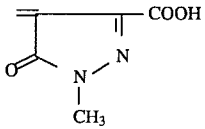 |
| XXI-9 | 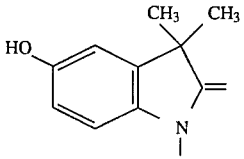 | 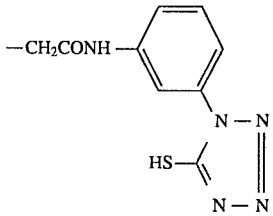 | =CH−CH= | — | 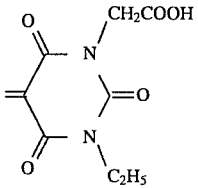 |
| XXI-10 | 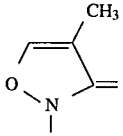 | 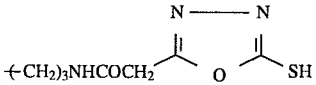 | =CH−CH= | — | 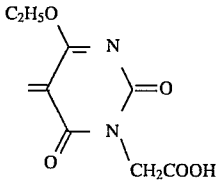 |
| XXI-11 | 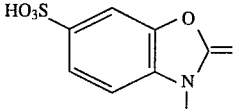 | 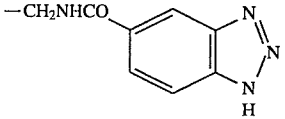 | =CH−CH= | =CH−CH= | 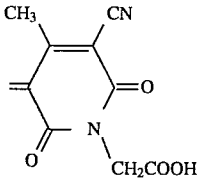 |

-continued
| | | | | | |
|---|---|---|---|---|---|
| XXI-12 | 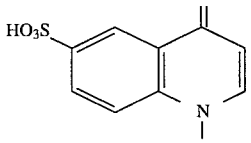 | $-(CH_2)_2NHCSNHCH_3$ | $=CH-CH=$ | $=CH-CH=$ | 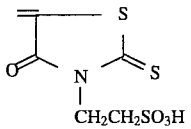 |
| XXI-13 | 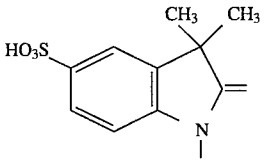 | 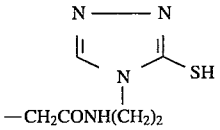 | $=CH-CH=$ | $=CH-CH=$ | 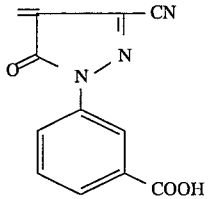 |
| XXI-14 | 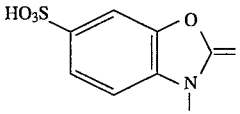 | $-C_2H_5$ | $=C(CH_3)-CH=$ | — | 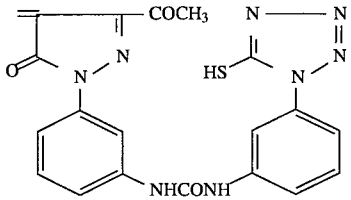 |
| XXI-15 | 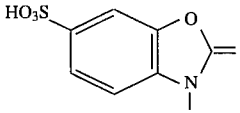 | $-C_2H_5$ | $=CH-C(CH_3)=$ | — | 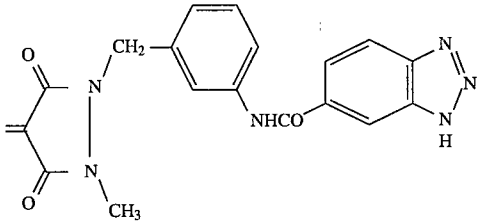 |
| XXI-16 | 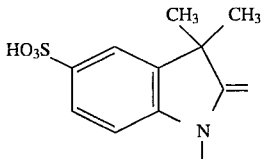 | $-(CH_2)_4SO_3H$ | $=CH-CH=$ | $=CH-C(CH_3)=$ | 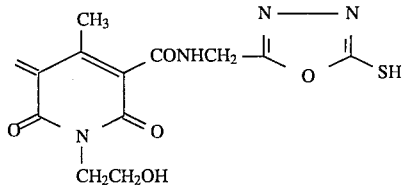 |

-continued
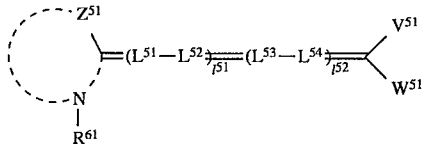
| No. | 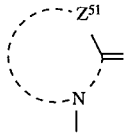 | $R^{61}$ | $V^{51}$ | $W^{51}$ | $(L^{51}-L^{52})_{j51}$ | $(L^{53}-L^{54})_{j52}$ |
|---|---|---|---|---|---|---|
| XXI-17 | 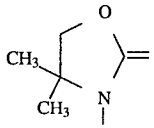 | $-C_2H_4COOH$ | $-CN$ | 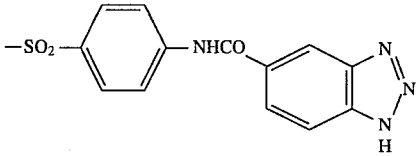 | $=CH-CH=$ | — |
| XXI-18 | 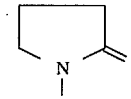 | $-C_2H_5$ | $-CN$ | 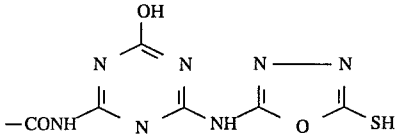 | $=CH-CH=$ | — |
| XXI-19 | 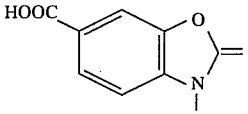 | 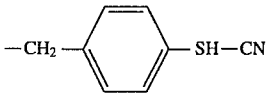 | | $-COO(CH_2CH_2O)_3CH_3$ | $=CH-CH=$ | $=CH-CH=$ |
| XXI-20 | 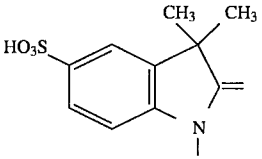 | 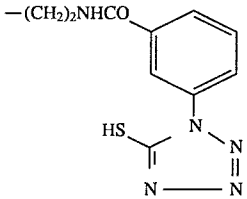 | $-COCH_3$ | $-CONH(CH_2CH_2O)_3CH_3$ | $=CH-CH=$ | $=CH-CH=$ |

-continued
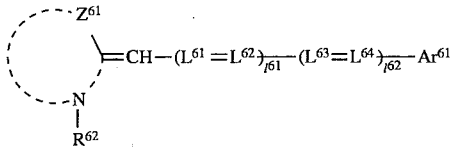
| No. | 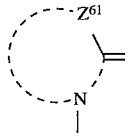 | $R^{62}$ | $Ar^{61}$ | $(L^{61}=L^{62})_{j61}$ | $(L^{63}=L^{64})_{j62}$ |
|---|---|---|---|---|---|
| XXI-21 | 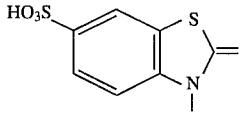 | 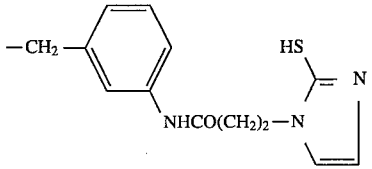 | 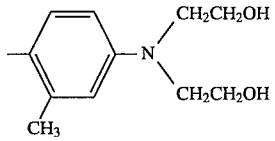 | $-CH=CH-$ | — |
| XXI-22 | 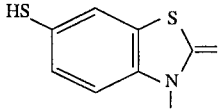 | $-CH_2COOH$ | 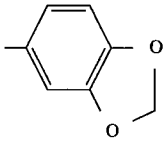 | $-CH=CH-$ | — |
| XXI-23 | 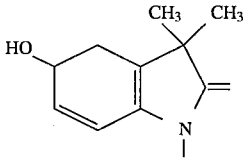 | 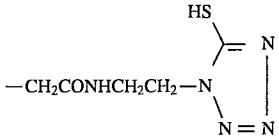 | 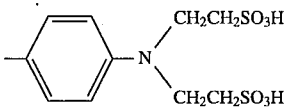 | $-CH=CH-$ | — |
| XXI-24 | 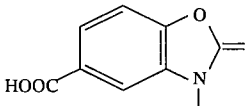 | 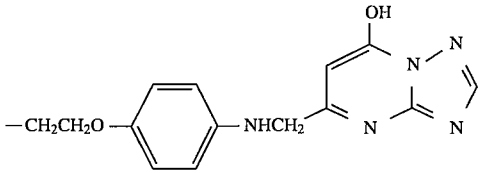 | 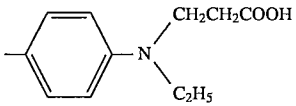 | $-CH=CH-$ | $-CH=CH-$ |

-continued
$E^{71}=L^{71}(L^{72}=L^{73})_{l71}-Ar^{71}$
| No. | $E^{71}$ | $Ar^{71}$ | $=L^{71}(L^{72}=L^{73})_{l71}-$ |
|---|---|---|---|
| XXI-25 | 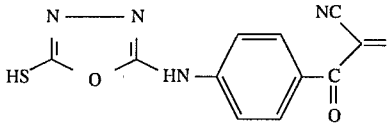 | 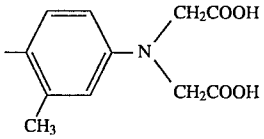 | =CH− |
| XXI-26 | 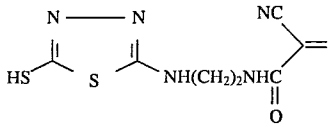 | 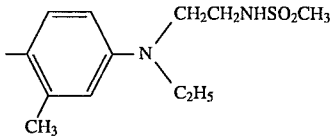 | =CH− |
| XXI-27 | 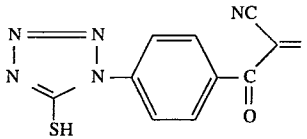 | 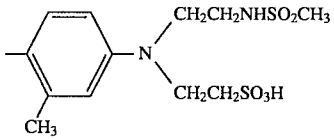 | =CH− |
| XXI-28 | 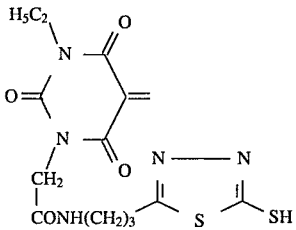 | 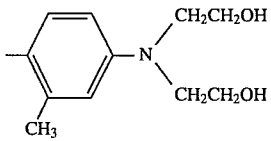 | =CH− |
| XXI-29 | 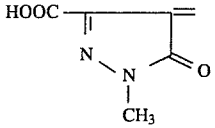 | 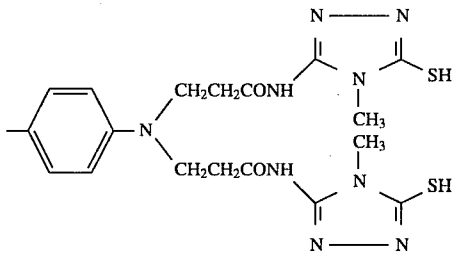 | =CH−CH=CH− |

-continued
| | | | |
|---|---|---|---|
| XXI-30 | 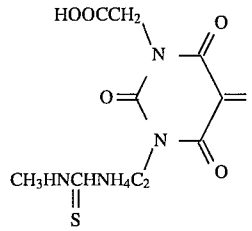 | 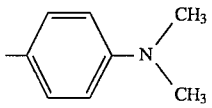 | =CH−CH=CH− |
| XXI-31 | 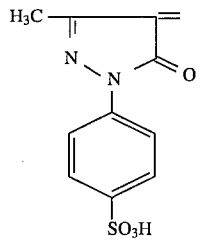 | 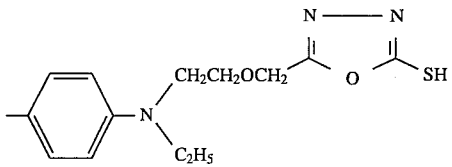 | =CH− |
| XXI-32 | 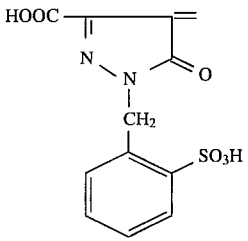 | 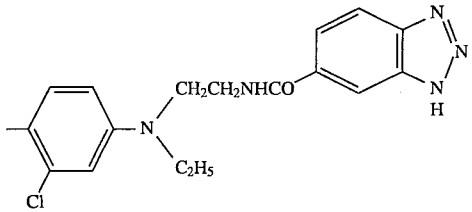 | =CH− |
| XXI-33 | 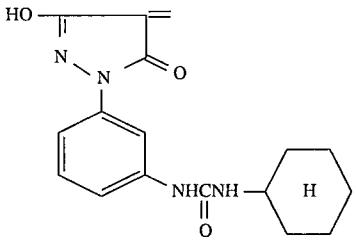 | 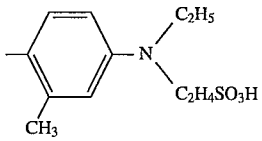 | =CH− |

-continued
$Q^{81}$—$(L^{81}-L^{82})_{j81}$=$(L^{83}-L^{84})_{j82}$=$L^{85}$—$Q^{82}$
| No. | $Q^{81}$ | $Q^{82}$ | =$(L^{81}-L^{82})_{j81}$=$(L^{83}-L^{84})_{j82}$=$L^{85}$— |
|---|---|---|---|
| XXI-34 | 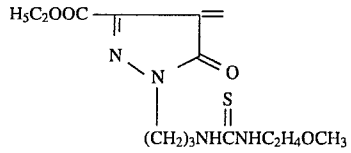 | 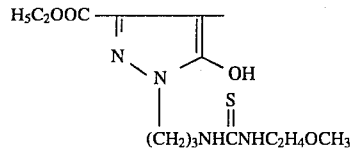 | =CH−CH=CH− |
| XXI-35 | 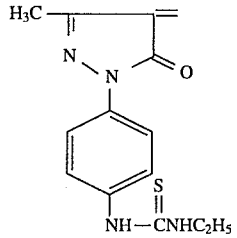 | 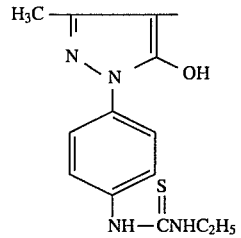 | =CH− |
| XXI-36 | 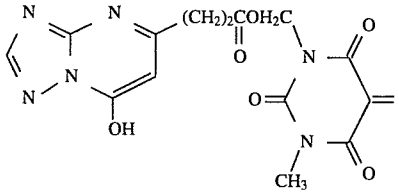 | 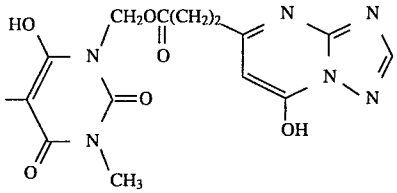 | =CH−CH=CH−CH=CH− |
| XXI-37 | 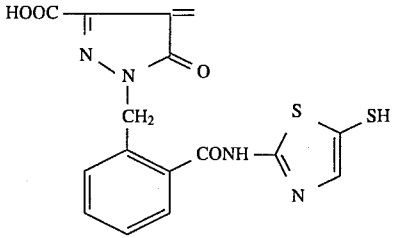 | 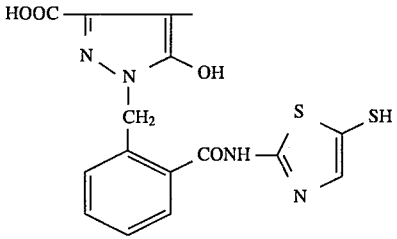 | =CH−CH=CH−CH=CH− |

-continued
| | | | |
|---|---|---|---|
| XXI-38 | 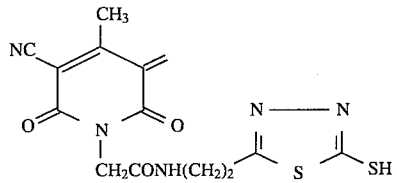 | 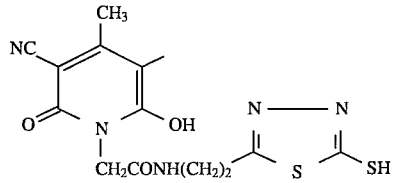 | =CH−CH=CH− |
| XXI-39 | 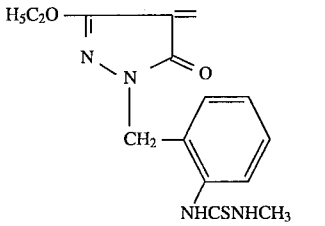 | 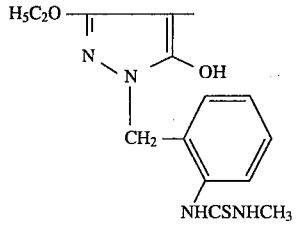 | =CH−CH=CH−CH=CH− |
| XXI-40 | 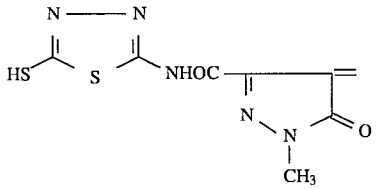 | 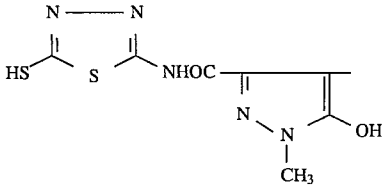 | =CH−CH=CH− |
| XXI-41 | 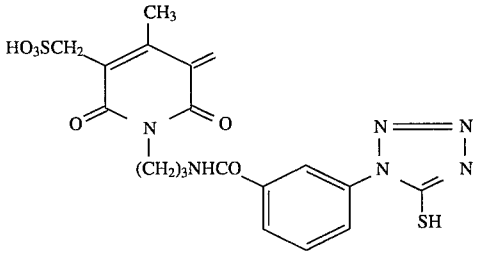 | 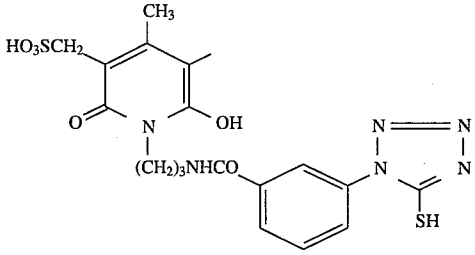 | =CH−CH=CH−CH=CH− |
| XXI-42 | 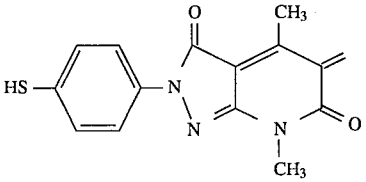 | 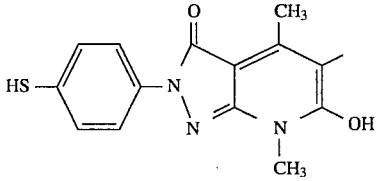 | =CH−CH=CH− |

-continued
| | | | |
|---|---|---|---|
| XXI-43 | 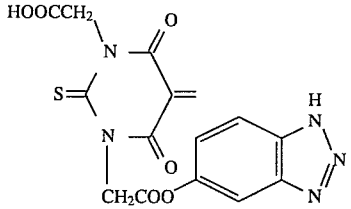 | 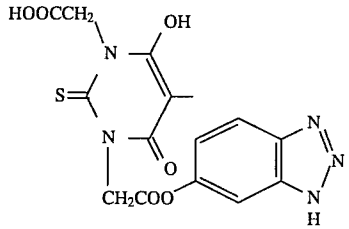 | =CH−CH=CH− |
| XXI-44 | 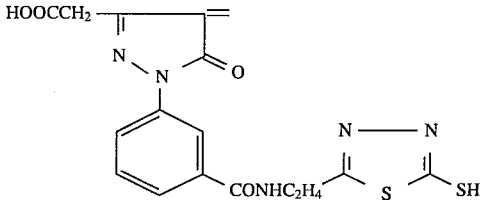 | 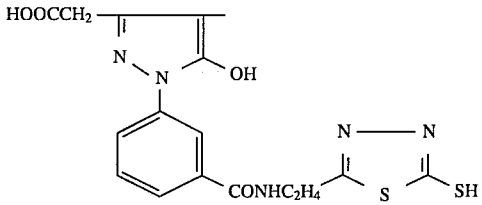 | =CH− |
| XXI-45 | 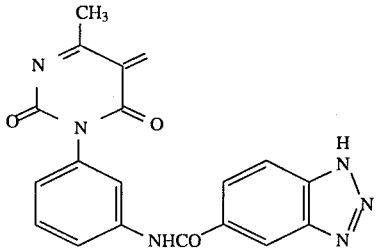 | 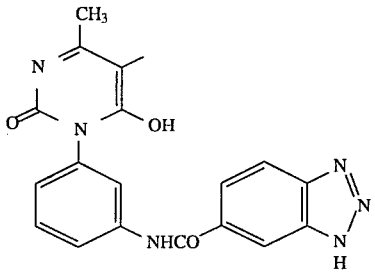 | =CH−CH=CH− |
| XXI-46 | 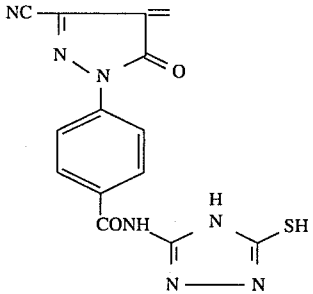 | 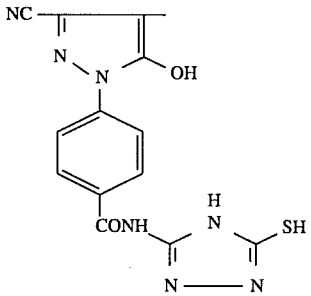 | =CH−CH=CH− |

-continued
| | | | |
|---|---|---|---|
| XXI-47 | 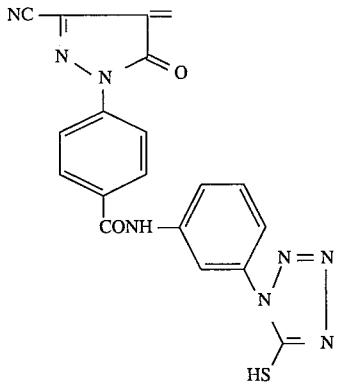 | 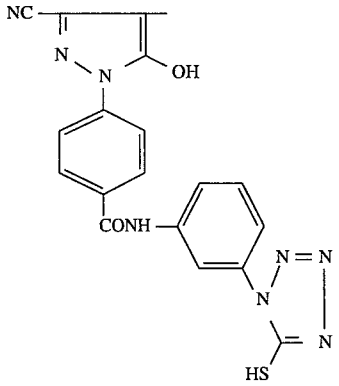 | =CH−CH=CH−CH=CH− |
| XXI-48 | 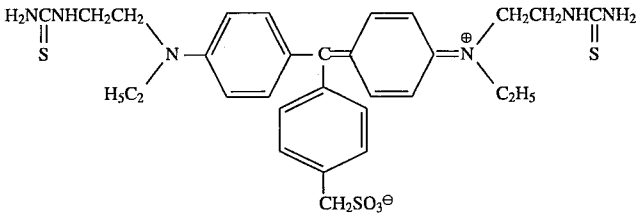 | | |
| XXI-49 | 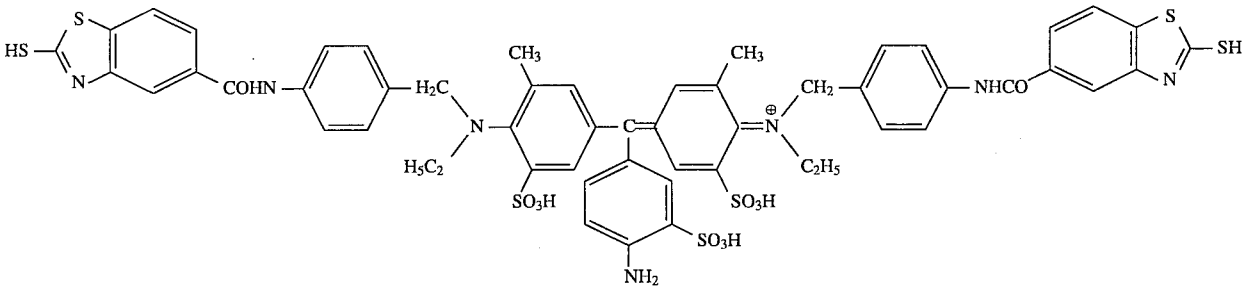 | | |

-continued
XXI-50
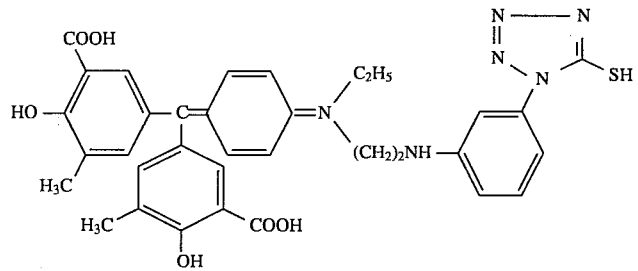
XXI-51
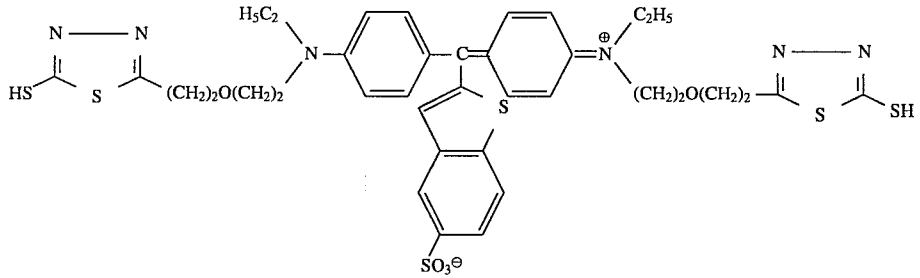
XXI-52
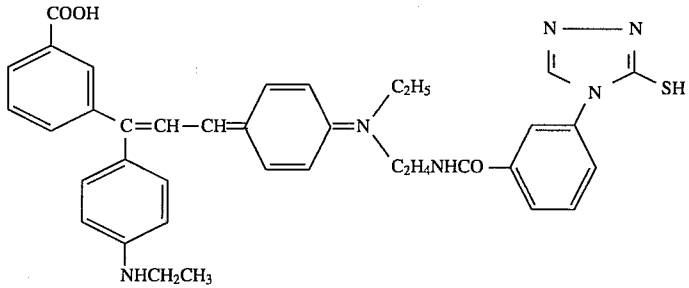

Methine compounds in the present invention can be synthesized by either a method to make a dye from intermediate raw materials wherein refractory silver salt forming group illustrated by Sal has been substituted in advance or a method to combine a methine dye structure portion illustrated by Dye and Sal portion. The above-mentioned methods can be selected optionally to synthesize. Various conventional binding reaction can be utilized for the introduction of Sal group. For example, addition reaction to unsaturated groups such as a vinyl group and a carbonyl group and substituted reaction between active hydrogen substituent such as an amino group and a hydroxy group and acid derivatives and halogen derivatives are employed. In conducting the above-mentioned reactions, many documents including *New Experimental Chemical* 14 *"Syntheses and Reactions of Organic Chemistry"* Volumes I to V edited by Japan Chemical Academy published by Maruzen (in 1962), *Organic Reactions* Volumes 1, 3 and 12 published by John Wiley & Sons (New York London), *The Chemistry of Functional Groups* published by John Wiley & Sons (New York London) and *Advanced Organic Chemistry* written by L. F. Fieser and M. Fieser published by Maruzen (in 1962).

The methine dyes in the present invention are reacted with soluble silver salt aqueous water to be sparingly soluble silver salts, which are dispersed and added into the silver halide photographic light-sensitive material.

In the invention, these dyes are each made into a fine solid powder dispersion to incorporate them in a layer such as an hydrophilic colloidal silver layer, which is coated on the photographic elements. Such a fine particle dispersion can be prepared by precipitating a dye in the form of dispersion and/or pulverizing it in the presence of a dispersing agent, with a conventional means such as ball milling (ball mills, vibrating ball mills, epicyclic ball mills, etc.), sand milling, colloid milling, jet milling and roller milling; at this time, a solvent (water, alcohol, etc.) may be employed. Or the dispersion may be prepared by dissolving a dye in a solvent and then adding thereto a non-solvent for the dye to deposit it in the form of fine crystals and, if necessary, a surfactant for dispersing may be jointly used. Further, the dispersion may also be prepared by dissolving a dye first while controlling the pH and then crystallizing the dye by changing the pH. Dye particles in these dispersions are 10 μm or less, preferably 2 μm or less and more preferably 0.5 μm or less in average size. Fine particles having an average size of 0.1 μm or less are still more preferable when a specific requirement arises.

In the invention, the dye is contained within the range of 1 to 100 mg/m$^2$, preferably 5 to 800 mg/m$^2$.

In the invention, a silver salt of dye is contained within the range of 50 to 2000 mg/m$^2$, preferably 100 to 1000 mg/m$^2$.

The dye dispersion of the invention may be added to any layer irrespective of kinds of layers such as emulsion layers and intermediate layers.

In a preferred embodiment of the invention, the dispersion is used to displace, partly or entirely, colloidal silver usually contained in a yellow filter layer and an antihalation layer; thus the effect of the invention can be well exhibited.

The magnetic layer provided according to the invention may be such a transparent magnetic layer as is disclosed in Japanese Pat. O.P.I. Pub. Nos. 109604/1978, 45248/1985, Japanese Pat. Exam. Pub. No. 6576/1982, U.S. Pat. No. 4,947,196, Intl. Pub. Pat. Nos. 90/04254, 91/11750, 91/11816, 92/08165, 92/08227, or it may be such a striped magnetic layer as is described in Japanese Pat. O.P.I. Pub. Nos. 124642/1992, 124645/1992.

When the magnetic layer according to the invention is a transparent layer, its optical density is 1.0 or less, preferably 0.75 or less and especially in the range of 0.02 to 0.30.

The magnetic layer according to the invention is a layer comprising a ferromagnetic powder dispersed in a binder.

The coating weight of the magnetic powder is, in amount of iron present, 50 mg or less, preferably 20 mg or less and especially in the range of 0.1 to 5 mg per 100 cm$^2$ of silver halide color light-sensitive material.

Suitable ferromagnetic powders include, for example, Y-$Fe_2OO_3$ powder, Co-coated Y-$Fe_2O_3$ powder, Co-coated $Fe_3O_4$ powder, Co-coated $FeO_x$ ($4/3<x<3/2$) powder, other Co-containing iron oxides, as well as other ferrites such as hexagonal ferrites including M-type and W-type hexagonal Ba ferrites, Sr ferrites, Pb ferrites and Ca ferrites, and their solid solutions and ion-substituted materials.

Suitable hexagonal ferrite magnetic powders are those in which Fe atoms, a constituent element of uniaxial anisotropic hexagonal ferrite crystals, are partly replaced by a divalent metal and at least one pentavalent metal selected from Nb, Sb and Ta, as well as by Sn atoms within the range of 0.05 to 0.5 in number for each chemical formula, the coercive force of which is within the range of 200 to 2,000.

Preferred divalent metals contained in the hexagonal ferrite are Mn, Cu, Mg and the like, which can well replace Fe atoms in the ferrite.

The replacing amounts of the divalent metals (MII) and pentavelent metals (Mv) in the hexagonal ferrite vary depending upon the combination of MII and Mv, but it is preferably in the range of 0.5 to 1.2 in number for each chemical formula of MII.

The relation among the replacing amounts of respective replacing elements is described below by taking magnetoplumbite type Ba ferrite as an example. The chemical formula of this substituted material is represented by $BaFe_{12-(x+Y+z)}$ $MII_xMv_ySn_zO_{19}$, where x, y and z are replacing amounts of MII, Mv and Sn element per chemical formula of the ferrite. Since MII, Mv and Sn are divalent, pentavalent and tetravalent, respectively, and Fe atoms to be replaced are trivalent, the relation of $y=(x-z)/2$ is valid when valence number compensation is taken into consideration; that is, the replacing amount of Mv is determined unconditionally from the replacing amount of MII and that of Sn.

The coercive force of the above ferromagnetic powder is usually 200 Oe or more, preferably 300 Oe or more.

The size of the magnetic particles is preferably 0.3 μm or less, more preferably 0.2 μm or less in major axial direction.

The specific surface of the ferromagnetic particles is usually 20 m$^2$/g or more, preferably in the range of 25 to 80 m$^2$/g when measured by the BET method.

The shape of the ferromagnetic particles is not particularly limited and it may be needle-like, spherical or spheroidal.

The magnetic layer of the invention may contain a fatty acid.

Such a fatty acid may be either monobasic or dibasic. Preferred are those having 6 to 30 carbon atoms and especially 12 to 22 carbon atoms.

Preferred examples of the fatty acid include caproic acid, capric acid, lauric acid, myristic acid, palmitic acid, stearic acid, isostearic acid, linolenic acid, linolic acid, oleic acid, elaidic acid, behenic acid, malonic acid, succinic acid, maleic acid, glutaric acid, adipic acid, pimetic acid, azelaic acid, sebacic cid, 1,12-dodecanedicarboxylic acid and octanedicarboxylic acid.

Among them, myristic acid, oleic acid and stearic acid are particularly preferred.

When a fatty ester is contained in the magnetic layer, the friction coefficient of the magnetic layer is lowered and, thereby, the running property and durability of magnetic recording medium of the invention can be remarkably improved.

Preferred examples of the fatty ester include oleyl oleate, oleyl stearate, isocetyl stearate, dioleyl maleate, butyl stearate, butyl palmirate, butyl myristate, octyl myristate, octyi palmitate, amyl stearate, amyl palmitate, stearyl stearate, lauryl oleate, octyl oleate, isobutyl oleate, ethyl oleate, isotridecyl oleate, 2-ethylhexyl stearate, 2-ethylhexyl myristate, ethyl stearate, 2-ethylhexyl palmitate, isopropyl palmitate, isopropyl myristate, butyl laurate, cetyl 2-ethylhexanoate, dioleyl adipate, diethyl adipate, diisobutyl adipate and diisodecyl adipate.

Among them, butyl stearate and butyl palmitate are particularly preferred.

These fatty esters may be used singly or in combination of two or more kinds.

The magnetic layer of the invention may contain other lubricants jointly with the above fatty acid or with the above fatty acids and fatty esters.

Examples of such other lubricants include silicone type lubricants, fatty-acid-modified silicone type lubricants, fluorine type lubricants, liquid paraffin, squalane and carbon black, which may be used singly or in combination of two or more kinds.

As the binder, transparent substances, such as cellulose esters and gelatins, are used.

The dispersion of fine ferromagnetic particles can be prepared by use of a solvent to dissolve the transparent binder; namely, an organic solvent for cellulose esters or water for gelatin.

As solvents used in dispersing, kneading and coating of the particles, there can be employed, at arbitrary ratios, ketones such as acetone, methyl ethyl ketone, methyl isobutyl ketone, cyclohexanone, isophorone, tetrahydrofuran; alcohols such as methanol, ethanol, propanol, butanol, isobutyl alcohol, isopropyl alcohol, methylcyclohaxanol; esters such as methyl acetate, ethyl acetate, butyl acetate, isobutyl acetate, isopropyl acetate, ethyl lactate, glycol monoethyl ether acetate; ethers such as diethyl ether, tetrahydrofuran, glycol diether, glycol monoether, dioxane; aromatic hydrocarbons such as benzene, toluene, xylene, cresol, chlorobenzene, styrene; chlorinated hydrocarbons such as methylene chloride, ethylene chloride, carbon tetrachloride, chloroform, ethylene chlorohydrin, dichlorobenzene; and N,N-dimethylformamide, hexane.

There is no particular limitation on the kneading procedure, and the addition order of necessary components and the like can be set at discretion.

In preparing a magnetic paint, there can be used conventional kneaders such as two-roll mills, three-roll mills, ball mills, pebble mills, Tron mills, sand grinders, Szegvari attritors, high-speed impeller dispersers, high-speed stone mills, high-speed impact mills, dispers, kneaders, high-speed mixers, ribbon blenders, co-kneaders, intensive mixers, tumlers, blenders, dispersers, homogenizers, single-screw extruders, two-screw extruders and supersonic dispersers. For continuous coating, these kneaders are properly combined to supply a magnetic paint stably. Technical details of kneading and dispersing are described in T. C. Patton, Paint Flow and Pigment Dispersion, John Wiley & Sons, 1964 and KOGYO ZAIRYO, Vol. 25, p. 37 (1977) but also in the literature referred to in these publications. Relevant description can also be seen in the specifications of U.S. Pat. Nos. 2,581,414 and 2,855,156. In embodying the invention, a magnetic paint can also be prepared according to the kneading and dispersing methods described in the above publications and the literature cited therein.

Prior to coating, the support used in the invention may be subjected to corona discharge, plasma treatment, heat treatment, dust-removing treatment, metallizing, alkali treatment, or the like. Technical matters on supports are described, for example, in German Pat. No. 3,338,854A, Japanese Pat. O.P.I. Pub. No. 116926/1984, U.S. Pat. No. 4,388,368 and Y. Sangoku, SEN-I TO KOGYO, Vol. 31, pp. 50–55, 1975.

The following are preferred modes of the support containing magnetic particles of the invention:

Preferably, the support comprises a natural or synthetic polymer such as cellulose ester, polyester, polycarbonate, polyethylene terephthalate, polyethylene naphthalate or polyparaphenylene terephthalamide; particularly preferred are acetylcellulose, polycarbonate and polyethylene terephthalate.

The magnetic particles may be added uniformly to the support, or may be concentrated on one side or at the central portion in the thickness direction of the support; but preferably the particles are concentrated on one side of the support oppositely with the side to be coated with photographic component layers. In concentrating the particles on one side of the support, there may be used a method which comprises the steps of casting a dope containing a support-forming polymer and magnetic particles and then concentrating the magnetic particles on one side of the support by means of gravity or magnetic force, or a method which comprises simultaneous casting of a dope containing magnetic particles and a dope containing no magnetic particles as described in Japanese Pat. Exam. Pub. No. 986/1955 and WO91/11750. Of them, the latter method is preferred for its capability of high-speed production.

In the invention, the support can be formed by casting simultaneously a cellulose triacetate dope containing magnetic particles and a cellulose triacetate dope containing no magnetic particles on a drum or a belt and drying it. The support can also be formed by casting first a cellulose triacetate dope containing on an endless belt, casting thereon a cellulose triacetate dope containing magnetic particles and drying the cast materials; in practicing this method, two casting heads are provided over the endless belt.

The thickness of the support is usually 50 to 200 μm, preferably 60 to 130 μm and especially 70 to 120 μm. When the thickness is less than the above, accuracy in writing and reading data with a magnetic head is lowered in high-speed coating of a silver halide light-sensitive material. A thickness larger than the above lowers a property as a silver halide light-sensitive material, namely, adaptability to exposing and processing devices.

In the support according to the invention, the layer where magnetic particles are present is usually 2 μm or less, preferably 1.5 μm or less and more preferably in the range of 0.1 to 1 μm in thickness. The coating weight of magnetic particles is usually 10 to 1000 mg/m$^2$, preferably 15 to 300 mg/m$^2$ and more preferably 20 to 100 mg/m$^2$.

The object of the invention is attained by giving a magnetic writing means and a magnetic reading means to the production line in the manufacture of a silver halide light-sensitive material, in which photographic component layers comprising at least one silver halide emulsion layer and nonlight-sensitive layer are coated on a support containing magnetic particles, and by controlling the manufacture of said silver halide light-sensitive material. That is, after forming the support of the invention which has a magnetic recording function, the support is subjected to formatting and addressing, in an in-line or off-line mode, by use of the magnetic recording means, so that the manufacture can be controlled in the process of coating photographic component layers according to inputted magnetic information. Further, in the coating process, additional information (e.g., product kind, production number, date of production, failure information, etc.) can be written with the magnetic writing means to feed back the information to the following drying process and cutting & packaging process. Furthermore, in the cutting & packaging process, there can be made writing of shipping and sales codes, reformatting in preparation for magnetic recording with a photographing camera, and recording of information necessary in photographing, developing and printing at proper places.

In embodying the invention, magnetic heads are effectively employed as magnetic writing and reading means, and these are provided so as to cover a part or the whole span of the support's width. Magnetic heads provided in the respective processes are connected to a computer so as to display read information, control the operation of manufacturing facilities and record necessary information at proper places. The control of manufacturing in the manner described above brings about favorable results in the manufacture of the silver halide color light-sensitive material of the invention.

In a preferred embodiment of the invention, the magnetic particles whose principal component being iron oxide are internally doped with a slight amount of aluminum, calcium or silicon. Preferably, the aspect ratio of the magnetic particles ranges from 1 to 7.

In the course of forming the magnetic layer by casting and drying a dope containing the magnetic particles, the magnetic particles may be oriented with regularity by use of magnets facing each other, or these may be subjected to the so-called randomizing treatment which gives a random magnetic field to each particle. Both methods are effective in the embodiment of the invention.

Though cellulose triacetate is preferably employed as a polymer to form the support, polyethylene terephthalate can also be used in forming the support, preferably, in the co-extrusion method. And there are preferably used, for capabilities of improving dispersion stability of the magnetic particles, polyethylene terephthalates of high moisture content such as those described in Japanese Pat. O.P.I. Pub. Nos. 244446/1989, 291248/1989, 298350/1989, 89045/1990, 93641/1990, 181749/1990, 214852/1990 and Japanese Pat. Appl. No. 291135/1990.

In carrying out the invention, it is preferred that a small amount of conventional dye or pigment be added to the support for the prevention of halation, irradiation and light piping.

In the invention, the write-read efficiency with a magnetic head can be raised by adding an inorganic or organic matting agent to a dope containing the magnetic particles, or by setting the surface roughness within a specific range through surface matting after formation of the magnetic layer.

In the invention, the physical properties of the support can be modified according to a specific requirement by adjusting the viscosity balance, changing the solvent compositions, adjusting the surface tensions and varying the plasticizer contents of the dope containing magnetic particles and that containing no magnetic particles.

In carrying out the invention, the manufacturing process can be simplified by coating, on the support formed as above, a subbing layer and a backing layer in an on-line mode. Light-sensitive Layers The silver halide color light-sensitive material of the invention can be made into a full color photographic light-sensitive material, which generally comprises a red-sensitive layer containing a cyan coupler, a green-sensitive layer containing a magenta coupler and a blue-sensitive layer containing a yellow coupler. Each of the light-sensitive layers may comprise either a single layer or a plurality of layers.

The order of forming these light-sensitive layers is not particularly limited, and these may be formed in various orders depending upon the use of a light-sensitive material. For example, these layers can be formed, from the support side, in the order of a red-sensitive layer, a green-sensitive layer and a blue-sensitive layer, or in the reverse order of a blue-sensitive layer, a green-sensitive layer and a red-sensitive layer.

Further, these may be formed in an order in which a light-sensitive layer of different spectral sensitivity is provided between two layers having the same spectral sensitivity. Furthermore, there may be provided a fourth or more spectrally sensitive light-sensitive layers in addition to the three layers comprising a red-sensitive layer, a green-sensitive layer and a blue-sensitive layer. Japanese Pat. O.P.I. Pub. Nos. 34541/1986, 201245/1986, 198236/1986 and 160448/1987 disclose layer configurations using a fourth or more spectrally sensitive light-sensitive layers, any of which are applicable to the invention.

The fourth or more spectrally sensitive light-sensitive layers may be provided at any position in the configuration of photographic component layers. Further, these layers may be comprised of either a single layer or a plurality of layers.

Various nonlight-sensitive layers may be provided between light-sensitive layers, on the uppermost light-sensitive layer and under the lowermost light-sensitive layer.

These nonlight-sensitive layers may contain those couplers and DIR compounds which are described in Japanese Pat. O.P.I. Pub. Nos. 43748/1986, 113438/1984, 113440/1984, 20037/1986, 20038/1986 and further may contain color mixing inhibitors as is usual with them. Further, these nonlight-sensitive layers may be auxiliary layers such as filter layers and intermediate layers described in Research Disclosure (hereinafter referred to as RD) 308119, p.1002, Sec. VII-K.

The layer configuration which the light-sensitive material of the invention may have includes the conventional layer order, inverted layer order and unit layer structure described in RD 308119, p.10002, Sec. VII-k.

When two layers having the same spectral sensitivity are provided, these may be identical with each other, or these may have a double-layer structure comprising a high-speed emulsion layer and a low-speed emulsion layer as disclosed in German Pat. No. 923,045. In the latter case, it is desirable in general that an emulsion layer lower in speed be provided nearer to the support, and a nonlight-sensitive layer may be provided between the emulsion layers. When a specific requirement arises, there can be provided a low-speed emulsion layer farther from the support and a high-speed emulsion layer nearer to the support as seen in Japanese Pat. O.P.I. Pub. Nos. 112751/1982, 200350/1987, 206541/1987 and 206543/1987.

Typically, these layers are arranged, starting with the layer farthest from the support, in the order of low-speed blue-sensitive layer (BL)/high-speed blue-sensitive layer (BH)/high-speed green-sensitive layer (GH)/low-speed green-sensitive layer (GL)/high-speed red-sensitive layer (RH)/low-speed red-sensitive layer (RL), BH/BL/GL/GH/RH/RL, or BH/BL/GH/GL/RL/RH.

These layers may also be arranged in the order of blue-sensitive layer/GH/RH/GL/RL with the blue-sensitive layer farthest from the support, as seen in Japanese Pat. Exam. Pub. No. 34932/1980. Moreover, as described in Japanese Pat. O.P.I. Pub. Nos. 25738/1981 and 63936/1987, these layers may also be arranged in the order of blue-sensitive layer/GL/RL/GH/RH with the blue-sensitive layer farthest from the support.

Furthermore, there may be used three light-sensitive layers which are different in speed and the same in spectral sensitivity as disclosed in Japanese Pat. Exam. Pub. No. 15495/1974, in which these three layers are arranged in the order of upper high-speed silver halide emulsion layer, intermediate medium-speed silver halide emulsion layer and lower low-speed silver halide emulsion layer. Japanese Pat. O.P.I. Pub. No. 202464/1984 discloses another arrangement of such three layers, in which the layers are provided in the descending order of medium-speed silver halide emulsion layer, high-speed silver halide emulsion layer and low-speed silver halide emulsion layer.

In carrying out the invention, such three layers different in sensitization speed may be provided in any order. And suitable layer arrangements include, for example, the order of high-speed silver halide emulsion layer, low-speed silver halide emulsion layer and medium-speed silver halide emulsion layer, and the order of low-speed silver halide emulsion layer, medium-speed silver halide emulsion layer and high-speed silver halide emulsion layer. Further, there can also be provided four or more light-sensitive layers of the same spectral sensitivity in an arbitrary order.

In the invention, the layer structure can be properly selected according to the use of a light-sensitive material from various layer configurations and layer arrangements described above.

Silver halide emulsions used in the invention can be prepared by methods described in, for example, Emulsion Preparation and Types, RD No.17643, pp. 22–23 (Dec., 1978) and RD No.18716, P.648, P. Glafkides, Chemist et Phisique Photographique, Paul Motel, 1967, G. F. Duffin, Photographic Emulsion Chemistry, Focal Press (1966) and L. Zeilikman et al, Making and Coating Photographic Emulsion, Focal Press, 1964.

Monodispersed emulsions described, for example, U.S. Pat. Nos. 3,574,628, 3,665,394 and British Pat. No. 1,413,748 are also preferred.

Emulsions used in the invention may employ various photographic additives in the processes before or after physical ripening or chemical ripening.

As such photographic additives, there can be employed the compounds described in the foregoing RD Nos.17643, 18716 and 308119. The types of these compounds and the locations where these are described are as follows:

| Item | Page of RD308119 | Page of RD17643 | Page of RD18716 |
|---|---|---|---|
| Chemical sensitizers | 996 III Sec. A | 23 | 648 |
| Spectral sensitizers | 996 IV Sec. A A,B,C,D,H,I,J | 23–24 | 648–9 |
| Supersensitizers | 996 IV Sec. A–E,J | 23–24 | 648–9 |
| Antifoggants | 998 IV | 24–25 | 649 |
| Stabilizers | 998 IV | 24–25 | 649 |
| Anticolor-mixing agents | 1002 VII Sec. I | 25 | 650 |
| Dye image stabilizers | 1001 VII Sec. J | 25 | |
| Whitening agents | 998 V | | |
| UV absorbents | 1003 VIII Sec. C XIII Sec. C | 25–26 | |
| Light absorbents | 1003 VIII | 25–26 | |
| Light scattering agents | 1003 VIII | 25–26 | |
| Filter dyes | 1003 VIII | | |
| Binders | 1003 IX | 26 | 651 |
| Antistatic agents | 1006 XIII | 27 | 650 |
| Hardeners | 1004 X | 26 | 651 |
| Plasticizers | 1006 XII | 27 | 650 |
| Lubricants | 1006 XII | 27 | 650 |
| Surfactants & coating aids | 1005 XI | 26–27 | 650 |
| Matting agents | 1007 XI | | |
| Developing agents (contained in light-sensitive materials) | 1011 XX Sec. B | | |

In order to prevent the deterioration in photographic properties due to formaldehyde gas, it is preferred that the light-sensitive material of the invention contain a compound which reacts with the formaldehyde gas to solidify it.

Preferably, the silver halide emulsion according to the invention comprises silver iodobromide having an average silver iodide content of 4 to 20 mol % and, in a particularly preferred embodiment, the emulsion comprises silver iodobromide whose average silver iodide is 5 to 15 mol %. The silver hide emulsion of the invention may contain silver chloride within the range not harmful to the object of the invention.

In the invention, when a silver halide emulsion comprising silver halide grains having development starting points localized at specific positions on the grains' surfaces or vicinities thereof is used jointly with other silver halide emulsions, silver halide grains contained in these silver halide emulsions may have any crystal forms such as regular forms including cubes, octahedrons, tetradecahedrons, etc., irregular forms including spheres, plates, etc., those having a crystal defect including a twin plane, and their combined forms.

Silver halide grains other than those described above may be either fine grains of about 0.2 μm or less in size or large grains having a projected area diameter up to about 10 μm and, further, these grains may be either polydispersed or monodispersed.

The silver halide color light-sensitive material may use a variety of color couplers.

Preferred yellow couplers are those described, for example, in U.S. Pat. Nos. 3,933,051, 4,022,620, 4,326,024, 4,401,752, 4,248,961, Japanese Pat. Exam. Pub. No. 10739/1983, British Pat. Nos. 1,425,020, 4,314,023, 4,511,649 and European Pat. No. 249,473A.

As magenta couplers, 5-pyrazolone type and pyrazoloazole type compounds are preferred. Particularly preferred are those described, for example, in U.S. Pat. Nos. 4,310,619, 4,351,897, 3,061,432, 3,725,067, 4,500,630, 4,540654, 4,556,630, European Pat. No. 73,636, RD Nos. 24220 (Jun., 1984), 24230 (Jun., 1984), Japanese Pat. O.P.I. Pub. Nos. 33552/1985, 43659/1985, 72238/1986, 35730/1985, 118034/1980, 185951/1985, and International Pat. Pub. No. WO88/04795.

As cyan couplers, conventional phenol type and naphthol type couplers are used jointly with the coupler of the invention. Preferred examples of such phenol type and naphthol type couplers include those described in U.S. Pat. Nos. 4,228,233, 4,296,200, 2,369,929, 2,810,171, 2,772,162, 2,895,826, 3,772,002, 3,758,308, 4,334,011, 4,327,173, 3,446,622, 4,333,999, 4,775,616, 4,451,559, 4,427,767, 4,690,889, 4,254,212, 4,296,199, German Offenlegungshrift No. 3,329,729, European Pat. Nos. 121,365A, 249,453A, and Japanese Pat. O.P.I. Pub. No. 42658/1986.

Preferred colored couplers to compensate unnecessary absorptions of dye-forming couplers are those disclosed in U.S. Pat. Nos. 4,163,670, 4,004,929, 4,138,258, Japanese Pat. Exam. Pub. No. 39413/1982 and British Pat. No. 1,146,368. It is also preferred to employ the coupler disclosed in U.S. Pat. No. 4,744,181 which releases, upon coupling, a fluorescent dye to compensate unnecessary absorptions brought about by a dye-forming coupler, or the coupler disclosed in U.S. Pat. No. 4,777,120 which has, as a releasable group, a dye precursor group capable of forming a dye upon reacting with a developing agent.

As couplers to form a dye with suitable diffusibility, there can be preferably used those described in U.S. Pat. No. 4,366,237, British Pat. No. 2,125,570, European Pat. 96,570 and German Offenlegungshrift No. 3,234,533.

Typical examples of polymerized dye-forming couplers can be seen in specifications of U.S. Pat. Nos. 3,451,820, 4,080,211, 4,367,282, 4,409,320, 4,576,910 and British Pat. No. 2,102,173.

Couplers capable of splitting off a photographically useful residue upon coupling can also be favorably used in the invention. Preferred examples of DIR couplers which split off a developing inhibitor include those disclosed in Japanese Pat. O.P.I. Pub. Nos. 151944/1982, 154234/1982, 184248/1985, 37346/1988 and U.S. Pat. Nos. 4,248,962, 4,782,012.

As couplers which split off a nucleus-forming agent or a development accelerator imagewise in developing, those disclosed in British Pat. Nos. 2,097,140, 2,131,188 and Japanese Pat. O.P.I. Pub. Nos. 157638/1984, 170840/1984 are preferred.

Besides the above, couplers usable in the light-sensitive material of the invention include a competitive coupler as described in U.S. Pat. No. 4,130,427; a multi-equivalent coupler as described in U.S. Pat. Nos. 4,283,472, 4,338,393, 4,310,618; a coupler splitting off a DIR redox compound, a coupler splitting off a DIR coupler and a redox compound splitting off a DIR coupler or a redox compound splitting off a DIR redox compound, each of which is described in Japanese Pat. O.P.I. Pub. Nos. 185950/1985 or 24252/1987; a coupler which splits off a dye capable of recoloring after being split as described in European Pat. 173,302A; a coupler which splits off a bleach accelerating agent as described in RD Nos. 11449, 24241 and Japanese Pat. O.P.I. Pub. No. 201247/1986; a coupler which splits off a ligand as described in U.S. Pat. No. 4,553,477; and a coupler which splits off a leuco dye as described in Japanese Pat. O.P.I. Pub. No. 75747/1988.

In the invention, a variety of couplers can be used further; typical examples thereof can be seen in RD Nos. 17643 and 308119. The following are locations where relevant descriptions are provided.

| Item | Page of RD308119 | Page of RD17643 |
|---|---|---|
| Yellow couplers | 1001 VII Sec. D | VII Sec. C–G |
| Magenta couplers | 1001 VII Sec. D | VII Sec. C–G |
| Colored couplers | 1002 VII Sec. G | VII Sec. G |
| DIR couplers | 1001 VII Sec. F | VII Sec. F |
| BAR couplers | 1002 VII Sec. F | |
| Other useful groups releasing couplers | 1001 VII Sec. F | |
| Alkali soluble couplers | 1001 VII Sec. E | |

The additives used in the invention can be properly incorporated according to the dispersing method described in RD No. 308119, XIV or similar methods.

Support

In the silver halide color light-sensitive material of the invention, any support can be employed. When a transparent support is used, it is preferred that a dye be contained in the support with the object of preventing light piping, or edge fogging, which is caused, after photographic emulsion layers are coated, by the incident light from the edge of the transparent support. Dyes used for this object are not particularly limited in kinds, but dyes of high heat resistance, such as anthraquinone dyes, are preferred in view of heat applied in the course of film formation. Since the color tone of the transparent support is preferably gray as is seen in general light-sensitive materials, gray dyes are usually used singly or in combination of one or two types. Suitable dyes can be selected from dyes available under the trade names of SUMIPLAST (Sumitomo Chemical Co., Ltd.), Diaresin (Mitsubishi Kasei Corp.), MACROLEX (Bayer AG), etc.

The transparent support used in the invention can be produced by the steps of, for example, drying thoroughly the foregoing copolymer polyester or a copolymer polyester composition containing said copolymer polyester and an antioxidant blended according to necessity or at least one compound selected from the group of sodium acetate, sodium hydroxide and tetraethylhydroxy ammonium, melt-extruding it into a sheet through an extruder, a filter and a head each controlled to 260°–320° C., cooling the molten polymer sheet into an unoriented solid film on a rotating cooling drum, drawing the film widthwise and lengthwise to orient it biaxially, and heat-setting the oriented film.

The drawing conditions of the film cannot be set indiscriminately since these are varied with the copolymer composition of the polyester. But, usually, the film is drawn lengthwise to a draw ratio of 2.5 to 6.0 in a temperature range from the glass transition point (Tg) of the copolymer polyester to Tg+100° C., and drawn widthwise to a draw ratio of 2.5 to 4.0 in a temperature range from Tg+5° C. to Tg+50° C. The resulting biaxially oriented film is usually subjected to heat setting at a temperature of 150° to 240° C., followed by cooling. During heat setting, the film may be relaxed lengthwise and/or widthwise if necessary.

The transparent support used in the invention may be a single-layered film or sheet formed as above, or may have a multi-layered structure formed by laminating, on a film or sheet formed as above, another film or sheet different in material by co-extrusion or lamination.

The thickness of the transparent support of the invention thus obtained is not particularly limited, but it is usually 120 μm or less, preferably 40 to 120 μm and more preferably 50 to 110 μm. The local irregularity in the support's thickness is preferably 5 μm or less, more preferably 4 μm or less and still more preferably 3 μm or less.

Keeping the support thickness within the above range not only prevents undesirable problems in strength and curling property of a film coated with photographic component layers, but also makes it easy to adjust the whole film thickness within the range described above. Further, by controlling the local irregularity within the range of 5 μm, uneven coating and uneven drying can be prevented in the process of coating photographic component layers.

Subbing Layer

Prior to forming photographic component layers, there may be provided, if necessary, a surface activating treatment such as corona discharge and/or a subbing layer on the surface of the transparent support where the photographic component layers are formed.

Preferred examples of such a subbing layer include those described in Japanese Pat. O.P.I. Pub. Nos. 19941/1984, 77439/1984, 224841/1984 and Japanese Pat. Exam. Pub. No. 53029/1983. A subbing layer provided on the transparent support oppositely with the photographic component layers is also referred to as a backing layer.

Silver Halide Color Light-sensitive Material

The silver halide color light-sensitive material of the invention can be applied to a variety color light-sensitive materials typically represented by color negative films for movies, color reversal films for slides and television, color paper, color positive films and color reversal paper.

When the silver halide color light-sensitive material of the invention is used in the form of rolls, it is preferable that such a roll be housed in a cartridge. The most popular cartridge is that which is referred to as format 135. In addition, there can also be employed other cartridges proposed in the following patents or the likes:

Japanese Utility Model O.P.I. Pub. Nos. 67329/1983, 195236/1983, Japanese Pat. O.P.I. Pub. Nos. 181035/1983, 182634/1983, Japanese Pat. Appl. Nos. 57785/1988, 183344/1988, 325638/1988, 25362/1989, 21862/1989, 30246/1989, 20222/1989, 21863/1989, 37181/1989, 33108/1989, 85198/1989172595/1989, 172594/1989, 172593/1989 and U.S. Pat. Nos. 4,221,479, 4,846,418, 4,848,693, 4,832,275.

Further, the invention can be applied to the Japanese Patent Application titled "Small Photographic Roll Film Cartridge and Film Camera" and filed by T. Yagi et al. on Jan. 31, 1992.

In obtaining dye images using the silver halide color light-sensitive material of the invention, exposed films are processed by conventional color development methods, for example, those described in RD Nos. 17643, pp.28–29, 18716, p.647 and 308119, XIX.

EXAMPLES

The following examples illustrate the various aspects of the invention but are not intended to limit it.

Example 1

Preparation of Support

A dope was prepared by thoroughly dissolving 100 parts of cellulose triacetate with acetylation of 61.4% and 15 parts of triphenyl phosphate in 738 parts of methylene chloride-methyl alcohol mixed solvent and adding a small amount of each of the following dyes (a), (b) and (c).

Dyes (a)

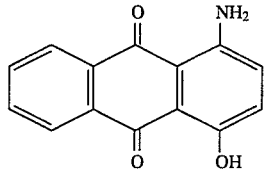

Dyes (b)

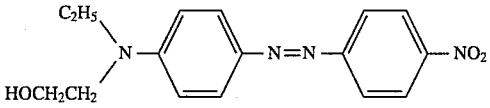

Dyes (c)

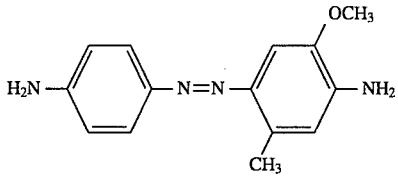

Separately, a cellulose triacetate dope containing magnetic particles was prepared as follows:

Co-coated Y-$Fe_2O_3$ (coercive force: 610 Oe, BET specific surface area: 35 $m^2/g$, major axis length: 0.23 μm, aspect ratio: 7) 100 parts by weight

| | |
|---|---|
| Cellulose triacetate | 210 parts by weight |
| Methylene chloride | 2100 parts by weight |
| Methyl ethyl ketone | 1000 parts by weight |

The above components were mixed with a dissolver and then dispersed with a sand grinder. The viscosity of the resultant dispersion was 8.8 poises when measured with a Brookfield type viscometer.

Twenty parts by weight of this dispersion was weighed out and thoroughly mixed with a doping medium of the following composition using a dissolver.

| | |
|---|---|
| Cellulose triacetate | 13.8 parts by weight |
| Methylene chloride | 163.1 parts by weight |
| Cyclohexanone | 55 parts by weight |
| Ethanol | 3.1 parts by weight |

Each dope was filtered and poured uniformly at 27° C. onto a 6-m long travelling endless stainless steel band from two outlets provided over the steel band. After evaporating the solvents till the poured composition became peelable, the composition was peeled from the steel band and dried. Obtained was a 85-μm thick cellulose triacetate base support containing magnetic particles.

In preparing the support, the cellulose triacetate dope containing magnetic particles was coated so as to give a dry coating thickness of 1 μm and, after being poured out, subjected to magnetic orientation with magnets facing each other, followed by drying. The coating weight of magnetic particles was 50 $mg/m^2$.

The coercive force of the support 670 Oe, and the optical transmission density was 0.10.

On the surface of the support was coated a subbing solution containing 20 g of gelatin, 40 g of water, 20 g of salicylic acid, 600 g of methanol, 1200 g of acetone and 200 g of methylene chloride, followed by drying.

Layers of the following compositions were formed in order on the above cellulose triacetate base support oppositely with the magnetic-particle-containing layer.

| 1st Layer | |
|---|---|
| Alumina sol AS-100 (aluminum oxide) (product of Nissan Chemical Ind., Ltd.) | 0.8 g |
| 2nd Layer | |
| Diacetylcellulose | 100 mg |
| Stearic acid | 10 mg |
| Silica fine particles (average size: 0.2 μm) | 50 mg |

Preparation of Silver Halide Emulsion

An emulsion comprising octahedral silver iodobromide grains mainly having (111) faces was prepared by the double jet method according to the process disclosed in Japanese Pat. O.P.I. Pub. No. 138538/1985.

The resultant emulsion had the properties of average grain size: 1.05 mm, grain size distribution extent: 9%, silver iodide content in the core: 30 mol %, silver iodide content in the shell: 0.1 mol %, average silver iodide content: 9 mol %, relative standard deviation in silver iodide contents of emulsion grains: 17% and percentage of (111) face: 98%. This emulsion is referred to as Em-A.

Sensitization of Silver Halide Emulsion

Em-A was sensitized as follows. To Em-A were added sensitizing dyes (kinds and addition amounts are described later) and, 20 minutes later, $1.5\times10^{-6}$ mol of sodium thiosulfate and $5.0\times10^{-7}$ mol of N,N-dimethylselenourea were added. After ripening it for 60 minutes, an aqueous solution containing $5.0\times10^{-7}$ mol of chloroauric acid and $1.0\times10^{-4}$ mol of ammonium thiocyanate were added, followed by further ripening of 30 minutes.

After completion of ripening, stabilizer ST-1 and inhibitor AF-1 were added in amounts of 500 mg and 10 mg, respectively, per mol of silver halide.

Preparation of Silver Halide Color Light-sensitive Material

A multi-layer color light-sensitive material, sample 101, was prepared by forming following layers on the above transparent support.

Compositions of Light-sensitive Layers

In the following recipe, coating weights of silver halides and colloidal silvers are expressed in g/m$^2$ of metallic silver present, those of couplers and additives in g/m$^2$, and those of sensitizing dyes in moles per mole of silver halide contained in the same layer.

| Sample 101 | |
|---|---|
| 1st Layer: antihalation layer | |
| Black colloidal silver | 0.16 |
| UV absorbent UV-1 | 0.20 |
| High boiling solvent Oil-1 | 0.16 |
| Gelatin | 1.60 |
| 2nd Layer: intermediate layer | |
| Compound SC-1 | 0.14 |
| High boiling solvent Oil-2 | 0.17 |
| Gelatin | 0.80 |
| 3rd Layer: low-speed red-sensitive layer | |
| Silver iodobromide emulsion A | 0.15 |

-continued

| Sample 101 | |
|---|---|
| Silver iodobromide emulsion B | 0.35 |
| Sensitizing dye SD-1 | $2.0\times10^{-4}$ |
| Sensitizing dye SD-2 | $1.4\times10^{-4}$ |
| Sensitizing dye SD-3 | $1.4\times10^{-5}$ |
| Sensitizing dye SD-4 | $0.7\times10^{-4}$ |
| Cyan coupler C-1 | 0.53 |
| Colored cyan coupler CC-1 | 0.04 |
| DIR compound D-1 | 0.025 |
| High boiling solvent Oil-3 | 0.48 |
| Gelatin | 1.09 |
| 4th Layer: medium-speed red-sensitive layer | |
| Silver iodobromide emulsion B | 0.30 |
| Silver iodobromide emulsion C | 0.34 |
| Sensitizing dye SD-1 | $1.7\times10^{-4}$ |
| Sensitizing dye SD-2 | $0.86\times10^{-4}$ |
| Sensitizing dye SD-3 | $1.15\times10^{-5}$ |
| Sensitizing dye SD-4 | $0.86\times10^{-4}$ |
| Cyan coupler C-1 | 0.33 |
| Colored cyan coupler CC-1 | 0.013 |
| DIR compound D-1 | 0.02 |
| High boiling solvent Oil-1 | 0.16 |
| Gelatin | 0.79 |
| 5th Layer: high-speed red-sensitive layer | |
| Silver iodobromide emulsion D | 0.95 |
| Sensitizing dye SD-1 | $1.0\times10^{-4}$ |
| Sensitizing dye SD-2 | $1.0\times10^{-4}$ |
| Sensitizing dye SD-3 | $1.2\times10^{-5}$ |
| Cyan coupler C-2 | 0.14 |
| Colored cyan coupler CC-1 | 0.016 |
| High boiling solvent Oil-1 | 0.18 |
| Gelatin | 0.79 |
| 6th Layer: intermediate layer | |
| Compound SC-1 | 0.09 |
| High boiling solvent Oil-2 | 0.11 |
| Gelatin | 0.80 |
| 7th Layer: low-speed green-sensitive layer | |
| Silver iodobromide emulsion A | 0.12 |
| Silver iodobromide emulsion B | 0.38 |
| Sensitizing dye SD-4 | $4.6\times10^{-5}$ |
| Sensitizing dye SD-5 | $4.1\times10^{-4}$ |
| Magenta coupler M-1 | 0.14 |
| Magenta coupler M-2 | 0.14 |
| Colored magenta coupler CM-1 | 0.06 |
| High boiling solvent Oil-4 | 0.34 |
| Gelatin | 0.70 |
| 8th Layer: intermediate layer | |
| Gelatin | 0.41 |
| 9th Layer: medium-speed green-sensitive layer | |
| Silver iodobromide emulsion B | 0.30 |
| Silver iodobromide emulsion C | 0.34 |
| Sensitizing dye SD-6 | $1.2\times10^{-4}$ |
| Sensitizing dye SD-7 | $1.2\times10^{-4}$ |
| Sensitizing dye SD-8 | $1.2\times10^{-4}$ |
| Magenta coupler M-1 | 0.04 |
| Magenta coupler M-2 | 0.04 |
| Colored magenta coupler CM-1 | 0.017 |
| DIR compound D-2 | 0.025 |
| DIR compound D-3 | 0.002 |
| High boiling solvent Oil-4 | 0.12 |
| Gelatin | 0.12 |
| 10th Layer: high-speed green-sensitive layer | |
| Silver iodobromide emulsion D | 0.95 |
| Sensitizing dye SD-6 | $7.1\times10^{-5}$ |
| Sensitizing dye SD-7 | $7.1\times10^{-5}$ |
| Sensitizing dye SD-8 | $7.1\times10^{-5}$ |
| Magenta coupler M-1 | 0.09 |
| Colored magenta coupler CM-1 | 0.011 |
| High boiling solvent Oil-4 | 0.11 |

-continued

| Sample 101 | |
|---|---|
| Gelatin | 0.79 |
| 11th Layer: yellow filter layer | |
| Yellow colloidal silver | 0.08 |
| Compound SC-1 | 0.15 |
| High boiling solvent Oil-2 | 0.19 |
| Gelatin | 1.10 |

-continued

| Sample 101 | |
|---|---|
| 12th Layer: low-speed blue-sensitive layer | |
| Silver iodobromide emulsion A | 0.12 |
| Silver iodobromide emulsion B | 0.24 |
| Silver iodobromide emulsion C | 0.12 |
| Sensitizing dye SD-9 | $6.3 \times 10^{-5}$ |
| Sensitizing dye SD-10 | $1.0 \times 10^{-5}$ |
| Yellow coupler Y-1 | 0.50 |
| Yellow coupler Y-2 | 0.50 |
| DIR compound D-4 | 0.04 |
| DIR compound D-5 | 0.02 |
| High boiling solvent Oil-2 | 0.42 |
| Gelatin | 1.40 |
| 13th Layer: high-speed blue-sensitive layer | |
| Silver iodobromide emulsion C | 0.15 |
| Silver iodobromide emulsion E | 0.80 |
| Sensitizing dye SD-9 | $8.0 \times 10^{-5}$ |
| Sensitizing dye SD-11 | $3.1 \times 10^{-5}$ |
| Yellow coupler Y-1 | 0.12 |
| High boiling solvent | 0.05 |
| Gelatin | 0.79 |
| 14th Layer: 1st protective layer | |
| Silver iodobromide emulsion (average grain size: 0.08 μm, silver iodide content: 1.0 mol %) | 0.40 |
| UV absorbent UV-1 | 0.065 |
| High boiling solvent Oil-1 | 0.07 |
| High boiling solvent Oil-3 | 0.07 |
| Gelatin | 0.65 |
| 15th Layer: 2nd protective layer | |
| Alkali soluble matting agent (average particle size: 2 μm) | 0.15 |
| Polymethylmethacrylate (average particle size: 3 μm) | 0.04 |
| Lubricant WAX-1 | 0.04 |
| Gelatin | 0.55 |

Besides the above compositions, coating aid Su-1, dispersing aid Su-2, viscosity modifier, hardeners H-1 and H 2, stabilizer ST-1, antifoggants AF-1 (average molecular weight: 10,000) and AF-2 (average molecular weight: 1,100,000) and antiseptic agent DI-1 were added.

The emulsions used in the sample are shown in Table 3, where average grain sizes are given in sizes of converted cubes. These emulsions were optimumly subjected to gold and sulfur sensitization.

TABLE 3

| Emulsion Name | Average AgI Content (mol %) | Average Grain Size (μm) | Crystal Form | Diameter/ Thickness Ratio | Remarks |
|---|---|---|---|---|---|
| Emulsion A | 4.0 | 0.30 | Regular Crystal | 1 | |
| Emulsion B | 6.0 | 0.42 | Regular Crystal | 1 | |
| Emulsion C | 6.0 | 0.55 | Regular Crystal | 1 | |
| Emulsion D | 6.0 | 0.85 | Tabular Twin Crystal | 4 | |
| Emulsion E | 6.0 | 0.95 | Tabular Twin Crystal | 4 | |
| Emulsion F | 8.0 | 0.95 | Tabular Twin Crystal | 4 | Pb, Iodide |
| Emulsion G | 8.0 | 0.95 | Tabular Twin Crystal | 4 | In, Iodide |
| Emulsion H | 8.0 | 0.95 | Tabular Twin Crystal | 4 | Fe, Iodide |
| Emulsion I | 8.0 | 0.95 | Tabular Twin Crystal | 4 | Pb, In, Iodide |
| Emulsion J | 8.0 | 0.95 | Tabular Twin Crystal | 4 | Pb, Dislocation Line |
| Emulsion K | 8.0 | 0.95 | Tabular Twin Crystal | 4 | Pb, PTTS |
| Emulsion L | 4.0 | 0.55 | Regular Crystal | 1 | Pb, Iodide |
| Emulsion M | 4.0 | 0.55 | Regular Crystal | 1 | In, Iodide |

Emulsions F to M contained $1\times10^{-5}$ mol/mol Ag each of the metal shown in the remarks column and, in the course of grain formation, iodide or PTTS (p-toluene thiosulfonic acid) was added to each of these emulsions.

In the preparation of sample 101, the layers from 1st to 8th were coated simultaneously in the first coating, and then the layers from 9th to 16th were simultaneously coated thereon. In sample 101, the coating weight of silver was 6.25 g/m$^2$, the dry coating thickness was 18 μm and the specific photographic sensitivity was 420.

C-1
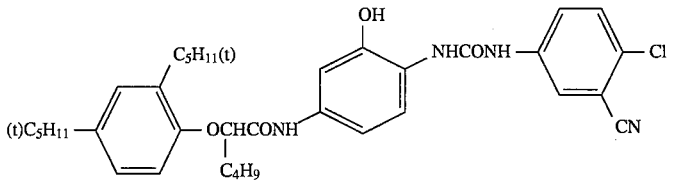
C-2
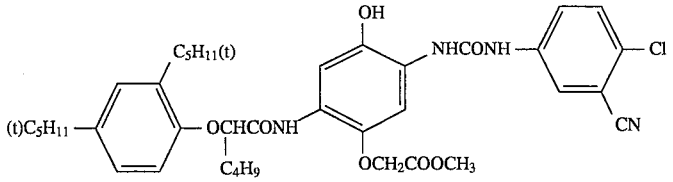
M-1
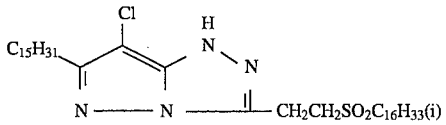
M-2
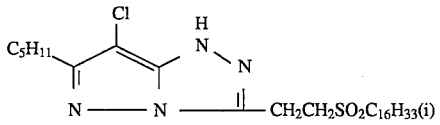
M-3
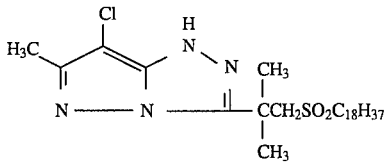
M-4
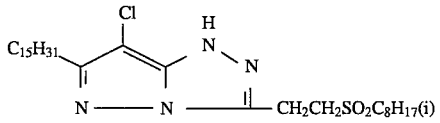
M-5
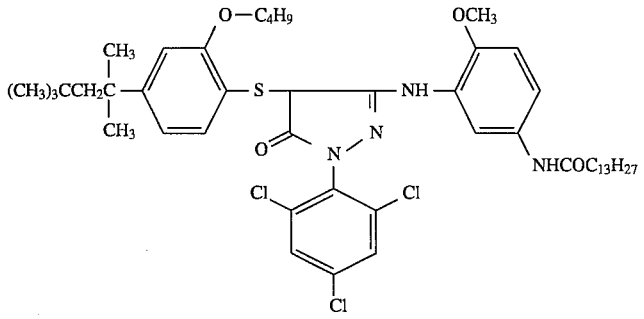
Y-1
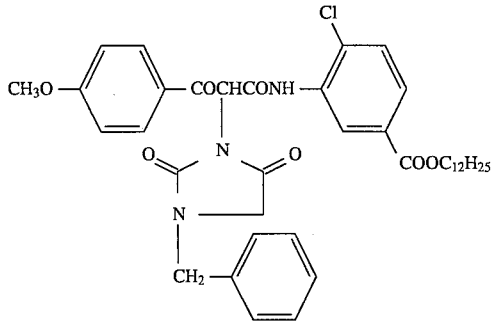

-continued
Y-2
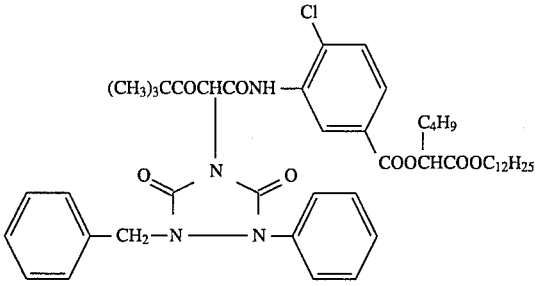
CC-1
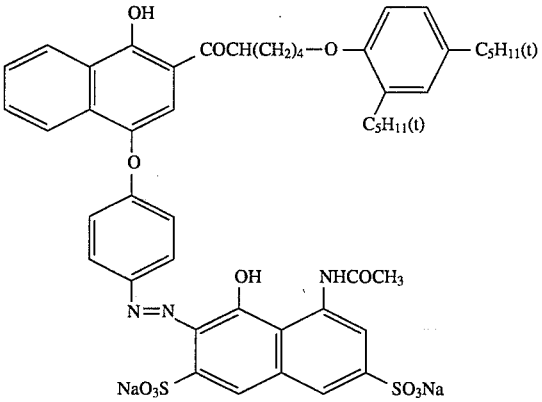
CM-1
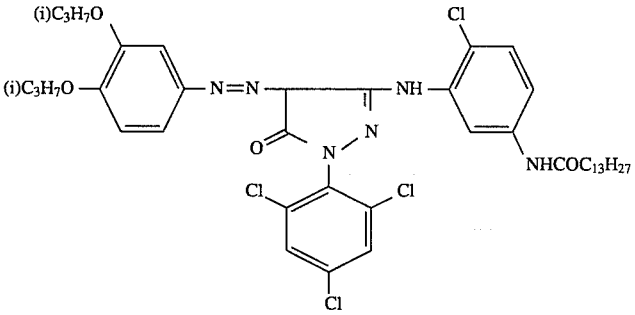
CM-2
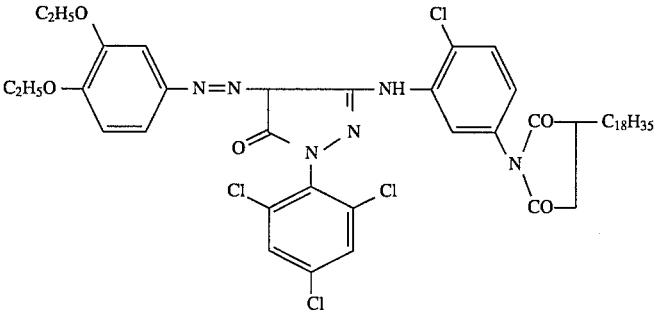
D-1
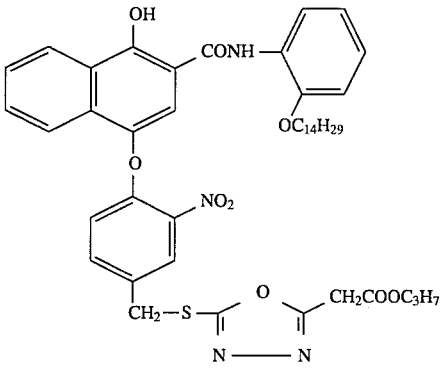

-continued
D-2
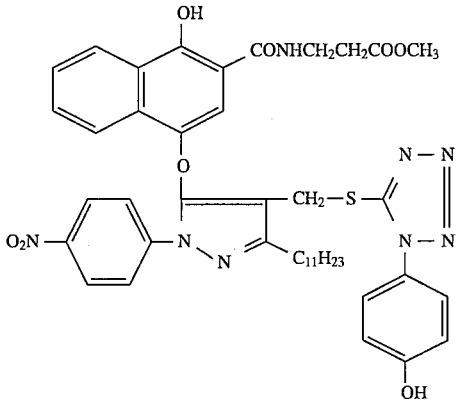
D-3
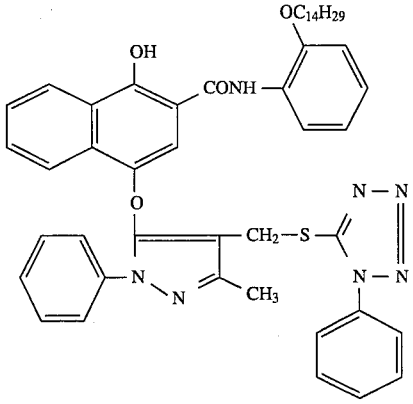
D-4
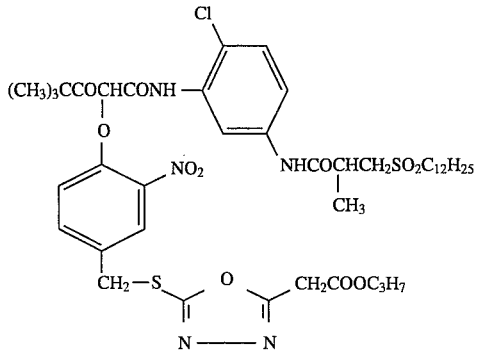
D-5
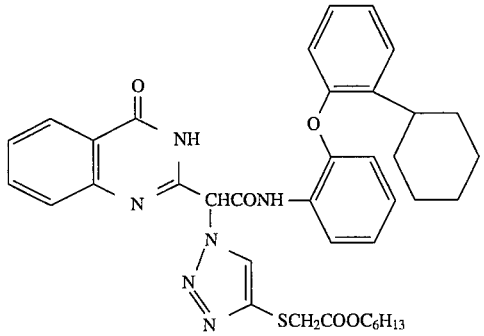

-continued
D-6
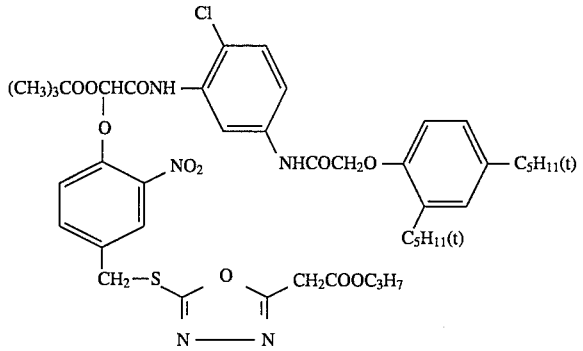
OIL-1
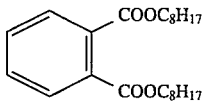
OIL-2
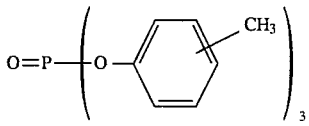
OIL-3
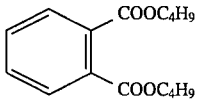
OIL-4
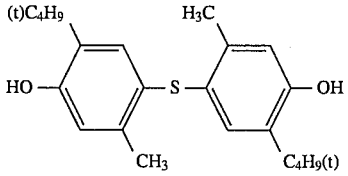
OIL-5
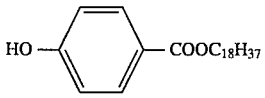
SC-1
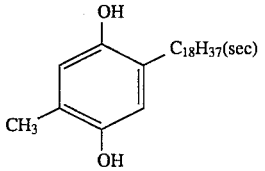
UV-1
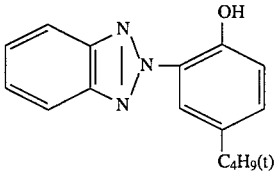
WAX-1
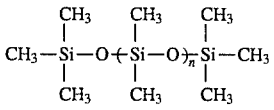
weight average molecular weight Mw = 3,000
Su-1
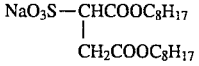

-continued
Su-2
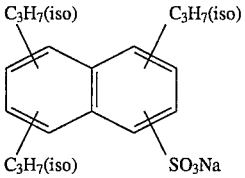
SD-1
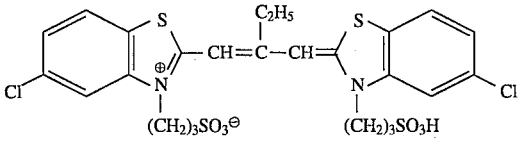
SD-2
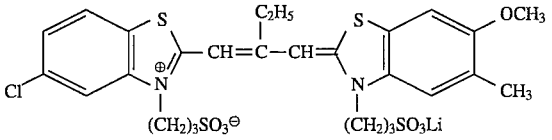
SD-3
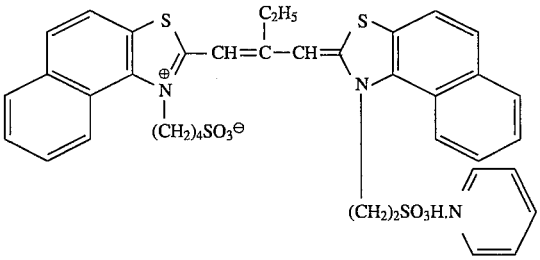
SD-4
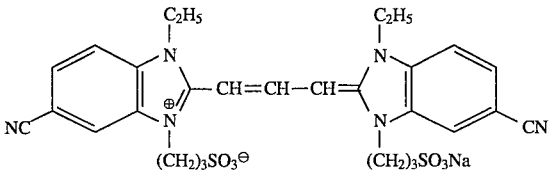
SD-5
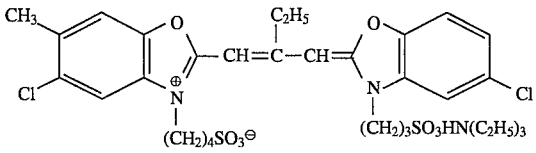
SD-6
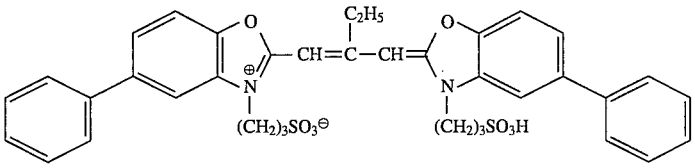
SD-7
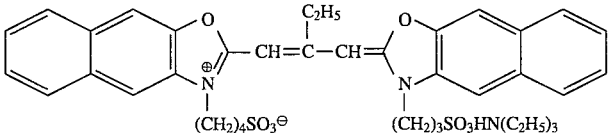
SD-8
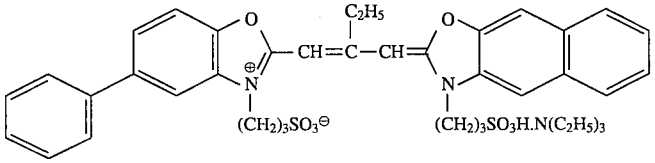

-continued

SD-9

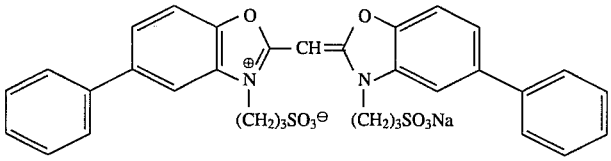

SD-10

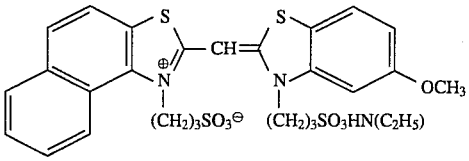

SD-11

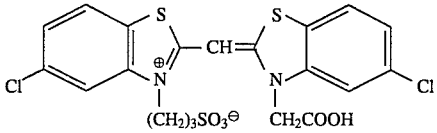

H-1

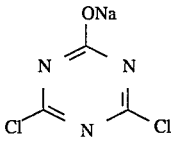

H-2

$(CH_2{=}CHSO_2CH_2)_2O$

ST-1

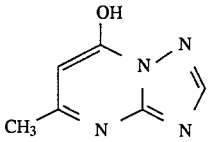

AF-1

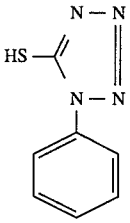

AF-2

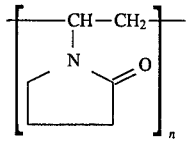

n = polymerization degree

DI-1 (mixture of the following three components)

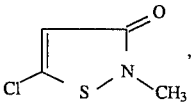

(Component A)

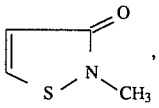

(Component B)

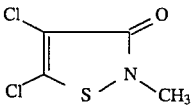

(Component C)

Component A:Component B:Component C = 50:46:4 (mol ratio)

Preparation of Samples 102 to 115

Sample 102 was prepared in the same manner as sample 101 except that the contents of silver halide emulsions in the 3rd, 4th, 5th, 7th, 9th, 10th, 12th and 13th layers were uniformly increased by 40% to make 8.50 g/m$^2$, and that the gelatin contents in the 1st to 13th layers were also increased to give a coating thickness of 23 μm. Sample 105 was prepared in the same manner as sample 101 except that the yellow colloidal silver in the 11th layer was replaced by a dispersion of comparative dye-1. Samples 116 to 120 were prepared by repeating the procedure of sample 101 except that the compositions used in sample 101 were changed on the following three points: (1) Magenta couplers M-1 and M-2 in the 7th, 9th and 10th layers were changed to magenta couplers M-3 and M-4, respectively, colored magenta coupler CM-1 to CM 2, and Oil-4 to 0il-5. (2) DIR compounds D-4 and D-5 were changed to D-6 and D-i, respectively. (3) Emulsion C was replaced by emulsion L, emulsion D by emulsion H, and emulsion E by emulsion J. Table 4 shows the specific photographic sensitivity, coating weight of silver, coating thickness and filter dye contained in the 11th layer of the respective samples.

TABLE 4

| Sample No. | Specific Sensitivity | Silver Coating Weight | Coating Thickness (μm) | Dye |
|---|---|---|---|---|
| 101 | 420 | 6.25 | 18 | Yellow Colloidal Silver |
| 102 | 460 | 8.50 | 23 | Yellow Colloidal Silver |
| 103 | 420 | 6.25 | 23 | Yellow Colloidal Silver |
| 104 | 440 | 8.50 | 20 | Yellow Colloidal Silver |
| 105 | 420 | 6.17 | 18 | Dye-1 |
| 106 | 420 | 6.17 | 18 | Dye-2 |
| 107 | 420 | 8.42 | 23 | I-1 |
| 108 | 460 | 6.17 | 23 | I-1 |
| 109 | 420 | 8.42 | 20 | I-1 |
| 110 | 440 | 6.17 | 18 | I-1 |
| 111 | 420 | 6.17 | 18 | II-5 |
| 112 | 420 | 7.29 | 20 | II-5 |
| 113 | 280 | 7.29 | 18 | II-5 |
| 114 | 420 | 5.61 | 17 | IV-6 |
| 115 | 420 | 7.29 | 18 | Silver Salt XI-38 |
| 116 | 420 | 6.17 | 18 | I-1 |
| 117 | 460 | 6.17 | 18 | II-5 |
| 118 | 420 | 6.17 | 18 | Silver Salt XI-38 |
| 119 | 440 | 6.17 | 18 | Silver Salt XI-20 |
| 120 | 420 | 6.01 | 18 | Silver Salt XI-38 |

Comparative Dye-1

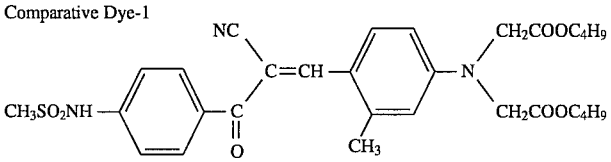

Comparative Dye-2

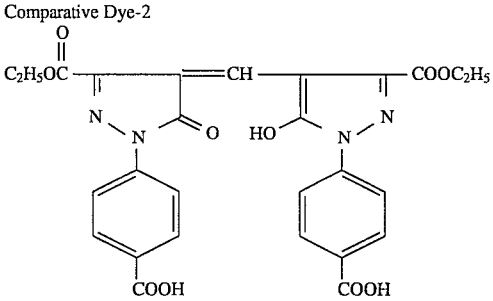

Further, in sample 120, the black colloidal silver in the 1st layer was replaced by a fine crystal dispersion of a mixture of dyes I-1, I-4 and III-34.

Each sample was cut into 135 format size 24-exposure tapes. Cut tapes of each sample were divided into three groups. Tapes of one group were each housed in a small cartridge, those of another group were each hermetically packed in a cylindrical polyethylene container, and those of still another group were each housed, in a condition ready for photographing, in the photographic unit shown in Fig.1 and then hermetically packaged with moistureproof laminated film. The inside of each hermetic container was maintained at 23° C. and 50% relative humidity. And each of the hermetically packaged ones was allowed to stand for 5 days in the environment of 50° C. and 60% relative humidity, as a substitute for storage property evaluation. Each sample was exposed with test patterns for specific sensitivity evaluation and storage property evaluation and subjected to Processing C-41 (Eastman Kodak) described in British Journal of Photography, 1988, pp.196–198. In addition, the desilverizing property was evaluated by conducting development in which the bleaching time was shortened to 60%, and the dye staining property was also tested by carrying out development in which the total processing time was shortened to 80%.

The desilverizing property was evaluated by measuring the residual amount of silver in a saturated exposure portion according to silver atom absorption analysis, using a sample subjected to processing in which the bleaching time was shortened to 60%. The residual amount of silver was rated using the following ranks:

A: less than 0.1 $g/m^2$

B: 0.1 $g/m^2$ to less than 0.2 $g/m^2$

C: 0.2 $g/m^2$ to less than 0.4 $g/m^2$

D: 0.4 $g/m^2$ or more

The dye staining property was evaluated by determining the density difference (ΔD) in absorbed wavelengths of the dyes contained in two light-sensitive materials: one was that subjected to processing in which the total processing time was shortened to 80%, and the other was that subjected to processing in the usual manner. The aging fog and sensitivity fluctuation were evaluated by the increase of fog in yellow images caused by the foregoing high-temperature forced deterioration test. The results are shown in Table 5.

TABLE 5

| Sample No. | Desilver-izing Property | Dye Staining | Aging Fog | Sensitivity Fluctuation | Remarks |
|---|---|---|---|---|---|
| 101 | C | 0.01 | 0.14 | −8 | Comparison |
| 102 | D | 0.02 | 0.15 | −8 | Comparison |
| 103 | D | 0.01 | 0.15 | −7 | Comparison |
| 104 | D | 0.02 | 0.14 | −8 | Comparison |
| 105 | C | 0.14 | 0.08 | −6 | Comparison |
| 106 | B | 0.05 | 0.07 | −5 | Comparison |
| 107 | D | 0.04 | 0.10 | −7 | Comparison |
| 108 | C | 0.03 | 0.08 | −6 | Comparison |
| 109 | B | 0.03 | 0.09 | −7 | Comparison |
| 110 | A | 0.01 | 0.06 | −4 | Invention |
| 111 | A | 0.01 | 0.05 | −4 | Invention |
| 112 | A | 0.02 | 0.06 | −5 | Invention |
| 113 | A | 0.01 | 0.05 | −7 | Comparison |
| 114 | A | 0.02 | 0.05 | −4 | Invention |
| 115 | B | 0.02 | 0.06 | −5 | Invention |
| 116 | A | 0.01 | 0.04 | −4 | Invention |

TABLE 5-continued

| Sample No. | Desilver-izing Property | Dye Staining | Aging Fog | Sensitivity Fluctuation | Remarks |
|---|---|---|---|---|---|
| 117 | A | 0.02 | 0.04 | −4 | Invention |
| 118 | A | 0.01 | 0.04 | −3 | Invention |
| 119 | A | 0.01 | 0.04 | −3 | Invention |
| 120 | A | 0.01 | 0.03 | −3 | Invention |

It can be understood from Table 5 that the object of the invention is attained only when the constituents of the invention are satisfied.

Example 2

Sample 201 was prepared in the same manner as sample 101 except that the compositions of the 3rd, 4th, 5th, 7th, 9th, 10th, 12th and 13th layers were changed as follows.

| | |
|---|---|
| 3rd Layer: low-speed red-sensitive layer | |
| Silver iodobromide emulsion A | 0.16 |
| Silver iodobromide emulsion B | 0.36 |
| Sensitizing dye SD-1 | $2.0 \times 10^{-4}$ |
| Sensitizing dye SD-2 | $1.4 \times 10^{-4}$ |
| Sensitizing dye SD-3 | $1.4 \times 10^{-5}$ |
| Sensitizing dye SD-4 | $0.7 \times 10^{-4}$ |
| Cyan coupler C-1 | 0.56 |
| Colored cyan couple CC-1 | 0.03 |
| DIR compound D-1 | 0.026 |
| High boiling solvent Oil-3 | 0.49 |
| Gelatin | 1.16 |
| 4th Layer: medium-speed red-sensitive layer | |
| Silver iodobromide emulsion B | 0.29 |
| Silver iodobromide emulsion C | 0.67 |
| Sensitizing dye SD-1 | $1.7 \times 10^{-4}$ |
| Sensitizing dye SD-2 | $0.86 \times 10^{-4}$ |
| Sensitizing dye SD-3 | $1.15 \times 10^{-5}$ |
| Sensitizing dye SD-4 | $0.86 \times 10^{-4}$ |
| Cyan coupler C-1 | 0.43 |
| Colored cyan coupler CC-1 | 0.04 |
| DIR compound D-1 | 0.015 |
| High boiling solvent Oil-1 | 0.39 |
| Gelatin | 0.88 |
| 5th Layer: high-speed red-sensitive layer | |
| Silver iodobromide emulsion D | 1.52 |
| Sensitizing dye SD-1 | $1.0 \times 10^{-4}$ |
| Sensitizing dye SD-2 | $1.0 \times 10^{-4}$ |
| Sensitizing dye SD-3 | $1.2 \times 10^{-5}$ |
| Cyan coupler C-2 | 0.13 |
| Colored cyan coupler CC-1 | 0.025 |
| High boiling solvent Oil-1 | 0.12 |
| Gelatin | 1.17 |
| 7th layer: low-speed green-sensitive layer | |
| Silver iodobromide emulsion A | 0.14 |
| Silver iodobromide emulsion B | 0.44 |
| Sensitizing dye SD-4 | $4.6 \times 10^{-5}$ |
| Sensitizing dye SD-5 | $4.1 \times 10^{-4}$ |
| Magenta coupler M-6 | 0.19 |
| Magenta coupler M-7 | 0.485 |
| Colored magenta coupler CM-3 | 0.06 |
| High boiling solvent Oil-2 | 0.81 |
| Gelatin | 2.02 |
| 9th Layer: medium-speed green-sensitive layer | |
| Silver iodobromide emulsion C | 0.79 |
| Sensitizing dye SD-6 | $1.2 \times 10^{-4}$ |
| Sensitizing dye SD-7 | $1.2 \times 10^{-4}$ |
| Sensitizing dye SD-8 | $1.2 \times 10^{-4}$ |
| Magenta coupler M-6 | 0.054 |

-continued

| | |
|---|---|
| Magenta coupler M-7 | 0.13 |
| Colored magenta coupler CM-4 | 0.048 |
| DIR compound D-2 | 0.028 |
| DIR compound D-3 | 0.002 |
| High boiling solvent Oil-2 | 0.46 |
| Gelatin | 0.89 |
| 10th Layer: high-speed green-sensitive layer | |
| Silver iodobromide emulsion D | 1.52 |
| Sensitizing dye SD-6 | $7.1 \times 10^{-5}$ |
| Sensitizing dye SD-7 | $7.1 \times 10^{-5}$ |
| Sensitizing dye SD-8 | $7.1 \times 10^{-5}$ |
| Magenta coupler M-7 | 0.076 |
| Colored magenta coupler CM-4 | 0.013 |
| High boiling solvent Oil-2 | 0.38 |
| Gelatin | 1.28 |
| 12th Layer: low-speed blue-sensitive layer | |
| Silver iodobromide emulsion A | 0.17 |
| Silver iodobromide emulsion B | 0.17 |
| Silver iodobromide emulsion C | 0.086 |
| Sensitizing dye SD-9 | $6.3 \times 10^{-5}$ |
| Sensitizing dye SD-10 | $1.0 \times 10^{-5}$ |
| Yellow coupler Y-1 | 0.80 |
| DIR compound D-5 | 0.013 |
| High boiling solvent Oil-2 | 0.325 |
| Gelatin | 1.29 |
| 13th Layer: high-speed blue-sensitive layer | |
| Silver iodobromide emulsion C | 0.477 |
| Silver iodobromide emulsion E | 0.477 |
| Sensitizing dye SD-9 | $8.0 \times 10^{-5}$ |
| Sensitizing dye SD-11 | $3.1 \times 10^{-5}$ |
| Yellow coupler Y-1 | 0.187 |
| High boiling solvent | 0.076 |
| Gelatin | 0.79 |

M-6

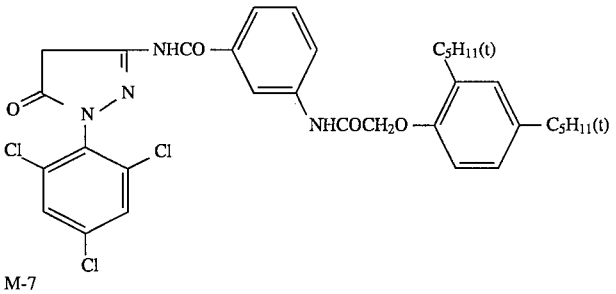

M-7

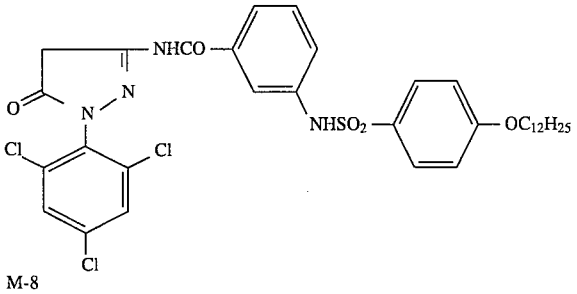

M-8

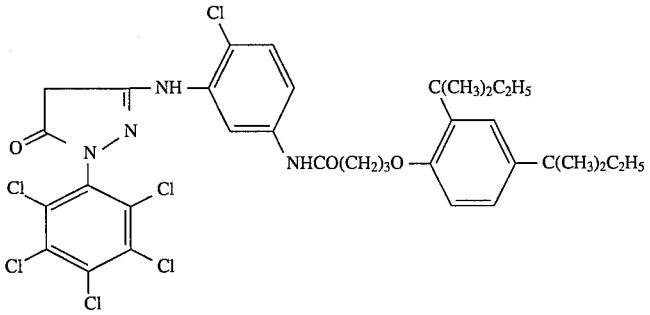

-continued

CM-3

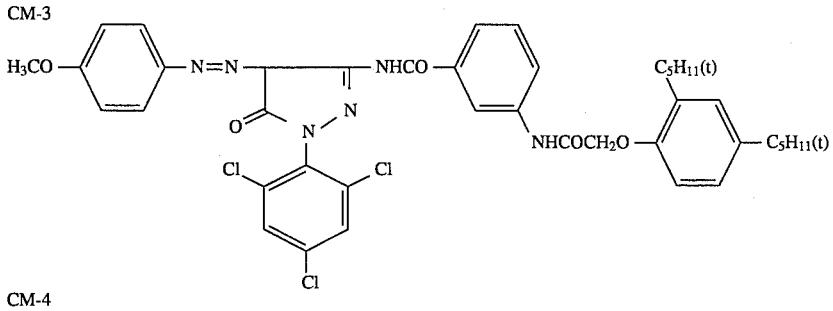

CM-4

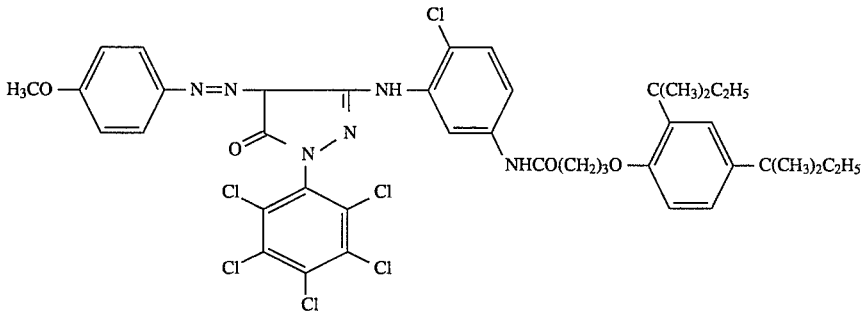

Samples 202 through 209 were prepared in the same manner as sample 201 except that yellow colloidal silver in the 11th layer was replaced by a dispersion of a dye as shown in Table 6. Furthermore, emulsions used in samples 207 to 209 were changed in the same manner as samples 116 to 120 of Example 1. Silver coating weight of sample 209 was adjusted by decreasing uniformly the silver weight coated in sample 202.

TABLE 6

| Sample No. | Specific Sensitivity | Silver Coating Weight | Coating Thickness (μm) | Dye |
|---|---|---|---|---|
| 201 | 420 | 7.96 | 20 | Yellow Colloidal Silver |
| 202 | 420 | 7.88 | 20 | I-1 |
| 203 | 420 | 7.88 | 20 | II-5 |
| 204 | 420 | 7.88 | 20 | IV-6 |
| 205 | 420 | 7.88 | 20 | Silver Salt XI-38 |
| 206 | 420 | 7.88 | 20 | Silver Salt XI-20 |
| 207 | 460 | 7.88 | 20 | Silver Salt XI-38 |
| 208 | 460 | 7.88 | 18 | Silver Salt XI-38 |
| 209 | 440 | 6.37 | 18 | Silver Salt XI-38 |

Resulting samples were treated and evaluated in the same manner as in Example 1. Results thereof are shown in Table 7.

TABLE 7

| Sample No. | Desilverizing Property | Dye Staining | Aging Fog | Sensitivity Fluctuation | Remarks |
|---|---|---|---|---|---|
| 201 | D | 0.01 | 0.14 | −8 | Invention |
| 202 | B | 0.02 | 0.06 | −5 | Invention |

TABLE 7-continued

| Sample No. | Desilverizing Property | Dye Staining | Aging Fog | Sensitivity Fluctuation | Remarks |
|---|---|---|---|---|---|
| 203 | B | 0.02 | 0.06 | −5 | Invention |
| 204 | B | 0.02 | 0.06 | −5 | Invention |
| 205 | B | 0.02 | 0.05 | −5 | Invention |
| 206 | B | 0.02 | 0.05 | −5 | Invention |
| 207 | B | 0.02 | 0.04 | −4 | Invention |
| 208 | B | 0.01 | 0.04 | −4 | Invention |
| 209 | A | 0.01 | 0.04 | −4 | Invention |

What is claimed is:

1. A silver halide color photographic light-sensitive material having, on one side of a transparent support, photographic component layers comprising a red-sensitive silver halide emulsion layer, a green-sensitive silver halide emulsion layer, a blue-sensitive silver halide emulsion layer and a nonlight-sensitive layer, and wherein said light-sensitive material has an ISO speed of 320 to 800, the total coating weight of silver in the component layers is within a range of 3.0 to 8.0 g/m$^2$, a total dry coating thickness of the photographic component layers is 22 μm or less, and at least one of the component layers contains a dye in the form of a dispersion of solid particles dispersed in a binder.

2. The silver halide color photographic material of claim 1, wherein a magnetic recording layer is provided on the other side of the transparent support.

* * * * *